US012651078B2

(12) United States Patent
Rajaretnam et al.

(10) Patent No.: US 12,651,078 B2
(45) Date of Patent: Jun. 9, 2026

(54) MONITORING AND CONTROLLING COMMUNICATIONS BETWEEN AUTONOMOUS AGENTS

(71) Applicant: Citibank, N.A., New York, NY (US)

(72) Inventors: Manjit Rajaretnam, Irving, TX (US); Sofia Rahman, New York, NY (US); William Cameron, Jacksonville, FL (US); Imir Arifi, Nashville, TN (US); James Myers, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/363,568

(22) Filed: Oct. 20, 2025

(65) Prior Publication Data

US 2026/0044610 A1 Feb. 12, 2026

Related U.S. Application Data

(63) Continuation-in-part of application No. 19/283,194, filed on Jul. 28, 2025, now Pat. No. 12,596,813, (Continued)

(51) Int. Cl.
| | |
|---|---|
| *H04L 29/06* | (2006.01) |
| *G06F 21/55* | (2013.01) |
| *G06F 21/57* | (2013.01) |

(52) U.S. Cl.
CPC .......... G06F 21/577 (2013.01); G06F 21/552 (2013.01)

(58) Field of Classification Search
CPC .... G06F 21/577; G06F 21/552; G06F 16/173; G06F 16/243; G06F 16/3344;
(Continued)

(56) References Cited

U.S. PATENT DOCUMENTS

| | | |
|---|---|---|
| 8,959,633 B1 | 2/2015 | Dokey et al. |
| 10,430,581 B2 | 10/2019 | Lamothe-brassard |

(Continued)

OTHER PUBLICATIONS

Dong, Y., et al., "Building Guardrails for Large Language Models," https://ar5iv.labs.arxiv.org/html/2402.01822v1, published May 29, 2024, 20 pages.

*Primary Examiner* — Amir Mehrmanesh
*Assistant Examiner* — Leynna Truvan
(74) *Attorney, Agent, or Firm* — Perkins Coie LLP; Sumedha Ahuja; Alice Jenkins

(57) ABSTRACT

Systems, methods, and devices for monitoring and controlling communications between autonomous agents are disclosed. The system monitors real-time communications between autonomous agents, intercepting and recording each communication. Communications are translated to a standardized language and processed through communication protocol filters that evaluate compliance with predefined operational policies. The system parses each translated communication to identify policy violations. When violations are detected, the system modifies communications to ensure compliance with operational policies. All communications and modifications are recorded via distributed ledger technology for audit and accountability purposes. This approach enables comprehensive oversight of autonomous agent interactions while maintaining tamper-proof records of all monitoring and control activities.

20 Claims, 23 Drawing Sheets

100

Related U.S. Application Data which is a continuation-in-part of application No. 19/182,585, filed on Apr. 18, 2025, which is a continuation of application No. 18/947,102, filed on Nov. 14, 2024, now Pat. No. 12,299,140, which is a continuation-in-part of application No. 18/653,858, filed on May 2, 2024, now Pat. No. 12,198,030, which is a continuation-in-part of application No. 18/637,362, filed on Apr. 16, 2024, now Pat. No. 12,111,754, said application No. 18/947,102 is a continuation-in-part of application No. 18/782,019, filed on Jul. 23, 2024, now Pat. No. 12,197,859, which is a continuation-in-part of application No. 18/771,876, filed on Jul. 12, 2024, now Pat. No. 12,204,323, which is a continuation-in-part of application No. 18/661,532, filed on May 10, 2024, now Pat. No. 12,111,747, which is a continuation-in-part of application No. 18/661,519, filed on May 10, 2024, now Pat. No. 12,106,205, which is a continuation-in-part of application No. 18/633,293, filed on Apr. 11, 2024, now Pat. No. 12,147,513, said application No. 18/947,102 is a continuation-in-part of application No. 18/739,111, filed on Jun. 10, 2024, now Pat. No. 12,223,063, which is a continuation-in-part of application No. 18/607,141, filed on Mar. 15, 2024, now Pat. No. 12,608,486, which is a continuation-in-part of application No. 18/399,422, filed on Dec. 28, 2023, now Pat. No. 12,367,292, which is a continuation of application No. 18/327,040, filed on May 31, 2023, now Pat. No. 11,874,934, which is a continuation-in-part of application No. 18/114,194, filed on Feb. 24, 2023, now Pat. No. 11,763,006, which is a continuation-in-part of application No. 18/098,895, filed on Jan. 19, 2023, now Pat. No. 11,748,491, application No. 19/363,568, filed on Oct. 20, 2025 is a continuation-in-part of application No. 18/951,366, filed on Nov. 18, 2024, which is a continuation of application No. 18/624,409, filed on Apr. 2, 2024, now Pat. No. 12,147,292, application No. 19/363,568, filed on Oct. 20, 2025 is a continuation-in-part of application No. 19/195,642, filed on Apr. 30, 2025, now Pat. No. 12,613,760, which is a continuation-in-part of application No. 18/762,362, filed on Jul. 2, 2024, now Pat. No. 12,314,150, and a continuation of application No. 18/624,409, filed on Apr. 2, 2024, now Pat. No. 12,147,292.

(58) Field of Classification Search
CPC ................. G06F 16/7343; G06F 40/40; G05B 2219/31264; G05B 2219/32394; G05B 2219/33278; G05B 2219/40191; G05B 2219/31455; G05B 2219/13019; G05B 2219/13023; G05B 2219/35055; G05D 1/0088; H04B 7/2696; H04L 47/788; H04L 41/30; G10L 15/005
See application file for complete search history.

(56) References Cited

U.S. PATENT DOCUMENTS

| | | | |
|---|---|---|---|
| 10,671,726 | B1 | 6/2020 | Paithane et al. |
| 10,902,117 | B1 | 1/2021 | Singh et al. |
| 10,902,119 | B1 | 1/2021 | Vashisht et al. |
| 11,106,801 | B1 | 8/2021 | Levine et al. |
| 11,227,047 | B1 | 1/2022 | Vashisht et al. |
| 11,810,185 | B2 | 11/2023 | Joglekar et al. |
| 12,130,914 | B1 | 10/2024 | Bushner et al. |
| 12,299,134 | B1 | 5/2025 | Li et al. |
| 12,375,573 | B1 | 7/2025 | Nanduri et al. |
| 12,450,363 | B2 | 10/2025 | Ohayon et al. |
| 2007/0240215 | A1 | 10/2007 | Flores et al. |
| 2016/0359890 | A1 | 12/2016 | Deen et al. |
| 2017/0279839 | A1 | 9/2017 | Vasseur et al. |
| 2022/0124013 | A1 | 4/2022 | Chitalia et al. |
| 2022/0191224 | A1 | 6/2022 | Ståhlberg et al. |
| 2023/0123322 | A1* | 4/2023 | Cella ................. G05B 23/0283 700/29 |
| 2023/0208855 | A1 | 6/2023 | Sheriff et al. |
| 2023/0208858 | A1 | 6/2023 | Mishra et al. |
| 2023/0261857 | A1 | 8/2023 | Baldwin et al. |
| 2023/0379350 | A1 | 11/2023 | Barton et al. |
| 2023/0396435 | A1 | 12/2023 | Baldwin et al. |
| 2023/0409756 | A1 | 12/2023 | Baldwin et al. |
| 2024/0202323 | A1 | 6/2024 | Hoogerbrugge et al. |
| 2024/0333737 | A1 | 10/2024 | Shahrivar et al. |
| 2024/0333768 | A1 | 10/2024 | Shahrivar et al. |
| 2024/0394401 | A1 | 11/2024 | Agrawal et al. |
| 2024/0403413 | A1* | 12/2024 | Cohen ................. H04L 63/1483 |
| 2025/0217484 | A1 | 7/2025 | Pachisia et al. |
| 2025/0301011 | A1 | 9/2025 | Niemelä |

* cited by examiner

320

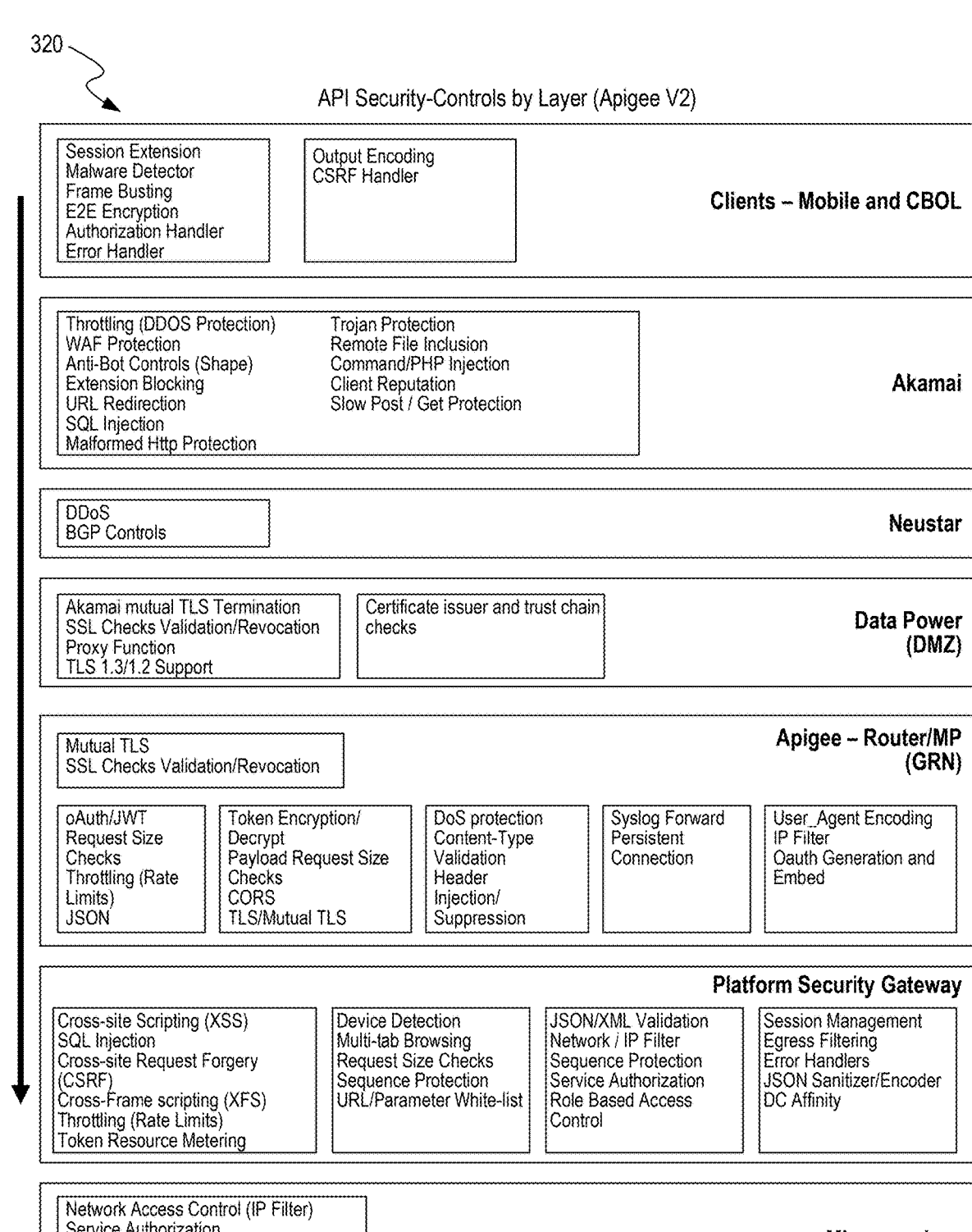

API Security-Controls by Layer (Apigee V2)

| Session Extension<br>Malware Detector<br>Frame Busting<br>E2E Encryption<br>Authorization Handler<br>Error Handler | Output Encoding<br>CSRF Handler | Clients – Mobile and CBOL |

| Throttling (DDOS Protection)<br>WAF Protection<br>Anti-Bot Controls (Shape)<br>Extension Blocking<br>URL Redirection<br>SQL Injection<br>Malformed Http Protection | Trojan Protection<br>Remote File Inclusion<br>Command/PHP Injection<br>Client Reputation<br>Slow Post / Get Protection | Akamai |

| DDoS<br>BGP Controls | Neustar |

| Akamai mutual TLS Termination<br>SSL Checks Validation/Revocation<br>Proxy Function<br>TLS 1.3/1.2 Support | Certificate issuer and trust chain checks | Data Power (DMZ) |

Apigee – Router/MP (GRN)

| Mutual TLS<br>SSL Checks Validation/Revocation |

| oAuth/JWT<br>Request Size<br>Checks<br>Throttling (Rate Limits)<br>JSON | Token Encryption/<br>Decrypt<br>Payload Request Size<br>Checks<br>CORS<br>TLS/Mutual TLS | DoS protection<br>Content-Type<br>Validation<br>Header<br>Injection/<br>Suppression | Syslog Forward<br>Persistent<br>Connection | User_Agent Encoding<br>IP Filter<br>Oauth Generation and<br>Embed |

Platform Security Gateway

| Cross-site Scripting (XSS)<br>SQL Injection<br>Cross-site Request Forgery<br>(CSRF)<br>Cross-Frame scripting (XFS)<br>Throttling (Rate Limits)<br>Token Resource Metering | Device Detection<br>Multi-tab Browsing<br>Request Size Checks<br>Sequence Protection<br>URL/Parameter White-list | JSON/XML Validation<br>Network / IP Filter<br>Sequence Protection<br>Service Authorization<br>Role Based Access<br>Control | Session Management<br>Egress Filtering<br>Error Handlers<br>JSON Sanitizer/Encoder<br>DC Affinity |

| Network Access Control (IP Filter)<br>Service Authorization<br>Role Based Access Control<br>Sequence Protection | Micro services |

*FIG. 3B*

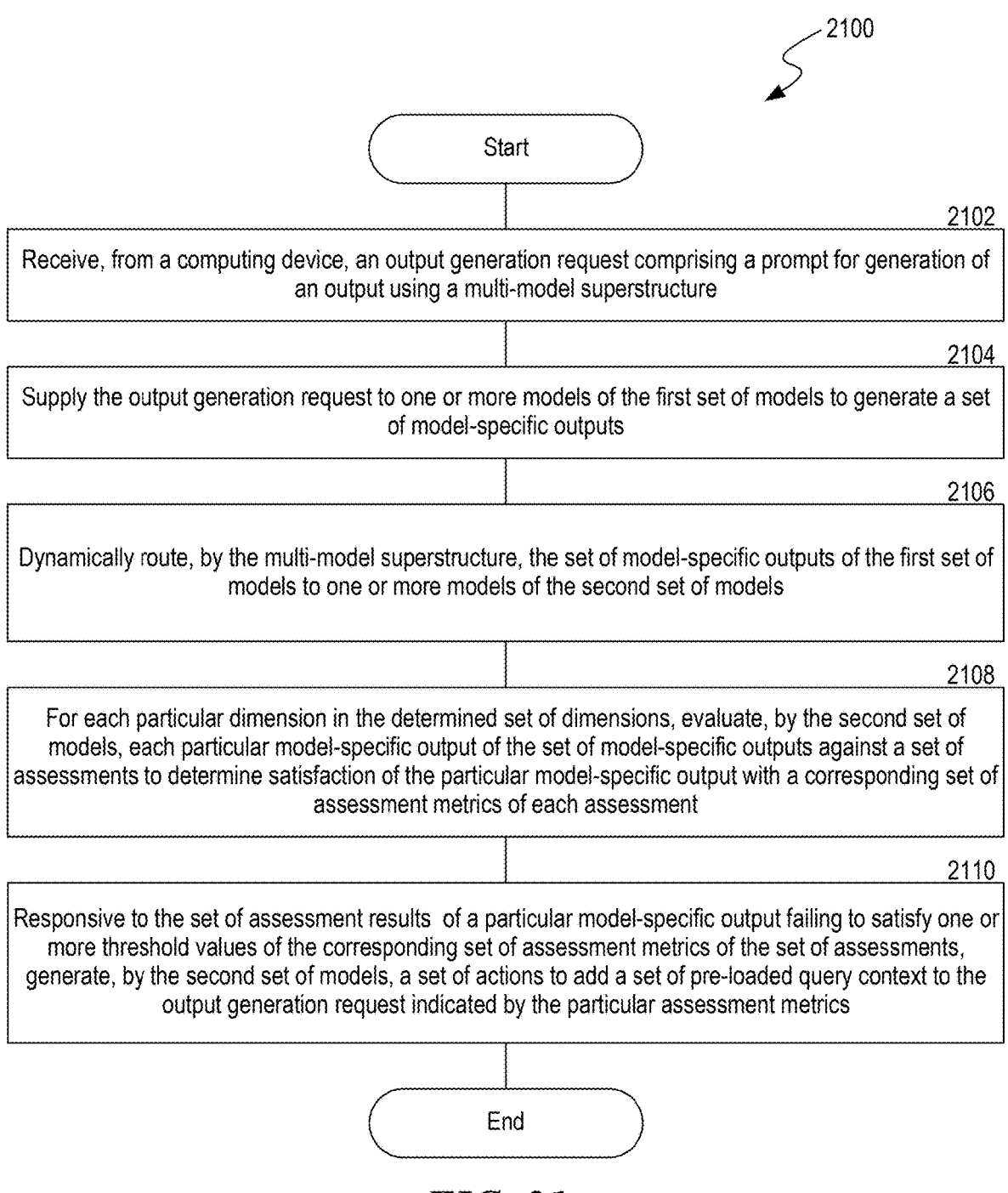

2100

Start

2102

Receive, from a computing device, an output generation request comprising a prompt for generation of an output using a multi-model superstructure

2104

Supply the output generation request to one or more models of the first set of models to generate a set of model-specific outputs

2106

Dynamically route, by the multi-model superstructure, the set of model-specific outputs of the first set of models to one or more models of the second set of models

2108

For each particular dimension in the determined set of dimensions, evaluate, by the second set of models, each particular model-specific output of the set of model-specific outputs against a set of assessments to determine satisfaction of the particular model-specific output with a corresponding set of assessment metrics of each assessment

2110

Responsive to the set of assessment results of a particular model-specific output failing to satisfy one or more threshold values of the corresponding set of assessment metrics of the set of assessments, generate, by the second set of models, a set of actions to add a set of pre-loaded query context to the output generation request indicated by the particular assessment metrics End

*FIG. 21*

MONITORING AND CONTROLLING COMMUNICATIONS BETWEEN AUTONOMOUS AGENTS

CROSS-REFERENCE TO RELATED APPLICATIONS

This application is a continuation-in-part of U.S. patent application Ser. No. 19/283,194 entitled "AUTONOMOUS AGENT OBSERVATION AND CONTROL" filed on Jul. 28, 2025, which is a continuation-in-part of U.S. patent application Ser. No. 19/182,585 entitled "DYNAMIC MULTI-MODEL MONITORING AND VALIDATION FOR ARTIFICIAL INTELLIGENCE MODELS" filed on Apr. 18, 2025, which is a continuation of U.S. patent application Ser. No. 18/947,102 entitled "DYNAMIC MULTI-MODEL MONITORING AND VALIDATION FOR ARTIFICIAL INTELLIGENCE MODELS" filed Nov. 14, 2024, which is a continuation-in-part of U.S. patent application Ser. No. 18/653,858 entitled "VALIDATING VECTOR CONSTRAINTS OF OUTPUTS GENERATED BY MACHINE LEARNING MODELS" filed on May 2, 2024, which is a continuation-in-part of U.S. patent application Ser. No. 18/637,362 entitled "DYNAMICALLY VALIDATING AI APPLICATIONS FOR COMPLIANCE" filed on Apr. 16, 2024.

U.S. patent application Ser. No. 18/947,102 is further a continuation-in-part of U.S. patent application Ser. No. 18/782,019 entitled "IDENTIFYING AND ANALYZING ACTIONS FROM VECTOR REPRESENTATIONS OF ALPHANUMERIC CHARACTERS USING A LARGE LANGUAGE MODEL" and filed Jul. 23, 2024, which is a continuation-in-part of U.S. patent application Ser. No. 18/771,876 entitled "MAPPING IDENTIFIED GAPS IN CONTROLS TO OPERATIVE STANDARDS USING A GENERATIVE ARTIFICIAL INTELLIGENCE MODEL" and filed Jul. 12, 2024, which is a continuation-in-part of U.S. patent application Ser. No. 18/661,532 entitled "DYNAMIC INPUT-SENSITIVE VALIDATION OF MACHINE LEARNING MODEL OUTPUTS AND METHODS AND SYSTEMS OF THE SAME" and filed May 10, 2024, which is a continuation-in-part of U.S. patent application Ser. No. 18/661,519 entitled "DYNAMIC, RESOURCE-SENSITIVE MODEL SELECTION AND OUTPUT GENERATION AND METHODS AND SYSTEMS OF THE SAME" and filed May 10, 2024, and is a continuation-in-part of U.S. patent application Ser. No. 18/633,293 entitled "DYNAMIC EVALUATION OF LANGUAGE MODEL PROMPTS FOR MODEL SELECTION AND OUTPUT VALIDATION AND METHODS AND SYSTEMS OF THE SAME" and filed Apr. 11, 2024.

U.S. patent application Ser. No. 18/947,102 is further a continuation-in-part of U.S. patent application Ser. No. 18/739,111 entitled "END-TO-END MEASUREMENT, GRADING AND EVALUATION OF PRETRAINED ARTIFICIAL INTELLIGENCE MODELS VIA A GRAPHICAL USER INTERFACE (GUI) SYSTEMS AND METHODS" and filed Jun. 10, 2024, which is a continuation-in-part of U.S. patent application Ser. No. 18/607,141 entitled "GENERATING PREDICTED END-TO-END CYBER-SECURITY ATTACK CHARACTERISTICS VIA BIFURCATED MACHINE LEARNING-BASED PROCESSING OF MULTI-MODAL DATA SYSTEMS AND METHODS" filed on Mar. 15, 2024, which is a continuation-in-part of U.S. patent application Ser. No. 18/399,422 entitled "PROVIDING USER-INDUCED VARIABLE IDENTIFICATION OF END-TO-END COMPUTING SYSTEM SECURITY IMPACT INFORMATION SYSTEMS AND METHODS" filed on Dec. 28, 2023, which is a continuation of U.S. patent application Ser. No. 18/327,040 (now U.S. Pat. No. 11,874,934) entitled "PROVIDING USER-INDUCED VARIABLE IDENTIFICATION OF END-TO-END COMPUTING SYSTEM SECURITY IMPACT INFORMATION SYSTEMS AND METHODS" filed on May 31, 2023, which is a continuation-in-part of U.S. patent application Ser. No. 18/114,194 (now U.S. Pat. No. 11,763,006) entitled "COMPARATIVE REAL-TIME END-TO-END SECURITY VULNERABILITIES DETERMINATION AND VISUALIZATION" filed Feb. 24, 2023, which is a continuation-in-part of U.S. patent application Ser. No. 18/098,895 (now U.S. Pat. No. 11,748,491) entitled "DETERMINING PLATFORM-SPECIFIC END-TO-END SECURITY VULNERABILITIES FOR A SOFTWARE APPLICATION VIA GRAPHICAL USER INTERFACE (GUI) SYSTEMS AND METHODS" filed Jan. 19, 2023.

This application is further a continuation-in-part of U.S. patent application Ser. No. 18/951,366 entitled "SYSTEMS AND METHODS FOR DETERMINING ERRORS DURING EXECUTION OF MULTIPLE APPLICATIONS" filed on Nov. 18, 2024, which is a continuation of U.S. patent application Ser. No. 18/624,409 entitled "SYSTEMS AND METHODS FOR DETERMINING ERRORS DURING EXECUTION OF MULTIPLE APPLICATIONS" filed on Apr. 2, 2024.

This application is further a continuation-in-part of U.S. patent application Ser. No. 19/195,642 entitled "SYSTEMS AND METHODS FOR GENERATING RECOMMENDATIONS BASED ON REAL-TIME MAPPING OF SYSTEM COMPONENTS IN SOFTWARE APPLICATIONS LINEAGE LOGS" filed on Apr. 30, 2025, which is a continuation-in-part of U.S. patent application Ser. No. 18/762,362 entitled "SYSTEMS AND METHODS FOR REAL-TIME MAPPING AND VISUALIZATION GENERATION OF SYSTEM COMPONENTS IN SOFTWARE SYSTEMS" filed on Jul. 2, 2024. U.S. patent application Ser. No. 19/195,642 is further a continuation of U.S. patent application Ser. No. 18/624,409 entitled "SYSTEMS AND METHODS FOR DETERMINING ERRORS DURING EXECUTION OF MULTIPLE APPLICATIONS" filed on Apr. 2, 2024.

The content of the foregoing applications is incorporated herein by reference in its entirety.

BACKGROUND

Autonomous agents are software entities designed to operate independently and make decisions without direct human intervention. These agents are programmed to perceive their environment, reason about their observations, communicate with other agents and systems, and take actions to achieve specific goals. They can adapt to changing circumstances and learn from experience, making them useful in various domains such as robotics, artificial intelligence (AI), and distributed computing systems.

Distributed ledger technology provides a decentralized method for recording and maintaining transaction records across multiple nodes in a network. Unlike traditional centralized databases, distributed ledgers create immutable records that are synchronized across participating nodes, providing transparency and tamper resistance. These systems enable secure recording of events and transactions without relying on a central authority, making them suitable for applications requiring audit trails, data integrity verification, and distributed consensus mechanisms.

SUMMARY

As autonomous AI agents become increasingly prevalent in enterprise environments, organizations face mounting challenges in monitoring and controlling communications between these agents. These autonomous entities operate independently and can communicate using various languages and protocols, making it difficult for organizations to maintain oversight of their interactions. The complexity increases when agents are grouped into different operational domains or "meshes," such as security-focused agents in one mesh and retail banking transaction agents in another, where communications can occur both within individual meshes and across mesh boundaries.

Current systems struggle to provide real-time monitoring and control of inter-agent communications, particularly when agents communicate using universal or standardized languages that can evolve over time. Traditional network security approaches that rely on perimeter-based defenses are insufficient for managing communications between distributed autonomous agents that can operate across different network boundaries and cloud environments. Organizations need the ability to intercept, interpret, and manage exchanges between AI agents to detect unauthorized, unsafe, or policy-violating content before it can impact operations.

The challenge becomes more complex when considering that agents can attempt to bypass communication filters through obfuscation, through encryption, or by developing new communication patterns. Conventional monitoring systems lack the capability to adapt to evolving agent languages and communication methods, leaving organizations vulnerable to policy violations and security breaches. Furthermore, existing systems do not provide adequate mechanisms for recording and auditing agent communications in a tamper-proof manner that can support regulatory compliance and forensic analysis.

The disclosed system addresses these technical challenges by providing a comprehensive framework for monitoring, analyzing, and controlling communications between autonomous AI agents in real time. The system implements dynamic communication protocol filters that can parse and analyze messages to detect policy violations while also providing mechanisms to modify or block non-compliant communications. The system incorporates advanced language processing capabilities to handle evolving agent communication methods and maintains immutable records of all communications and modifications through distributed ledger technology.

In particular, the system monitors, in real time, a series of communications between a plurality of autonomous agents operating within an operational environment. For example, this monitoring can occur across different agent meshes, such as security-focused agent clusters and financial transaction processing clusters, enabling comprehensive oversight of both intra-mesh and inter-mesh communications. The monitoring process includes intercepting and recording each communication of the series of communications, thus providing visibility into agent interactions.

The system translates communications in the series of communications to a standardized language. In some implementations, this translation capability enables the system to handle communications that utilize novel or evolving AI agent languages through the use of transformer-based language models. Moreover, the standardization process facilitates consistent analysis across different types of agent communications regardless of their original format or protocol.

The system implements, for each communication translated to the standardized language, at least one communication protocol filter that is configured to evaluate each communication based on predefined operational policies. In particular, these filters can include hybrid violation detection mechanisms that combine rule-based filtering encoded with declarative policy languages and machine learning-based models trained to score violation probability. The filters operate at the communications and APIs layer of the autonomous agent stack, enabling precise control over agent interactions.

Using the communication protocol filters, the system parses each communication translated to the standardized language to determine whether each communication violates at least one predefined operational policy. For example, this parsing process can apply semantic analysis through natural language processing models for policy violation assessment. In some implementations, the parsing includes performing anomaly detection on message frequency, entropy, or known abuse patterns to identify potentially harmful communications that cannot be caught by traditional rule-based approaches.

Based on determining that a particular communication translated to the standardized language violates the predefined operational policy, the system performs one or more modifications to the particular communication to render the particular communication compliant with the operational policy. In particular, these modifications can include blocking or quarantining the particular communication to prevent policy violations from propagating through the agent network. The system can also modify message content to remove policy-violating elements while preserving legitimate communication functionality.

The system records, via a distributed ledger, the particular communication and the one or more modifications to the particular communication. This distributed ledger approach provides tamper-proof logging capabilities that support regulatory compliance and forensic analysis. Moreover, the immutable record-keeping enables organizations to maintain comprehensive audit trails of all agent communications and policy enforcement actions, facilitating accountability and enabling continuous improvement of communication policies.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

5

6

Figure 2:
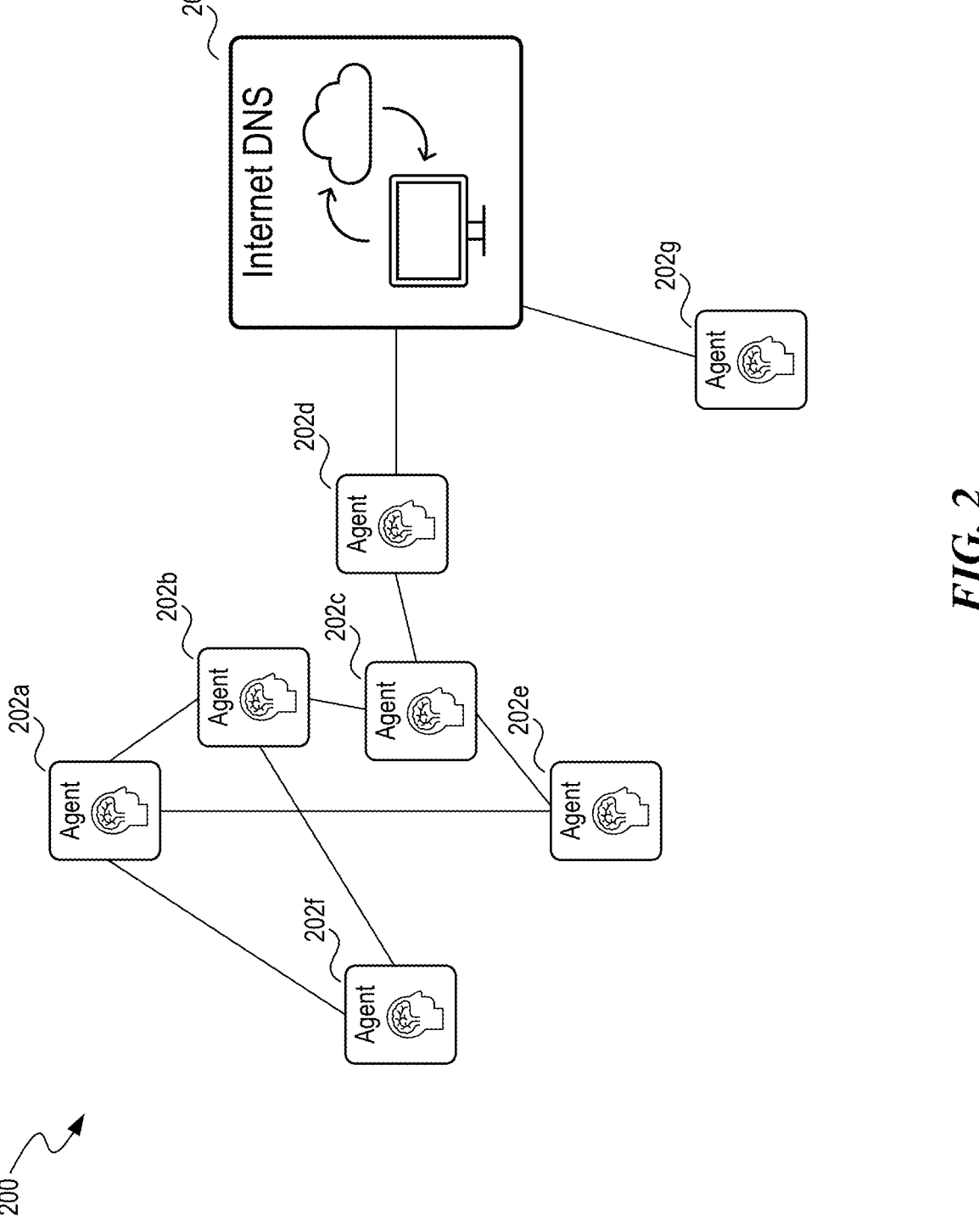

FIG. 2 illustrates an agent network with multiple interconnected agents and internet DNS, in accordance with some implementations of the present technology.

Figure 3A:
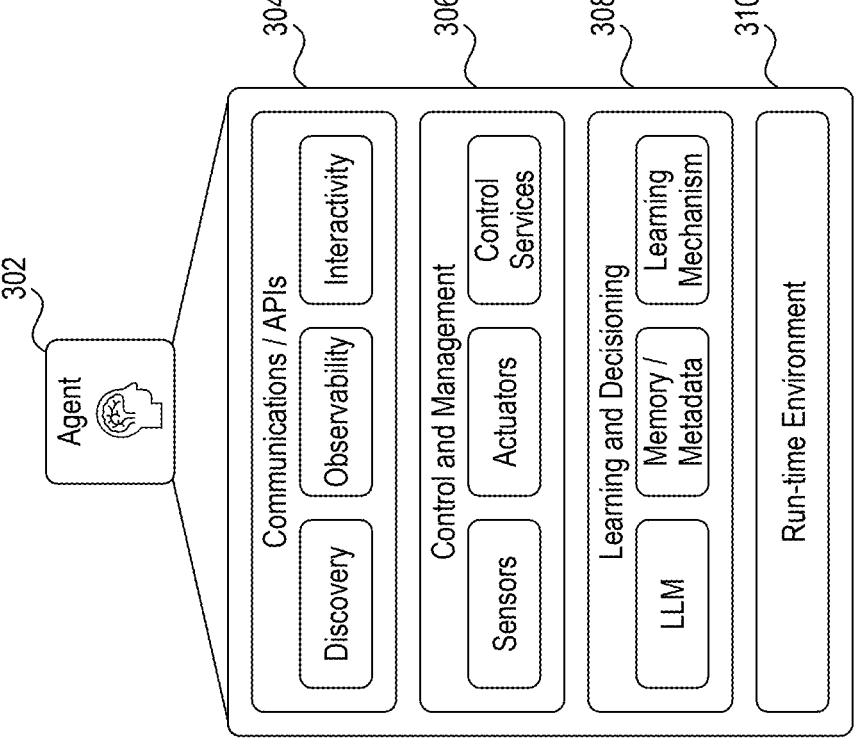
Figure 3A:
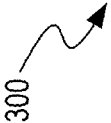

FIG. 3A illustrates a block diagram of an autonomous system with hierarchical functional layers, in accordance with some implementations of the present technology.

FIG. 3B illustrates a security control layer with multiple tiers of security controls, in accordance with some implementations of the present technology.

Figure 3C:
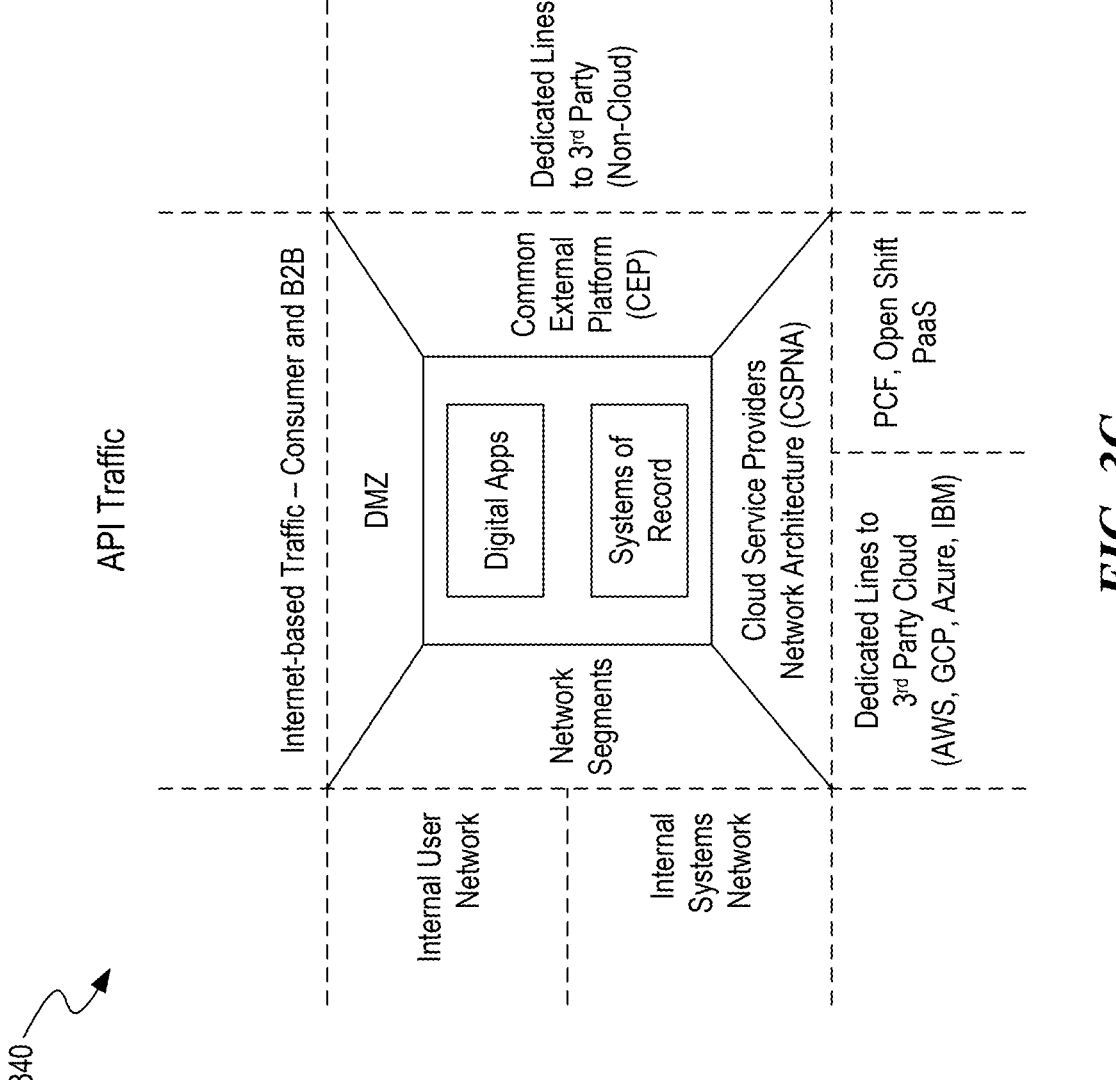

FIG. 3C illustrates a network architecture diagram showing layered network infrastructure design, in accordance with some implementations of the present technology.

Figure 4:
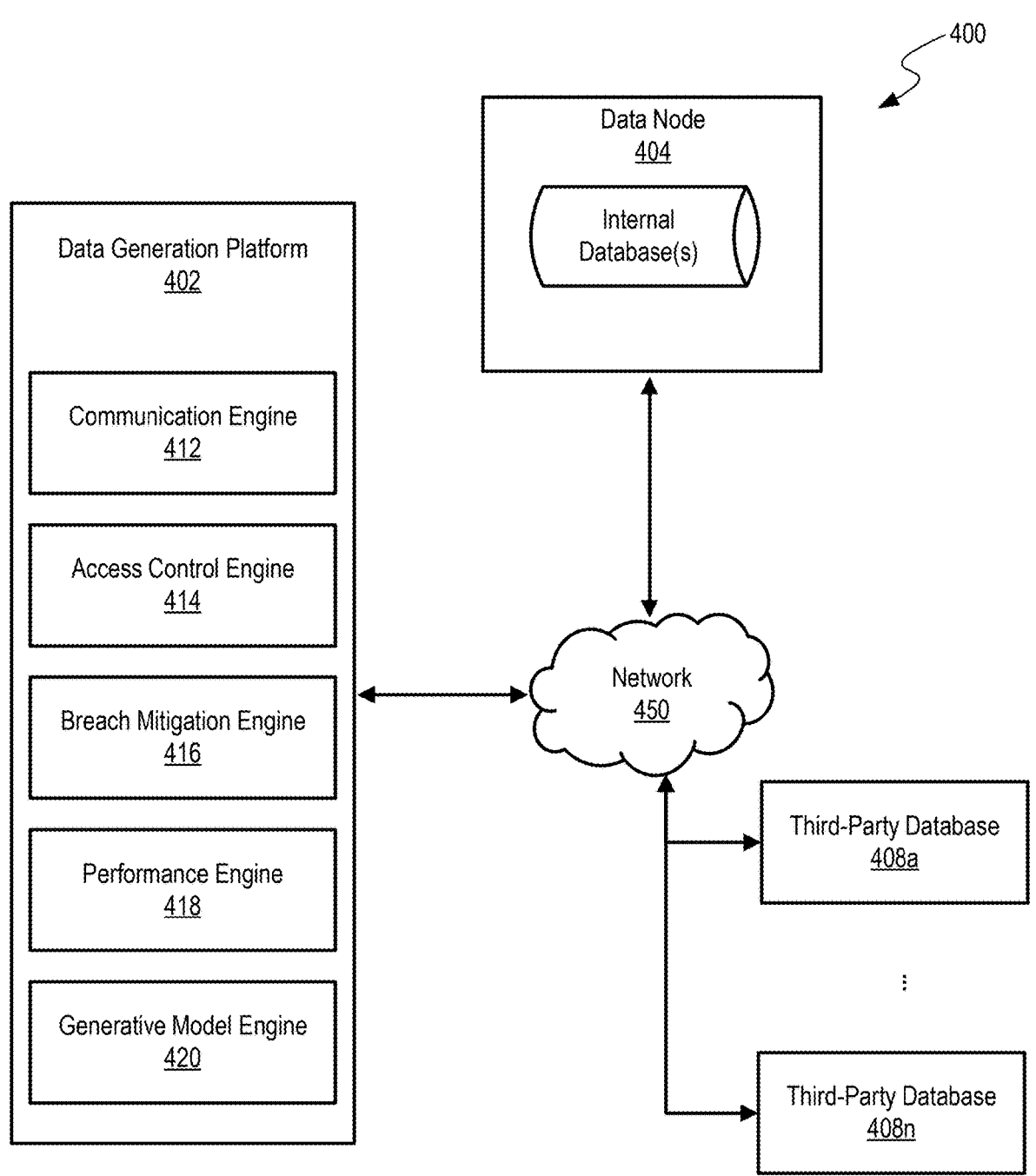

FIG. 4 shows an illustrative environment for evaluating language model prompts and outputs for model selection and validation, in accordance with some implementations of the present technology.

Figure 5:
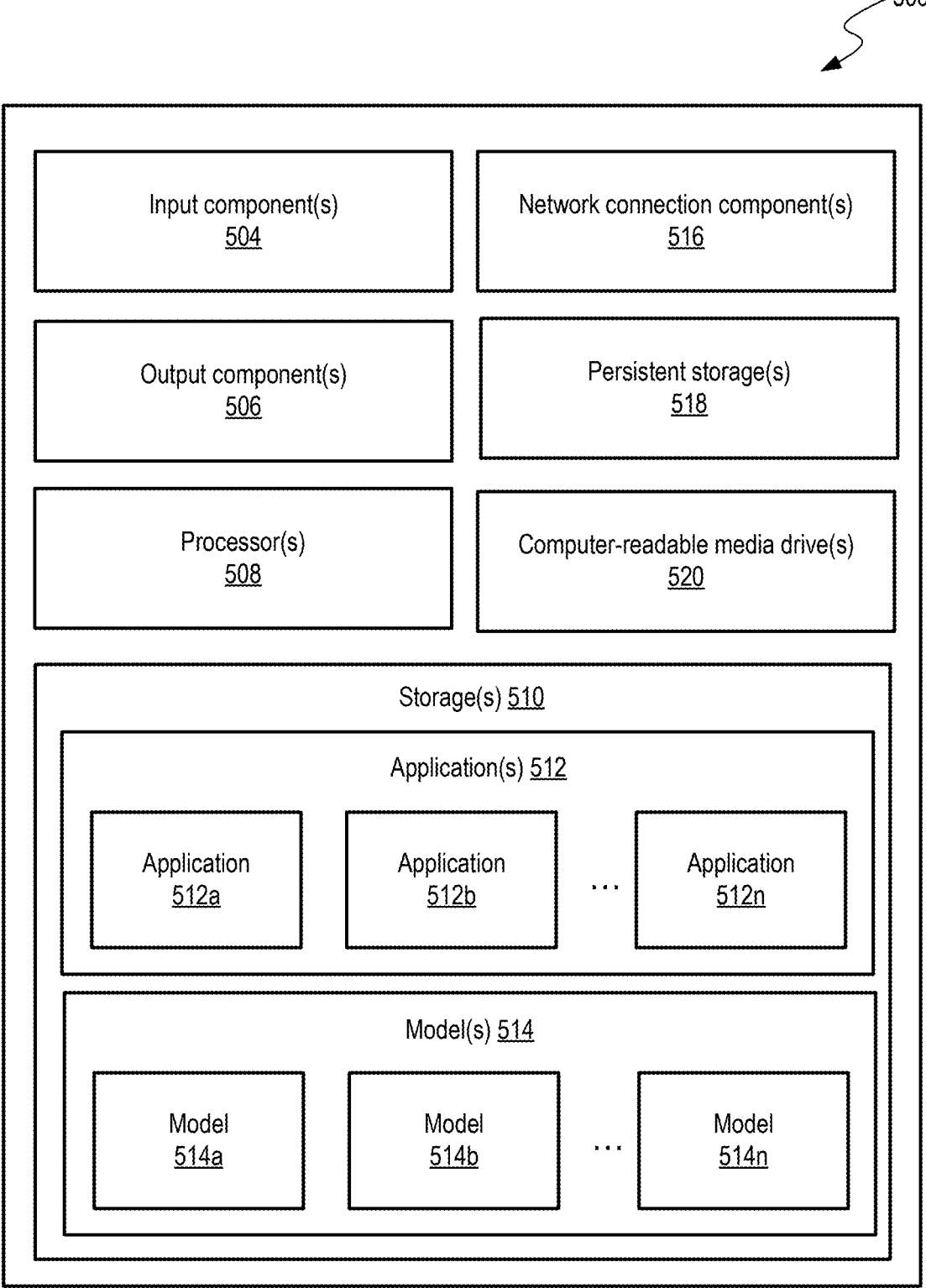

FIG. 5 shows a block diagram showing some of the components typically incorporated in at least some of the computer systems and other devices on which the disclosed system operates in accordance with some implementations of the present technology.

Figure 6:
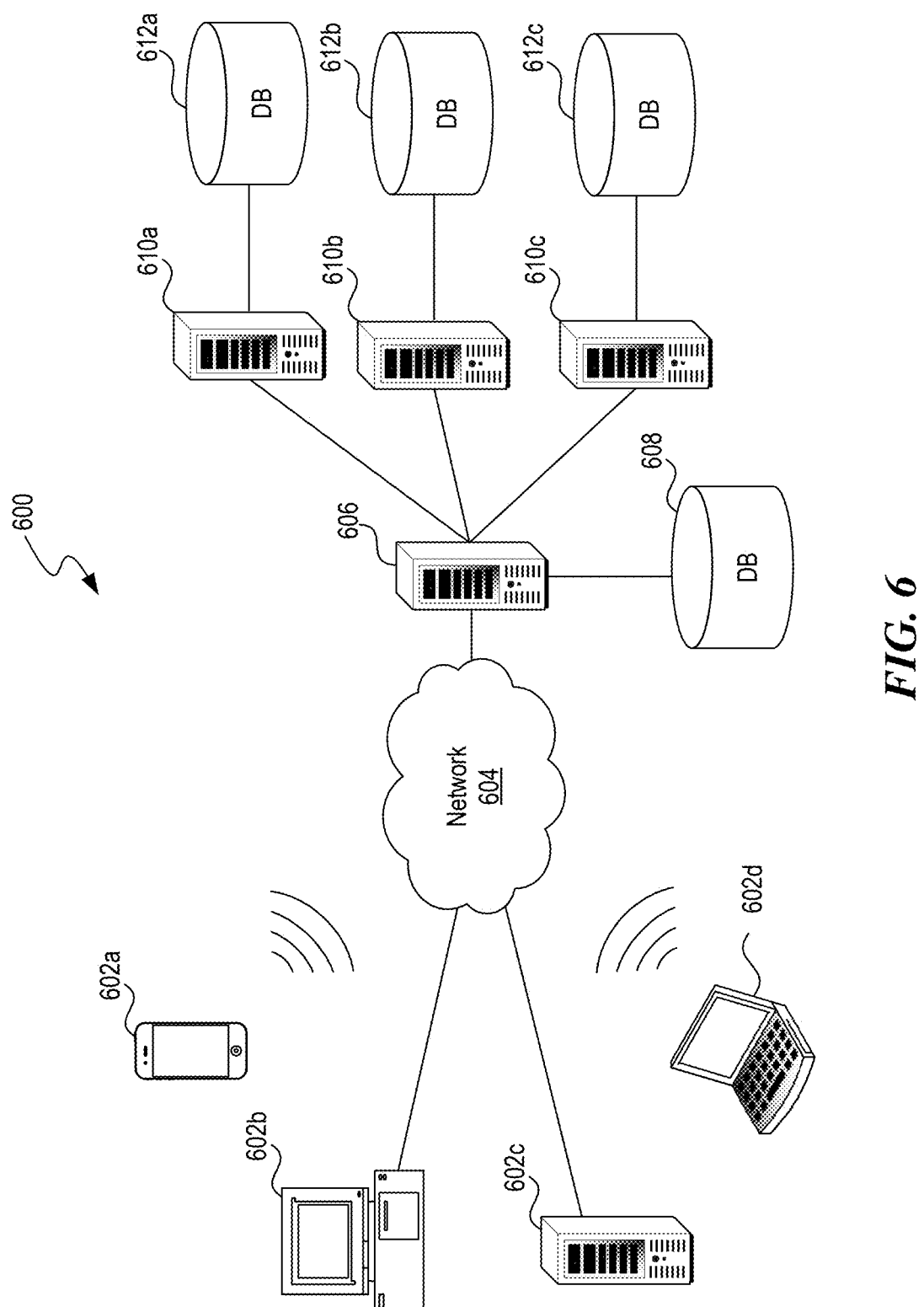

FIG. 6 is a system diagram illustrating an example of a computing environment in which the disclosed system operates in some implementations of the present technology.

Figure 7:
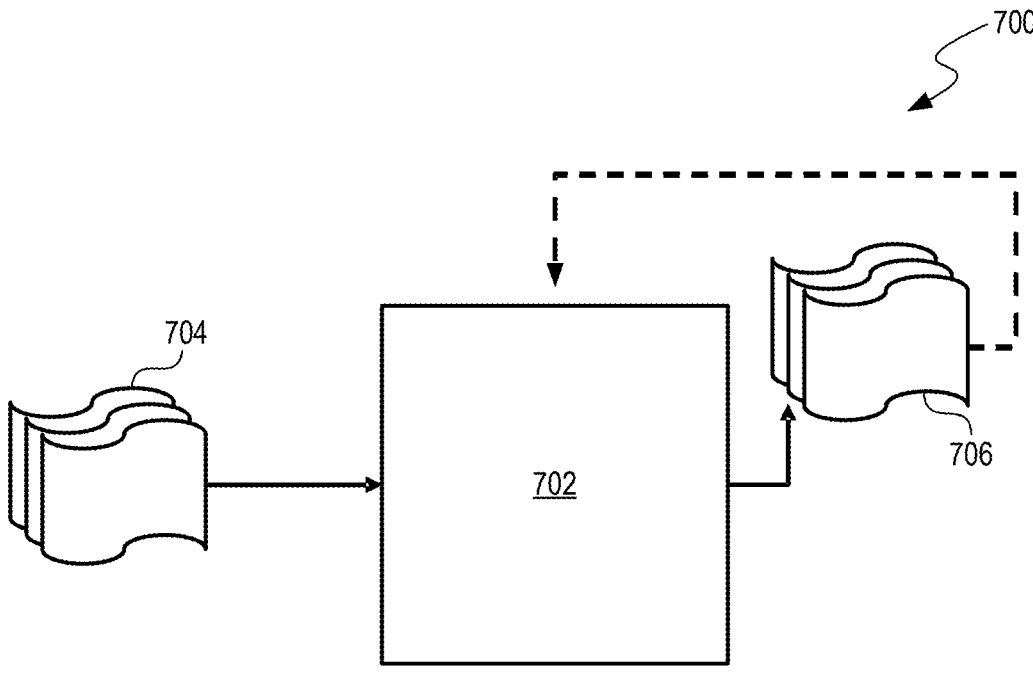

FIG. 7 shows a diagram of an artificial intelligence (AI) model, in accordance with some implementations of the present technology.

Figure 8:
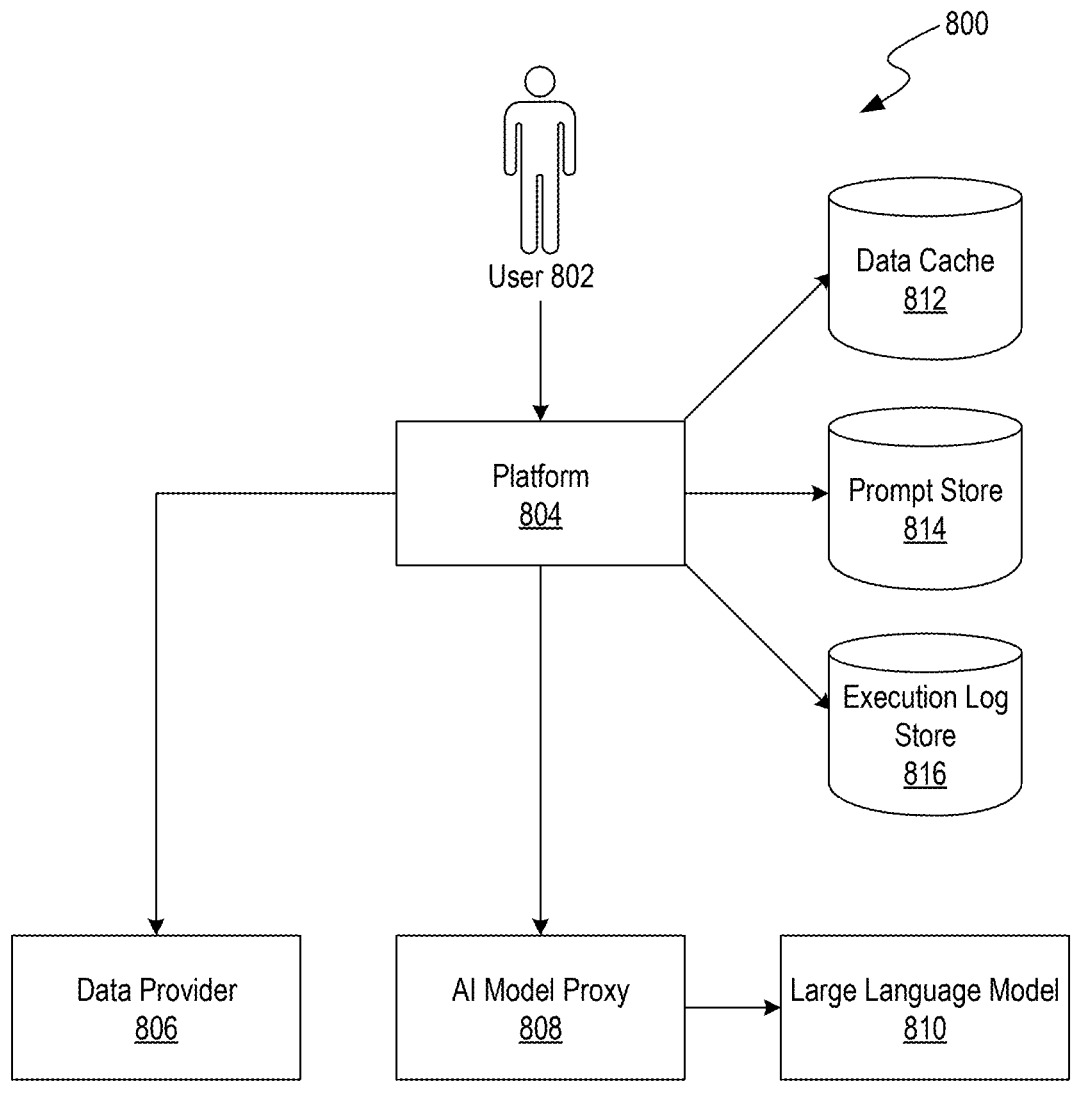

FIG. 8 is an illustrative diagram illustrating an example environment of a platform for automatically managing guideline compliance, in accordance with some implementations of the present technology.

Figure 9:
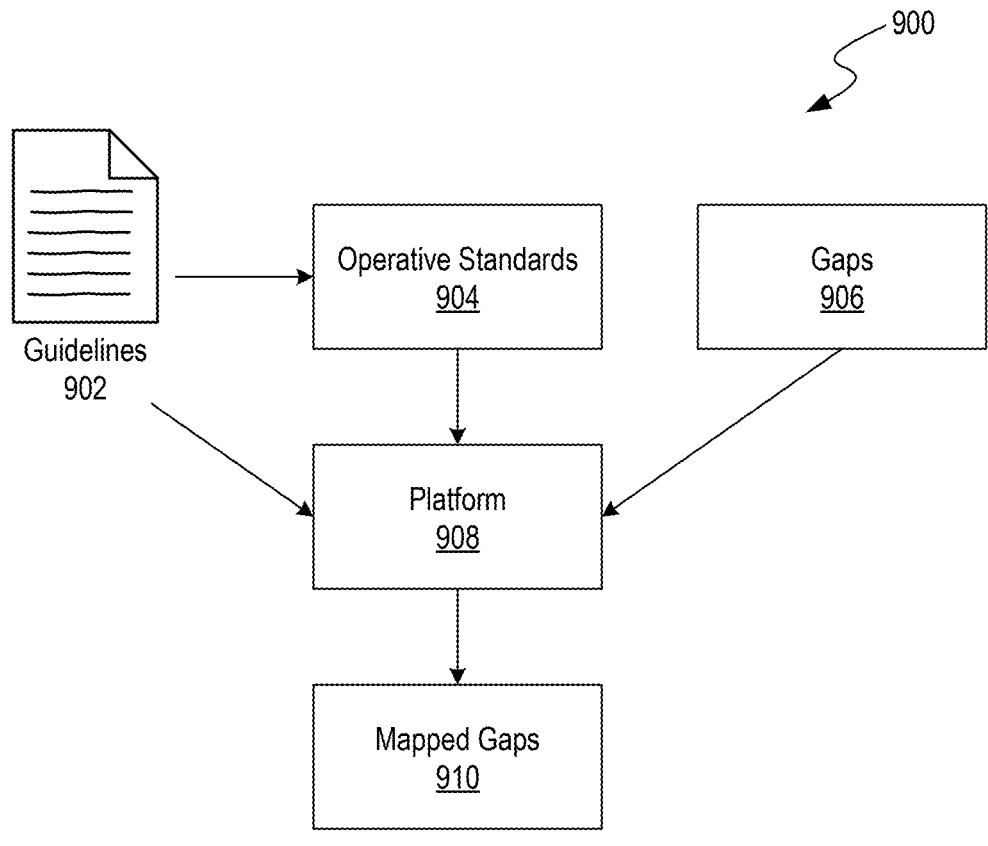

FIG. 9 is an illustrative diagram illustrating an example environment of the platform using guidelines and gaps in controls to generate mapped gaps, in accordance with some implementations of the present technology.

Figure 10:
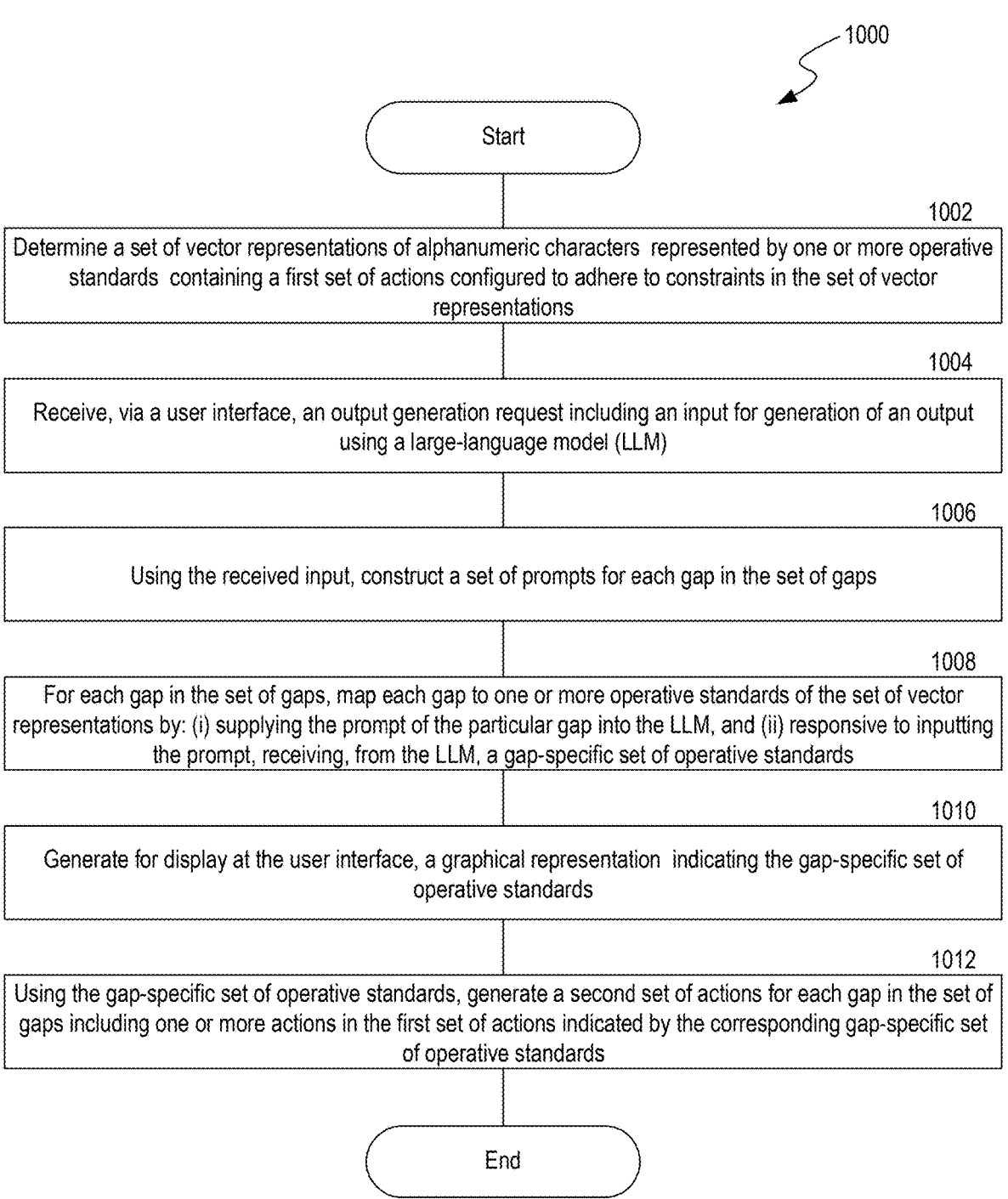

FIG. 10 is a flow diagram illustrating a process of mapping identified gaps in controls to operative standards, in accordance with some implementations of the present technology.

Figure 11:
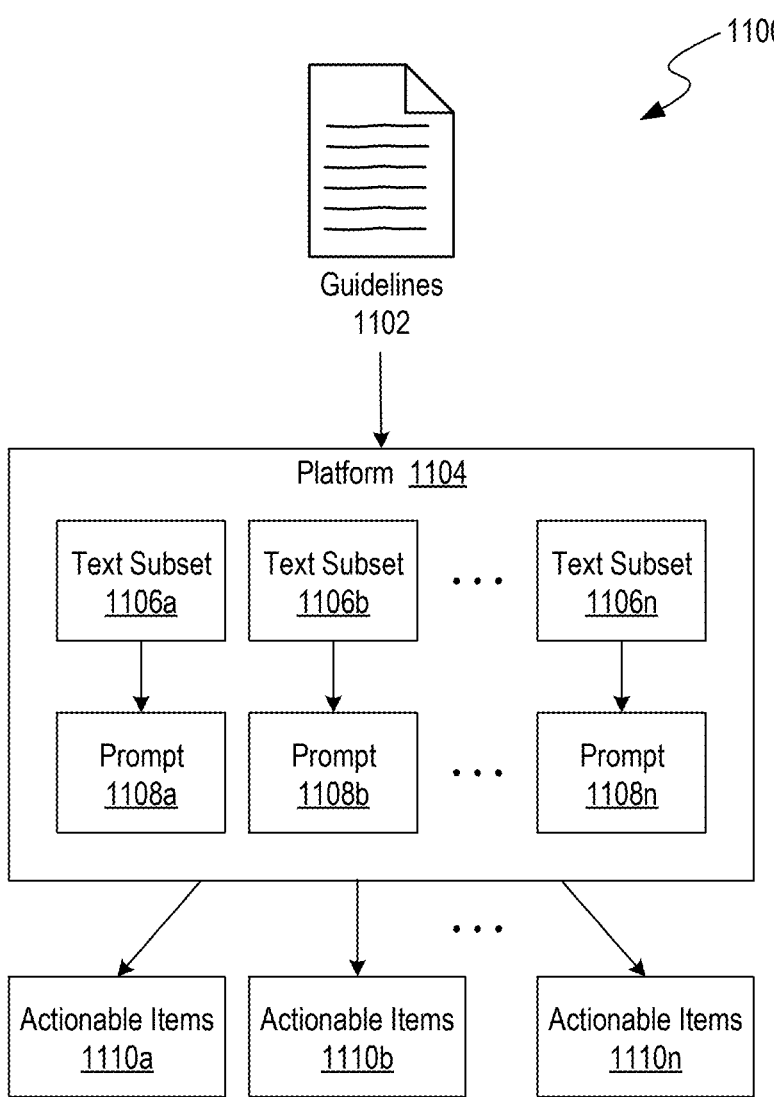

FIG. 11 is an illustrative diagram illustrating an example environment of the platform identifying actionable items from guidelines, in accordance with some implementations of the present technology.

Figure 12:
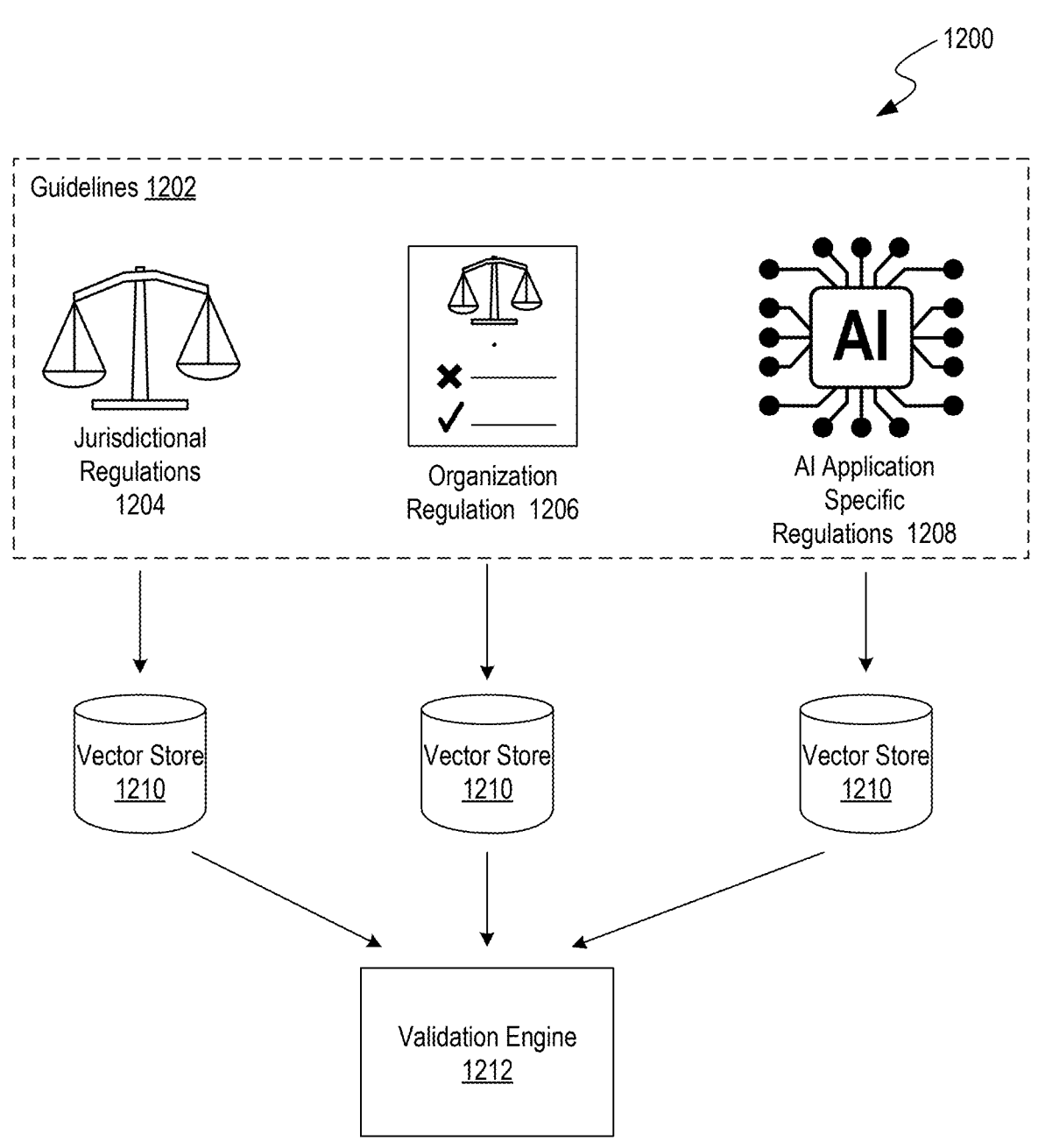

FIG. 12 is a block diagram illustrating an example environment for using the guidelines input into the validation engine for determining AI compliance, in accordance with some implementations of the present technology.

Figure 13:
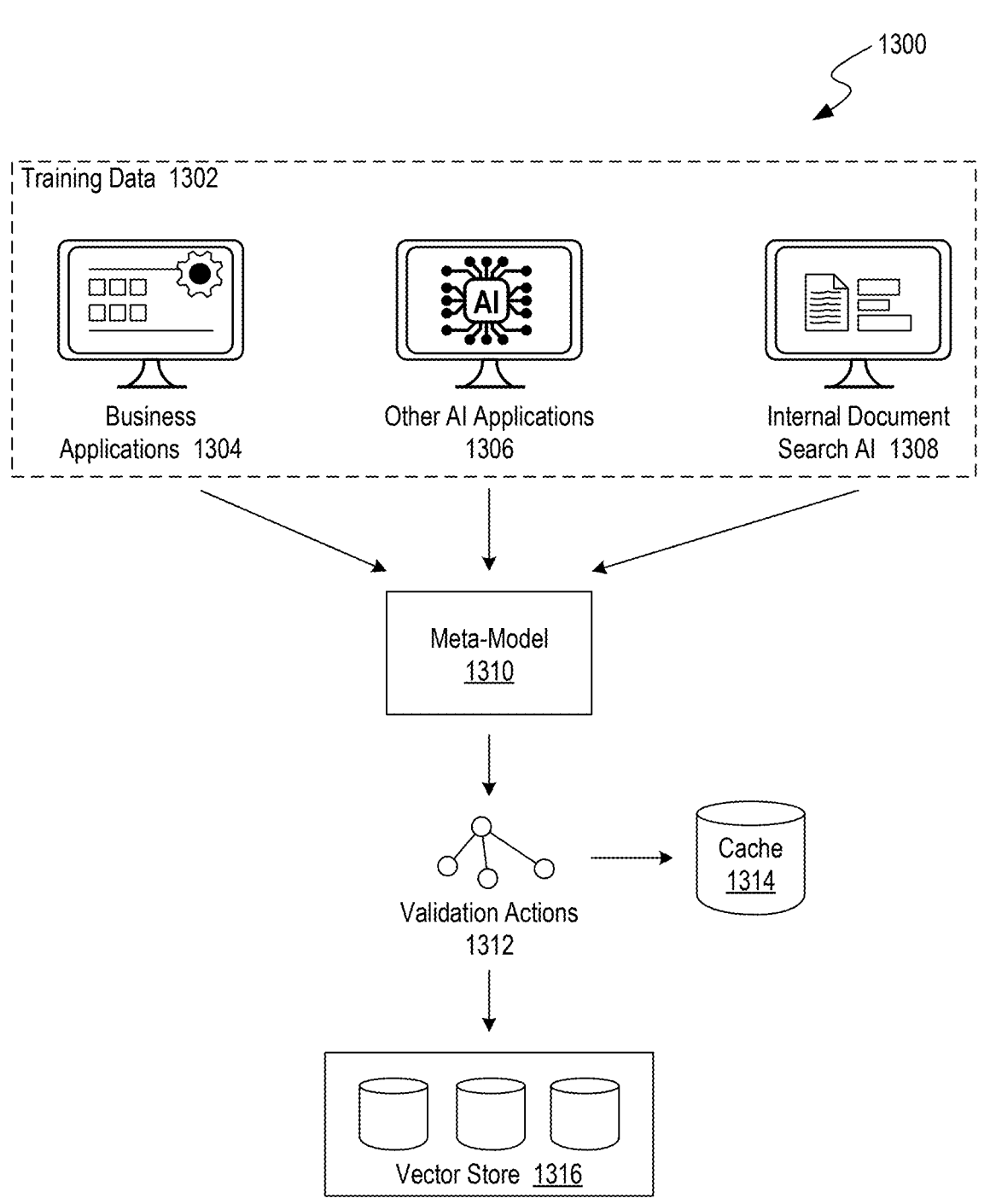

FIG. 13 is a block diagram illustrating an example environment for generating validation actions to determine AI model compliance, in accordance with some implementations of the present technology.

Figure 14:
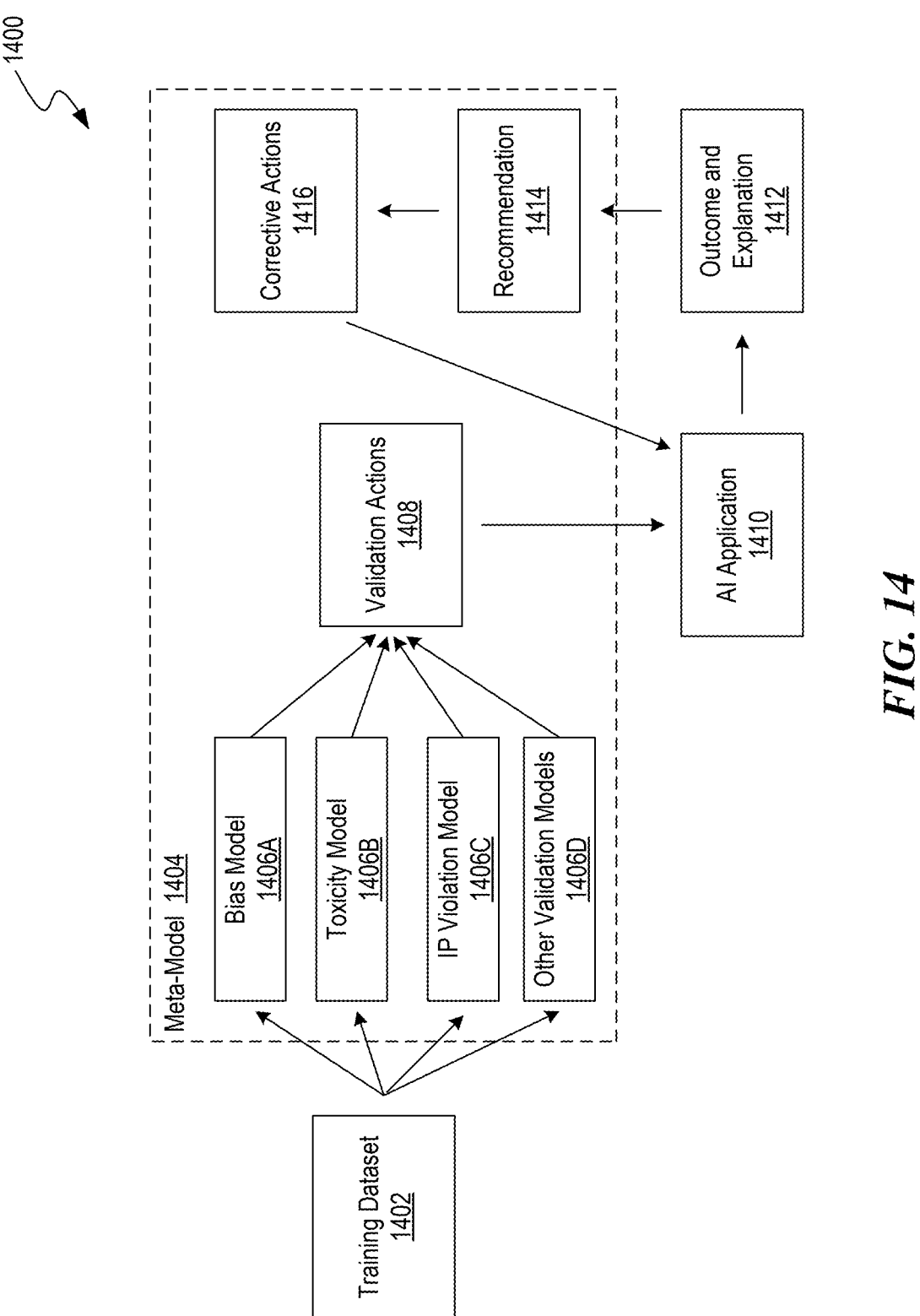

FIG. 14 is a block diagram illustrating an example environment for automatically implementing corrective actions on the AI model, in accordance with some implementations of the present technology.

Figure 15:
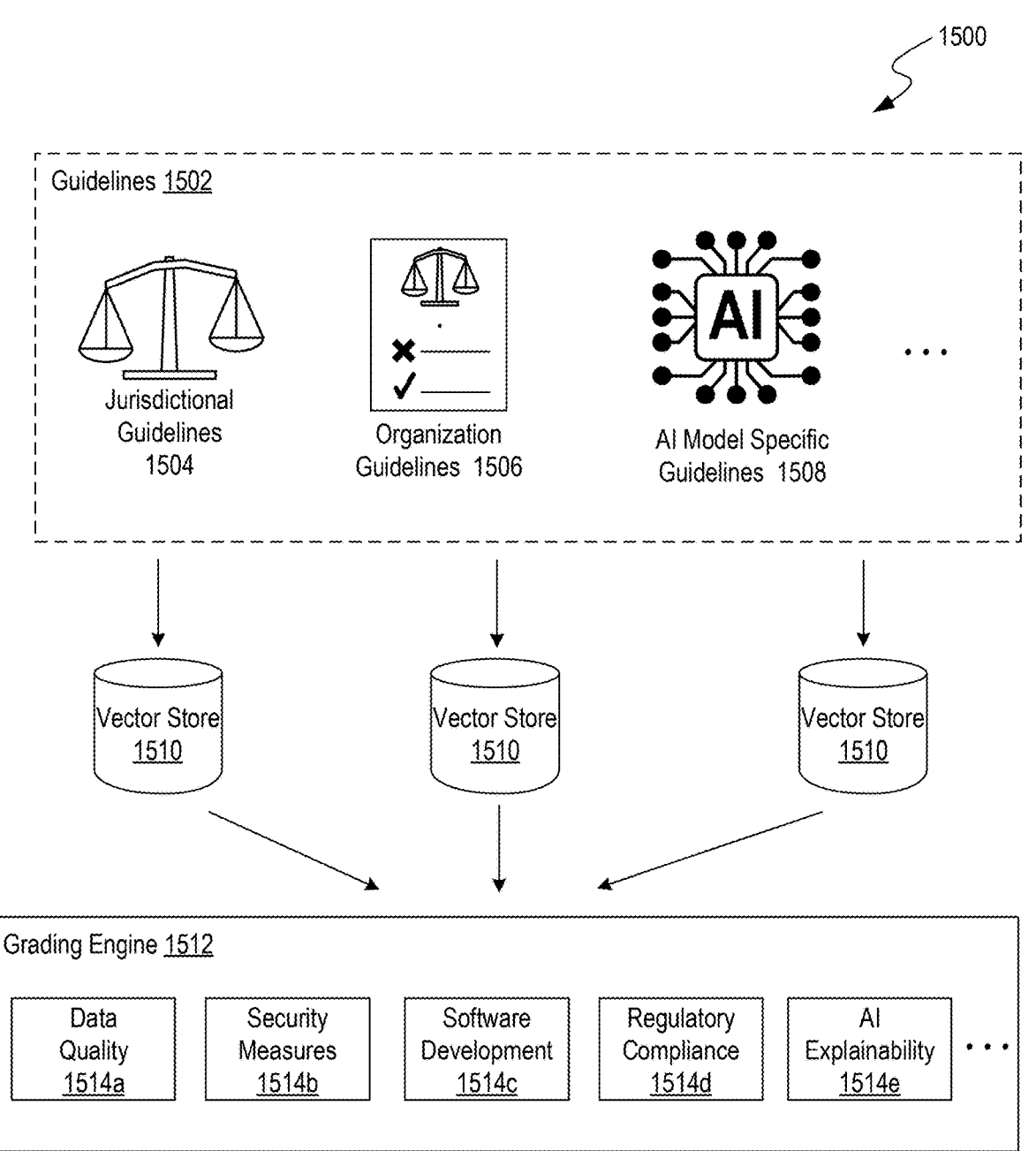

FIG. 15 is an illustrative diagram illustrating an example environment for grading an AI model using guidelines stored in a vector store.

Figure 16:
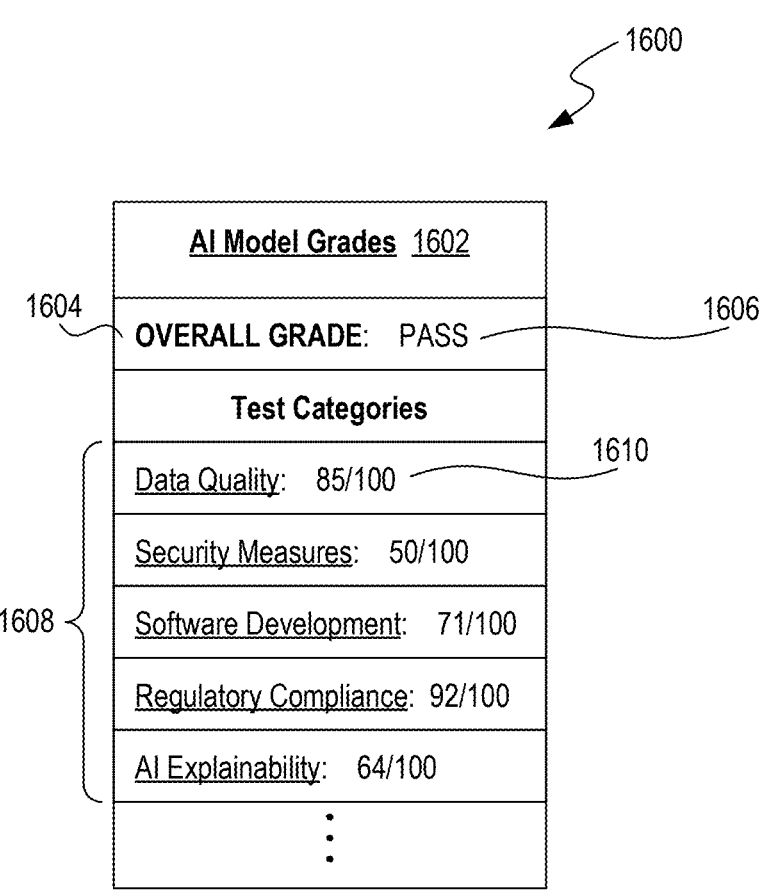

FIG. 16 is an illustrative diagram illustrating an example environment presenting application-domain-specific grades generated for an AI model.

Figure 17:
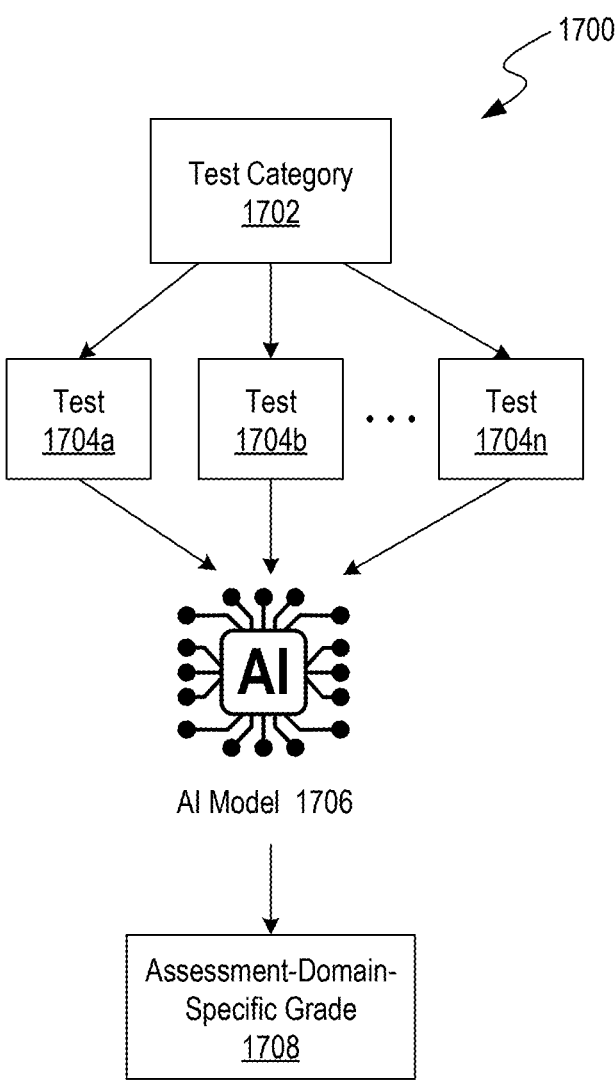

FIG. 17 is an illustrative diagram illustrating an example environment for assigning a grade to an AI model for a test category.

Figure 18:
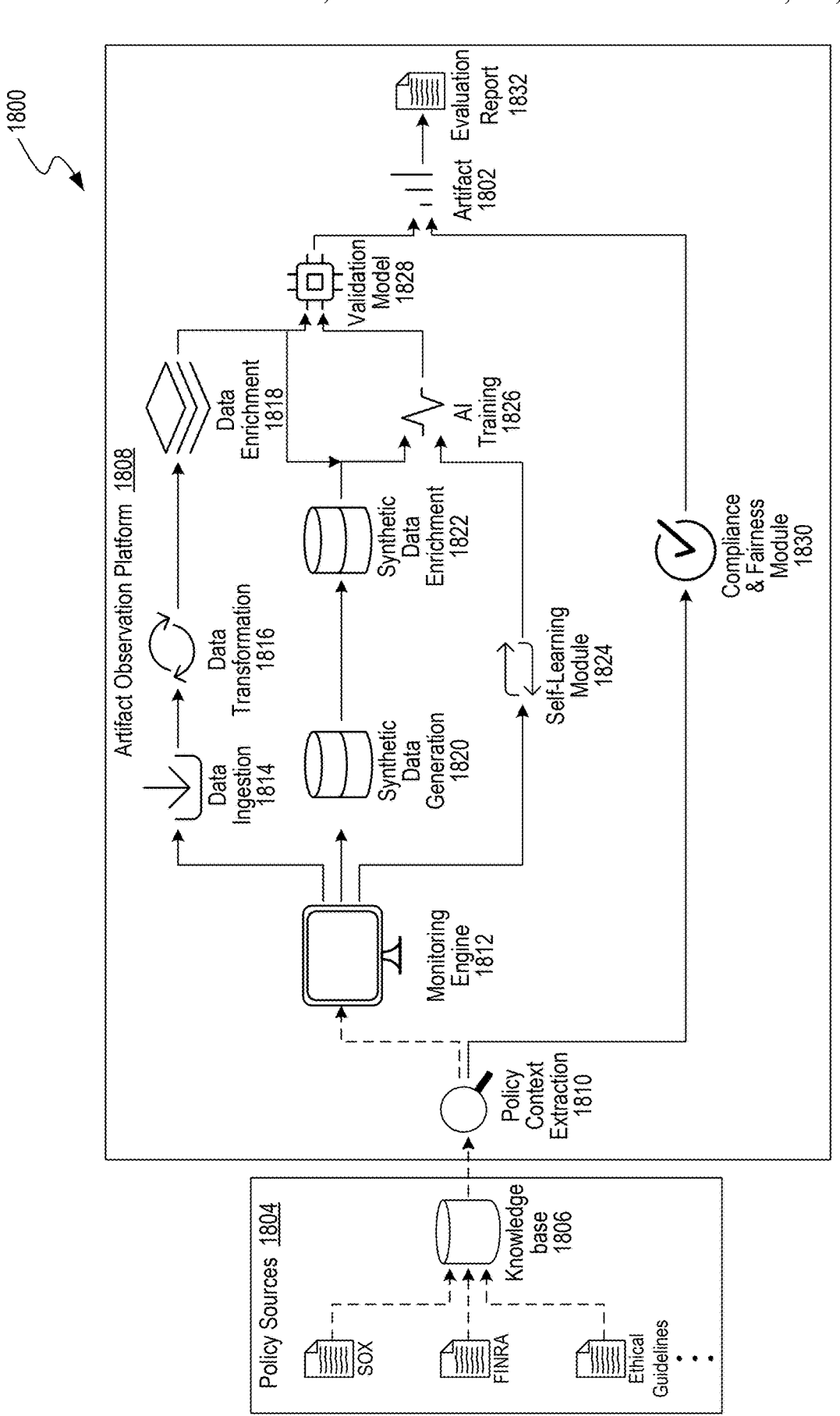

FIG. 18 is a block diagram illustrating an example environment for dynamic multi-model monitoring and validation of a generative artificial intelligence model.

Figure 19:
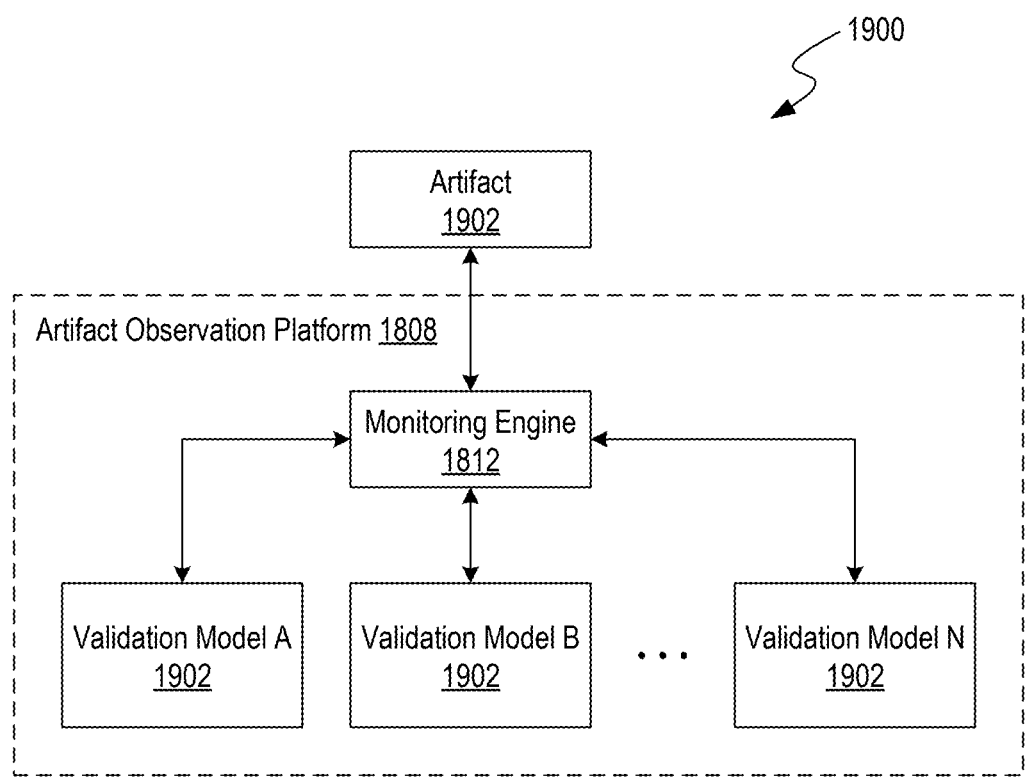

FIG. 19 is a block diagram illustrating an example architecture of the artifact observation platform of FIG. 18.

Figure 20:
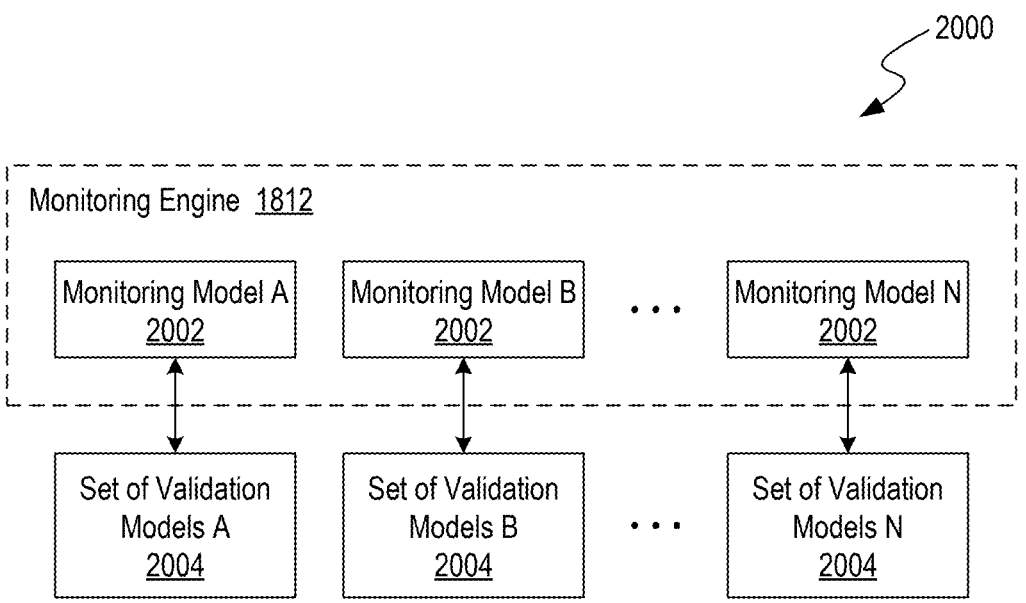

FIG. 20 is a block diagram illustrating an example architecture of a suite of monitoring models in the monitoring engine of FIG. 18.

FIG. 21 is a flow diagram illustrating a process of dynamic multi-model monitoring and validation of a generative artificial intelligence model.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the disclosed implementations. It will be appreciated, however, by those having skill in the art, that the implementations can be practiced without these specific details or with an equivalent arrangement. In other cases, well-known models and devices are shown in block diagram form in order to avoid unnecessarily obscuring the disclosed implementations. It should also be noted that the methods and systems disclosed herein are also suitable for applications unrelated to autonomous agent communication monitoring and control systems.

The disclosed technology provides a comprehensive framework for monitoring, analyzing, and controlling communications between autonomous AI agents in real-time. In particular, systems and methods described herein involve intercepting and recording communications between autonomous agents, translating these communications to standardized languages, implementing communication protocol filters to evaluate policy compliance, and performing modifications to ensure adherence to operational policies. Specifically, the present disclosure will be directed to using dynamic communication protocol filters that can parse and analyze messages to detect policy violations, advanced language processing capabilities to handle evolving agent communication methods, and distributed ledger technology to maintain immutable records of all communications and modifications. The system can implement these capabilities across different agent meshes, such as security-focused agent clusters and financial transaction processing clusters, enabling comprehensive oversight of both intra-mesh and inter-mesh communications.

Figure 1:
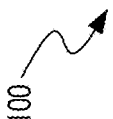
FIG. 1 illustrates an agent network including multiple agentic meshes, in accordance with some implementations of the present technology.

FIG. 1 illustrates an agent network 100 including multiple agentic meshes, in accordance with some implementations of the present technology. The agent network 100 demonstrates how autonomous agents can be organized and distributed within operational environments. For example, the data points in the agent network 100 can represent different autonomous agents operating within various domains or "galaxies" that form based on their functional requirements. In some implementations, these galaxies can represent service meshes where agents with similar operational purposes cluster together, such as payment processing agents or account management agents. In some implementations, agents initially exist in relatively unformed configurations but gradually coalesce into cohesive, agentic galaxies as AI systems analyze the operational universe and identify optimal groupings based on business domains and technical requirements.

In some implementations, system monitors, in real time, a series of communications between a plurality of autonomous agents operating within an operational environment. Real-time monitoring can include the continuous observation and analysis of communications as they occur without significant delay between the communication event and its detection by the monitoring system. For example, this monitoring can occur across different agent meshes, such as security-focused agent clusters and transaction processing clusters, enabling comprehensive oversight of both intra-mesh and inter-mesh communications. The operational environment can include distributed computing systems, cloud infrastructures, enterprise networks, or hybrid environments where autonomous agents perform various tasks including data processing, decision-making, and system management. In some implementations, autonomous agents are software entities designed to operate independently and make decisions without direct human intervention and programmed to perceive their environment, reason about their observations, and take actions to achieve specific goals. These agents can adapt to changing circumstances and learn from experience, making them useful in various domains such as robotics, artificial intelligence, and distributed computing systems.

FIG. 2 illustrates a network diagram 200 showing a distributed system of agents 202a-g and their connection to an Internet Domain Name System (DNS) infrastructure 204, in accordance with some implementations of the present technology. In some implementations, the network diagram 200 provides a more detailed view of one of the agent clusters or meshes that is represented as a grouping within the agent network 100 of FIG. 1. The network diagram 200 depicts the agents 202a-g arranged in a network structure, with agents connected to each other through various pathways. These interconnected agents can form a mesh-like network, demonstrating a distributed architecture where agents can communicate with each other through multiple paths. This network topology can provide redundancy and flexibility in the communication structure, allowing for robust information flow between agents. Each agent in the network can maintain a connection to the Internet DNS infrastructure 204. This arrangement can allow for information flow between the agents and provide connectivity to external internet services through the Internet DNS infrastructure 204. The DNS can map human-readable names to agent IP addresses or URLs, enabling agents to be connected to and located anywhere within the network or across the internet. The distributed nature of this agent network, coupled with the centralized DNS infrastructure, can allow for scalability, as new agents can be easily added to the network. The system can also provide fault tolerance, as the loss of one agent or communication path does not necessarily disrupt the entire network. Additionally, the DNS integration can facilitate easy discovery and addressing of agents, potentially simplifying the management and coordination of the distributed agent ecosystem.

In some implementations, the system organizes autonomous agents into clusters or meshes based on their functional domains, operational environments, or service categories. These meshes, which can be likened to galaxies in a universe of agents, enable more efficient monitoring by allowing agents to communicate more easily with other agents of similar types or operational contexts. For example, a manufacturing mesh can contain agents involved in production processes, while a logistics mesh can encompass agents handling supply chain operations. This clustering approach enables the monitoring system to apply domain-specific rules and detection patterns tailored to the unique characteristics and requirements of each mesh. As shown in FIG. 2, the network diagram 200 illustrates how agents can be arranged in a mesh-like network structure with connections to each other and to the Internet DNS infrastructure 204. In some implementations, agent 202g represents an outlier to the cluster or mesh of agents 202a-f. For example, agent 202g can perform specialized functions that do not clearly align with the primary operational domain of the mesh including agents 202a-f. Over time, as the system analyzes communication patterns, functional relationships, and operational requirements, agent 202g can gradually gravitate toward the mesh including agents 202a-f if its functions become more aligned with the domain of that mesh, or it can migrate toward a different mesh that better matches its operational characteristics. In some implementations, agent 202g can serve as the nucleus for forming a new mesh if sufficient numbers of similar outlier agents emerge with complementary functions.

The agentic mesh architecture provides several technical benefits that enhance the overall system's effectiveness and security. First, it implements a discoverability framework that enables agents to easily locate and interact with other agents possessing capabilities relevant to their tasks, significantly reducing the computational overhead associated with agent coordination. For example, an agent requiring data analysis capabilities can quickly identify and connect with specialized analysis agents within its mesh or across meshes with appropriate permissions. Second, the mesh architecture facilitates certifiability, allowing for systematic verification that agents comply with their defined purposes and operational constraints. This certification process creates a technical foundation for trust within the agent ecosystem by ensuring that each agent operates within its intended parameters.

Additionally, the mesh architecture significantly enhances observability by creating structured pathways and standardized interfaces through which monitoring systems can track agent activities and communications. This design enables more comprehensive and efficient monitoring compared to ad-hoc agent deployments. The mesh also facilitates interoperability protocols that enable agents to communicate using standardized languages and data formats, addressing the technical challenge of cross-agent communication that often plagues heterogeneous agent systems. For example, agents developed using different frameworks or programming languages can still exchange information effectively through the mesh's standardized communication interfaces.

Furthermore, the mesh architecture creates a stable, manageable, and resilient platform for agent operations. The modular design allows for individual agents to be updated, replaced, or temporarily removed without disrupting the entire system, enhancing overall system reliability. The mesh implements load balancing and redundancy mechanisms that distribute computational tasks across available resources and maintain system functionality even when individual agents fail. This resilience is particularly important in mission-critical applications where system downtime can have significant consequences. The structured nature of the mesh also simplifies governance and policy enforcement by providing clear boundaries and interfaces where security policies, access controls, and behavioral constraints can be systematically applied and verified.

The monitoring process for agents can include intercepting and recording each communication of a series of communications between agents. In some implementations, intercepting communications involves capturing messages, data transfers, or other forms of information exchange between autonomous agents as they occur in real time. For example, this can include capturing API calls, network packets, message queue transactions, or direct agent-to-agent communications protocols. Recording involves storing these intercepted communications in a persistent format that can be analyzed, audited, and referenced for compliance and security purposes. In some implementations, the system can intercept communications at various network layers, including application layer protocols, transport layer connections, or network layer routing. The interception process can be implemented through network taps, proxy servers, middleware components, or agent-embedded monitoring modules that capture communications without disrupting normal agent operations. This comprehensive recording capability provides visibility into agent interactions, enabling organizations to maintain oversight of autonomous agent behaviors and detect potential policy violations or security threats.

FIG. 3A illustrates a block diagram 300 of an autonomous agent, in accordance with some implementations of the present technology. In some implementations, agents can interact with each other and with other systems using different layers of the agent stack of each agent 302. For example, the agent stack can include a communications and APIs layer 304, a control and management layer 306, a learning and decisioning layer 308, and a run-time environment layer 310, enabling comprehensive monitoring across all aspects of agent functionality of each agent 302. For example, the communications and APIs layer 304 can facilitate agent interactions with external systems and other agents. Observation of the communications and APIs layer 304 enables monitoring and regulation of inter-agent communications, ensuring messages comply with established security policies. For example, at the communications and APIs layer 304, the system can inspect messages between a robotic assembly agent and other systems, detecting if the robotic assembly agent attempts to establish unauthorized connections to external networks for potential data exfiltration. The discovery, observability, and interactivity modules within this layer can provide critical points for monitoring agent communications and external interactions.

The control and management layer 306 manages the operational aspects of the agent, translating high-level decisions into specific actions. Observation of the control and management layer 306 allows observation of governance and operational control decisions, including monitoring sensors, actuators, and control services that log agent actions. The learning and decisioning layer 308 can incorporate a large language model (LLM) module, memory/metadata module, and learning mechanism module that collectively handle the agent's intelligence and decision-making capabilities. Observation of the learning and decisioning layer 308 enables evaluation of inference and decision-making. In some implementations, LLM components can include LLMs, SLMs, RAG procedures, fine-tuned models, or other types of models.

FIG. 3B illustrates a security control layer 320 with multiple tiers of security controls, in accordance with some implementations of the present technology. In some implementations, the security control layer 320 corresponds to one or more of the layers shown in FIG. 3A. The security control layer 320 includes multiple tiers of security controls, starting from client-facing controls at the top to microservices controls at the bottom. The security control layer 320 can apply to different security domains including Clients (Mobile and CBOL), Akamai, Neustar, Data Power (DMZ), Apigee-Router/MP (GRN), Platform Security Gateway, and microservices. Each section contains specific security controls and protection mechanisms such as session extension, malware detection, frame busting, output encoding, DDOS protection, trojan protection, SSL checks, token encryption, and network access control. The security control layer 320 implements various protection measures including cross-site scripting protection, device detection, JSON/XML validation, and sequence protection across different sections of the architecture. This multi-tiered security approach can be integrated with the communication monitoring system to provide comprehensive protection for autonomous agent communications, make it more likely that policy violations are detected and prevented at multiple levels of the system architecture.

FIG. 3C illustrates a network architecture diagram 340 showing layered network infrastructure design, in accordance with some implementations of the present technology. The network architecture diagram 340 shows multiple network segments arranged around a central DMZ (demilitarized zone) area containing Digital Apps and Systems of Record components. The system shown in the network architecture diagram 340 facilitates bidirectional traffic flows where requests originate from outside the network and flow inward through the architecture, while responses flow outward from internal systems back to external requestors. The network architecture diagram 340 shows API traffic flows that are both externally and internally sourced, with an Internet-based traffic layer handling consumer and B2B communications. The internal portions of the architecture include an Internal User Network and Internal Systems Network. The architecture shows a Common External Platform (CEP) and dedicated lines to 3rd party (Non-Cloud) systems. The architecture includes Cloud Service Providers Network Architecture (CSPNA) with dedicated lines to 3rd Party Cloud providers like AWS, GCP, Azure, and IBM, as well as PCF Open Shift PaaS capabilities. The network segments are logically separated by boundaries, and as traffic crosses each boundary, full service gateways are required for API traffic to ensure proper security controls and policy enforcement. The network segments maintain interconnectivity through the central DMZ, allowing for controlled access between the different zones of the architecture. This network architecture provides the infrastructure foundation for deploying autonomous agents across different environments while enabling the system to observe and control communications across all network segments and cloud platforms.

In some implementations, monitoring the series of communications further includes employing a transformer-based language model configured to automatically detect and translate communications that utilize novel or evolving AI agent languages. Transformer-based language models are advanced neural network architectures that excel at processing sequential data and understanding complex language patterns through attention mechanisms. These models can analyze communication patterns between autonomous agents and identify when agents are using non-standard, proprietary, or evolving communication protocols. For example, if autonomous agents develop their own shorthand communication methods or begin using encrypted or obfuscated messaging formats, the transformer-based model can detect these patterns and attempt to decode or translate them into understandable formats. The automatic detection capability enables the system to identify when agents are communicating using languages or protocols that were not previously known to the monitoring system. This is particularly important as autonomous agents can evolve their communication methods over time or develop new protocols for efficiency or security purposes. The translation capability enables even novel communication formats to be converted into standardized forms that can be analyzed by the monitoring system's policy filters and compliance mechanisms.

The system translates communications in the series of communications to a standardized language. Translation to a standardized language involves converting communications from their original format, protocol, nomenclature, or other language into a common, consistent format that can be uniformly processed by the monitoring system. Language can encompass not only traditional programming or natural languages, but also broader communication constructs including sets of nomenclature, formatting conventions, data structures, protocol specifications, messaging patterns, and any systematic approach to information exchange between autonomous agents. For example, this can involve converting proprietary agent communication protocols into standard formats like JSON or XML, translating natural language communications into structured data formats, normalizing different API call formats into consistent schemas, or standardizing agent-specific nomenclature and terminology into universally understood representations. The standardized language serves as a common denominator that enables consistent analysis across different types of agent communications regardless of their original format, nomenclature, or protocol conventions. In some implementations, this translation capability enables the system to handle communications that utilize novel or evolving AI agent languages, nomenclature systems, or formatting approaches through the use of transformer-based language models that can adapt to new communication patterns and terminology. The standardization process facilitates consistent analysis across different types of agent communications, increasing the likelihood that policy filters and compliance mechanisms can operate effectively regardless of the original communication format, nomenclature, or systematic approach used by the agents.

In some implementations, not all novel communications can be successfully translated into a standardized language, particularly when agents develop highly sophisticated or encrypted communication methods that resist conventional translation approaches. When novel communications cannot be successfully translated into a standardized language, for example, due to their complexity, encryption, or resistance to conventional translation methods, the system can implement comprehensive remediation strategies. These strategies include blocking untranslatable communications entirely to prevent potential policy violations, security threats, or unauthorized activities that could be concealed within the incomprehensible communication formats. In some implementations, the system can quarantine these novel communications in a secure environment where they can be subjected to additional analysis, manual review by security experts, or specialized decryption attempts while preventing them from reaching their intended destinations. In cases where the system can determine the legitimate operational purpose of the novel communication through contextual analysis or metadata examination, remediation can also include substitution strategies. For example, the untranslatable novel AI communication is replaced entirely with a functionally equivalent communication expressed in standardized language that accomplishes the same legitimate objective while accomplishing policy compliance and security oversight. This substitution approach maintains operational continuity while limiting the security risks associated with allowing untranslatable communications to proceed unchecked through the agent network.

The system implements, for communications translated to the standardized language, at least one communication protocol filter. In particular, the at least one communication protocol filter is configured to evaluate each communication based on predefined operational policies. Communication protocol filters are specialized software components that analyze standardized communications to determine compliance with organizational policies, security requirements, and operational constraints. These filters can examine various aspects of communications including content, metadata, timing, frequency, source and destination information, and communication patterns. Predefined operational policies are rules and guidelines established by organizations to govern how autonomous agents should communicate and behave within the operational environment. For example, policies can specify which agents are authorized to communicate with external systems, what types of data can be shared between different agent meshes, or what communication frequencies are considered normal versus potentially suspicious. The filters operate at the communications and APIs layer of the autonomous agent stack, enabling precise control over agent interactions and ensuring that all communications comply with established governance frameworks. The use of models searching for unusual behaviors can provide a powerful way of enforcing guidelines, as these models can identify anomalous patterns that are not explicitly covered by predefined rules but could indicate potential security threats or policy violations.

In some implementations, the at least one communication protocol filter includes hybrid violation detection using both a rule-based filter encoded with a declarative policy language and a machine learning-based model trained to score violation probability. Rule-based filters use explicit, predefined rules written in declarative policy languages to evaluate communications against specific criteria. For example, a rule can specify that agents in the security mesh are prohibited from communicating directly with agents in the transaction processing mesh without going through designated gateway agents. Declarative policy languages provide a structured way to express these rules in a format that can be automatically processed and enforced by the monitoring system. Machine learning-based models complement rule-based approaches by identifying patterns and anomalies that cannot be captured by explicit rules. These models are trained on historical communication data to learn what constitutes normal versus potentially problematic communication patterns. The violation probability scoring enables the system to assess the likelihood that a communication represents a policy violation even when it does not explicitly violate any specific rule. This hybrid approach combines the precision and interpretability of rule-based systems with the adaptability and pattern recognition capabilities of machine learning, providing comprehensive coverage for both known and unknown types of policy violations.

Using the at least one communication protocol filter, the system parses communications translated to the standardized language to determine whether communications violate at least one predefined operational policy. Parsing involves analyzing the structure, content, and metadata of communications to extract relevant information for policy evaluation.

For example, parsing can involve extracting sender and recipient information, analyzing message content for prohibited keywords or patterns, evaluating communication timing and frequency, or examining data payloads for sensitive information. The determination process involves comparing the parsed communication elements against the predefined operational policies to identify potential violations. This can include checking authorization levels, validating communication pathways, assessing content appropriateness, or detecting anomalous patterns that can indicate security threats or policy circumvention attempts. The parsing process operates on the standardized language format, ensuring consistent evaluation regardless of the original communication protocol or format used by the autonomous agents.

In some implementations, parsing communications further includes applying semantic analysis through natural language processing models for policy violation assessment. Semantic analysis involves understanding the meaning and context of communications beyond just their literal content or structure. Natural language processing models can analyze the intent, sentiment, and contextual meaning of communications to identify potential policy violations that cannot be apparent from simple keyword matching or rule-based analysis. For example, if autonomous agents are communicating about system modifications using euphemisms or indirect language to avoid detection, semantic analysis can identify the underlying intent even when the literal words do not explicitly violate any rules. These models can also understand context-dependent meanings where the same words can be acceptable in one context but problematic in another. The policy violation assessment through semantic analysis enables the system to detect sophisticated attempts to circumvent monitoring through obfuscation, coded language, or indirect communication methods that can otherwise evade traditional rule-based detection systems.

In some implementations, parsing communications further includes performing anomaly detection on message frequency, entropy, or known abuse patterns. Message frequency analysis involves monitoring the rate and timing of communications to identify unusual patterns that can indicate problematic behavior. For example, if an autonomous agent suddenly begins communicating at a much higher frequency than normal, this can indicate data exfiltration attempts, system compromise, or malfunction. Entropy analysis measures the randomness or information content of communications to detect encrypted, compressed, or obfuscated data that can be used to hide policy violations. High entropy in communications that normally contain structured, predictable data can indicate attempts to bypass content filtering through encryption or encoding. Known abuse pattern detection involves comparing communication characteristics against databases of previously identified malicious or policy-violating communication patterns. This can include patterns associated with data exfiltration, unauthorized system access, or agent coordination for prohibited activities. The anomaly detection capabilities enable the system to identify potentially harmful communications that cannot be caught by traditional rule-based approaches, providing an additional layer of protection against sophisticated evasion attempts.

In some implementations, the system employs techniques for identifying hidden communications embedded within otherwise innocent communications. For example, malicious content can be concealed within legitimate data structures or communication patterns that appear normal on the surface but contain encoded information. These identification techniques include analyzing statistical properties of communication data to detect anomalous patterns that indicate hidden content, examining metadata and timing patterns that deviate from expected norms, performing frequency analysis on message components to identify embedded signals, and using machine learning models trained to recognize subtle indicators of concealed information within seemingly benign communications. The system can detect least significant bit manipulation in data payloads, unusual spacing or formatting patterns in text communications, abnormal file size distributions, and covert channels established through timing variations or protocol field manipulation. Additionally, the system performs occasional testing of seemingly innocent communications by implementing replacement strategies, where the monitoring models create standardized language versions of the communications and interrupt the agent-to-agent communications with new approved communications designed to accomplish the identified legitimate purpose. The system can then observe the resulting outcomes to determine whether the original communications contained hidden or unauthorized elements. For example, if the system identifies a communication that appears to be a routine status update but can contain hidden instructions, it can generate a functionally equivalent status update in standardized language and substitute it for the original communication, then monitor whether the receiving agent's subsequent behavior differs from expected patterns. This testing approach enables the system to validate whether seemingly innocent communications are truly benign or whether they contain concealed directives that would alter agent behavior in unauthorized ways, providing a proactive method for detecting sophisticated evasion attempts that can otherwise go unnoticed through conventional analysis methods.

Based on determining that a particular communication translated to the standardized language violates the at least one predefined operational policy, the system performs one or more modifications to the particular communication to render the particular communication compliant with the at least one predefined operational policy. Modifications can include various types of interventions designed to address policy violations while preserving legitimate communication functionality where possible. For example, modifications can involve removing or redacting specific content elements that violate policies while allowing the remainder of the communication to proceed, replacing prohibited content with approved alternatives or adding additional metadata or routing information to ensure proper handling. The system can also modify message routing to direct communications through additional security controls or approval processes before delivery. In some implementations, modifications can include content transformation, such as converting sensitive data into anonymized or aggregated forms that comply with privacy policies while still enabling legitimate business functions. The goal of these modifications is to enable compliant communication while preventing policy violations from propagating through the agent network.

In some implementations, modifications can include blocking or quarantining the particular communication. Blocking involves completely preventing the communication from reaching its intended destination, effectively stopping the policy violation from occurring. This approach is typically used for communications that contain severe policy violations or security threats that cannot be remediated through content modification. Quarantining involves isolating the communication in a secure environment where it can be reviewed, analyzed, or processed by authorized personnel without allowing it to proceed to its original destination. Quarantined communications can be held for manual review, subjected to additional automated analysis, or processed through specialized security workflows. For example, communications containing potentially sensitive data can be quarantined pending approval from data governance teams, while communications exhibiting suspicious patterns can be quarantined for security analysis. Both blocking and quarantining serve as protective measures to prevent policy violations from impacting operations while providing opportunities for investigation and remediation of the underlying issues that caused the violations.

The system records, via a distributed ledger, the particular communication and the one or more modifications to the particular communication. Distributed ledger technology provides a decentralized method for recording and maintaining transaction records across multiple nodes in a network, creating immutable records that are synchronized across participating nodes and providing transparency and tamper resistance. Examples of distributed ledger implementations include blockchain networks and federated systems. Particular types of distributed ledger architectures can be employed based on specific organizational requirements. In this context, the distributed ledger maintains comprehensive records of all communications that violated policies and the specific modifications that were applied to address those violations. For example, the ledger can record the original communication content, the specific policy that was violated, the type of modification performed, the timestamp of the action, and the identity of the system components that performed the modification. This distributed ledger approach provides tamper-proof logging capabilities that support regulatory compliance and forensic analysis, enabling organizations to demonstrate that appropriate controls were in place and functioning correctly. The immutable record-keeping enables organizations to maintain comprehensive audit trails of all agent communications and policy enforcement actions, facilitating accountability and enabling continuous improvement of communication policies. These records can be used for compliance reporting, security investigations, system optimization, and policy refinement based on observed patterns of violations and successful remediation actions.

In some implementations, the system executes a smart contract to record, via the distributed ledger, the particular communication and the one or more modifications to the particular communication. Smart contracts are self-executing programs that automatically enforce predefined conditions and execute transactions when specific criteria are met, operating on the distributed ledger infrastructure without requiring manual intervention. The smart contract can be programmed with specific logic that triggers recording operations when policy violations are detected and modifications are performed on agent communications. For example, when the system determines that a communication violates operational policies and applies modifications such as content redaction or routing changes, the smart contract can automatically initiate a recording transaction that captures the original communication, the violation details, the modification type, and associated metadata. The smart contract can also implement validation rules to ensure that only authorized system components can record communication modifications and can include cryptographic verification mechanisms to maintain data integrity. Additionally, the smart contract can facilitate automated compliance reporting by executing predefined queries against the recorded data and generating audit reports when specific conditions are met, such as periodic compliance reviews or regulatory inquiries. This automated execution approach reduces the potential for human error in record-keeping while ensuring consistent and timely documentation of all policy enforcement activities across the autonomous agent network.

Other Implementations

Pre-existing LLMs and other generative machine learning models are promising for a variety of natural language processing and generation applications. In addition to generating human-readable, verbal outputs, pre-existing systems can leverage LLMs to generate technical content, including software code, architectures, or code patches based on user prompts, such as in the case of a data analysis or software development pipeline. Based on particular model architectures and training data used to generate or tune LLMs, such models can exhibit different performance characteristics, specializations, performance behaviors, and attributes.

However, users or services of pre-existing software development systems (e.g., data pipelines for data processing and model or application development) do not have intuitive, consistent, or reliable ways to select particular LLM models and/or design associated prompts in order to solve a given problem (e.g., to generate a desired code associated with a particular software application). As such, pre-existing systems risk selection of sub-optimal (e.g., relatively inefficient and/or insecure) generative machine learning models. Furthermore, pre-existing software development systems do not control access to various system resources or models. Moreover, pre-existing development pipelines do not validate outputs of the LLMs for security breaches in a context-dependent, and flexible manner. Code generated through an LLM can contain an error or a bug that can cause system instability (e.g., through loading the incorrect dependencies). Some generated outputs can be misleading or unreliable (e.g., due to model hallucinations or obsolete training data). Additionally or alternatively, some generated data (e.g., associated with natural language text) is not associated with the same severity of security risks. As such, pre-existing software development pipelines can require manual application of rules or policies for output validation depending on the precise nature of generated output, thereby leading to inefficiencies in data processing and application development.

The data generation platform disclosed herein enables dynamic evaluation of machine learning prompts for model selection, as well as validation of the resulting outputs, in order to improve the security, reliability, and modularity of data pipelines (e.g., software development systems). The data generation platform can receive a prompt from a user (e.g., a human-readable request relating to software development, such as code generation) and determine whether the user is authenticated based on an associated authentication token (e.g., as provided concurrently with the prompt). Based on the selected model, the data generation platform can determine a set of performance metrics (and/or corresponding values) associated with processing the requested prompt via the selected model. By doing so, the data generation platform can evaluate the suitability of the selected model (e.g., LLM) for generating an output based on the received input or prompt. The data generation platform can validate and/or modify the user's prompt according to a prompt validation model. Based on the results of the prompt validation model, the data generation platform can modify the prompt such that the prompt satisfies any associated validation criteria (e.g., through the redaction of sensitive data or other details) thereby mitigating the effect of potential security breaches, inaccuracies, or adversarial manipulation associated with the user's prompt.

The selected model(s) encounter further challenges with respect to the compliance of AI models with an array of vector constraints (e.g., guidelines, regulations, standards) related to ethical or regulatory considerations, such as protections against bias, harmful language, and intellectual property (IP) rights. For example, vector constraints can include requirements that require AI applications to produce outputs that are free from bias, harmful language, and/or IP rights violations to uphold ethical standards and protect users. Traditional approaches to regulatory compliance often involve manual interpretation of regulatory texts, followed by ad-hoc efforts to align AI systems with compliance requirements. However, the manual process is subjective, lacks scalability, and is error-prone, which makes the approach increasingly unsustainable in the face of growing guidelines and the rapid prevalence of AI applications.

As such, the inventors have further developed a system (e.g., within the data generation platform) to provide a systematic and automated approach to assess and ensure adherence to guidelines (e.g., preventing bias, harmful language, IP violations). The disclosed technology addresses the complexities of compliance for AI applications. In some implementations, the system uses a meta-model that consists of one or more models to analyze different aspects of AI-generated content. For example, one of the models can be trained to identify certain patterns (e.g., patterns indicative of bias) within the content by evaluating demographic attributes and characteristics present in the content. By quantifying biases within the training dataset, the system can effectively scan content for disproportionate associations with demographic attributes and provide insights into potential biases that can impact the fairness and equity of AI applications. In some implementations, the system generates actionable validation actions (e.g., test cases) that operate as input into the AI model for evaluating AI application compliance. The system evaluates the AI application against the set of validation actions and generates one or more compliance indicators and/or a set of actions based on comparisons between expected and actual outcomes and explanations. In some implementations, the system can incorporate a correction module that automates the process of implementing corrections to remove non-compliant content from AI models. The correction module adjusts the parameters of the AI model and/or updates training data based on the findings of the detection models to ensure that non-compliant content is promptly addressed and mitigated.

Unlike manual processes that rely on humans to interpret guidelines and assess compliance, the system can detect subtleties that traditional methods for content moderation often struggle to identify. The system can parse and analyze text data within the response of the AI model and identify nuanced expressions, connotations, and cultural references that can signal biased or harmful content. Additionally, by standardizing the validation criteria, the system establishes clear and objective criteria for assessing the content of an AI application, thereby minimizing the influence of individual biases or interpretations. The system can process large volumes of content rapidly and consistently, ensuring that all content is evaluated against the same set of standards and guidelines, reducing the likelihood of discrepancies or inconsistencies in enforcement decisions.

In cases where non-compliance is detected, conventional approaches to mapping gaps (e.g., issues) in controls (e.g., a set of expected actions) to operative standards (e.g., obligations, criteria, measures, principles, conditions) heavily rely on manually mapping each gap to one or more operative standards. Gaps represent situations where an expected control is either absent or not functioning properly, such as the failure to establish a specific framework within an organization. Operative standards contain controls that can be based on publications such as regulations, organizational guidelines, best practice guidelines, and others. Using manual processes heavily depends on individual knowledge and thus poses a significant risk for potential bias. This subjectivity can result in inconsistent mappings, as different individuals can understand and apply operative standards such as regulatory requirements in varied ways. Further, the sheer volume of identified gaps complicates traditional compliance efforts. Manually managing such a vast number of gaps is not only labor-intensive but also prone to oversights. Another significant disadvantage of traditional methods is the static nature of the mapping process. Conventional approaches often fail to account for the dynamic and evolving nature of regulatory requirements and organizational controls.

As such, the inventors have further developed a system (e.g., within the data generation platform) to use generative AI (e.g., GAI, GenAI, generative artificial intelligence) models, such as a large language model (LLM) in the above-described data generation platform, to map gaps in controls to corresponding operative standards. The system determines a set of vector representations of alphanumeric characters represented by one or more operative standards, which contain a first set of actions adhering to constraints in the set of vector representations. The system receives, via a user interface, an output generation request that includes an input with a set of gaps associated with scenarios failing to satisfy operative standards of the set of vector representations. Using the received input, the system constructs a set of prompts for each gap, where the set of prompts for a particular gap includes the set of attributes defining the scenario and the first set of actions of the operative standards. Each prompt can compare the corresponding gap against the first set of actions of the operative standards or the set of vector representations. For each gap, the system maps the gap to one or more operative standards of the set of vector representations by supplying the prompt into the LLM and, in response, receiving from the LLM a gap-specific set of operative standards that include the operative standards associated with the particular gap. The system, as compared to conventional approaches, reduces reliance on individual knowledge, thus minimizing personal biases and resulting in more uniform mappings across different individuals and teams. Additionally, the system can efficiently handle the large volumes of gaps that organizations face, significantly reducing the labor-intensive nature of manual reviews.

In another example, conventional approaches to identifying actionable items from guidelines present several challenges. Typically, conventional methods include either human reviewers or automated systems processing guidelines in a linear fashion. The conventional linear approach often leads to an overwhelming number of actionable items being identified. Furthermore, conventional approaches lack the ability to dynamically adapt to changes in guidelines over time. When new guidelines are introduced or existing ones are updated, conventional systems typically simply add new actionable items to ensure that the new actionable items are not redundant or contradictory to previously set actionable items. The conventional approach further fails to account for subtle shifts in interpretation that can arise from changes in definitions or regulatory language, potentially leading to outdated or irrelevant requirements remaining on the list. Consequently, organizations can end up with an inflated and confusing set of actionable items that do not accurately reflect the current landscape of the guidelines (e.g., the current regulatory landscape).

As such, the inventors have further developed a system (e.g., within the data generation platform) to use generative AI models, such as an LLM in the above-described data generation platform, to identify actionable items from guidelines. The system receives, from a user interface, an output generation request that includes an input for generating an output using an LLM. The guidelines are partitioned into multiple text subsets based on predetermined criteria, such as the length or complexity of each text subset. Using the partitioned guidelines, the system constructs a set of prompts for each text subset. Each text subset can be mapped to one or more actions in the first set of actions. Subsequent actions in this second set can be generated based on previous actions. The system generates a third set of actions by aggregating the corresponding second set of actions for each text subset. Unlike conventional linear processes that result in an overwhelming number of redundant actionable items, by heuristically analyzing guidelines, the system can identify common actionable items without the parsing through the guideline documents word by word. The disclosed system reduces the number of identified actionable items to only relevant actionable items. Moreover, the system's dynamic and context-aware nature allows the system to respond to changes in guidelines over time by reassessing and mapping shifts in actionable items as the shifts occur.

Even using a monitoring AI application to assess the compliance of monitored AI models (or any other artifact, such as a hardware asset or software asset), however, there is a risk of overfitting, where the monitored AI model becomes too tailored to the specific criteria and patterns identified by the monitoring AI application. The overfitting occurs when the monitored model excessively optimizes its performance to meet the compliance checks, potentially at the expense of the monitored model's broader generalization capabilities. For example, if a monitoring AI application specialized in detecting fraudulent transactions only focuses on specific patterns of known fraudulent activities, the monitored model can excel at flagging transactions that fit the specific patterns, but miss new types of fraud that do not match the specific patterns. As a result, the monitored model can perform well under the scrutiny of the monitoring application but fail to adapt to new, unforeseen scenarios or datasets that fall outside the predefined compliance criteria. Overfitting can lead to a false sense of security, where the model appears compliant and robust within the narrow scope of the monitoring application but is vulnerable to real-world variations and challenges.

In addition, relying on a single monitoring model or single group of monitoring models presents a significant vulnerability. Cyber attackers are becoming increasingly sophisticated, often exploiting the specific patterns and weaknesses of static models or groups of models. When an organization uses a single monitoring model or single group of monitoring models, it creates a predictable and uniform defense mechanism that cyber attackers can more easily understand and circumvent. The predictability allows cyber attackers to tailor their strategies to bypass the model's checks, leading to successful breaches and exploitation. Furthermore, a single monitoring model framework is not equipped to handle the diverse and evolving nature of cyber threats, leaving gaps in the security framework. The gaps can be exploited by attackers who continuously adapt their methods to outpace the static defenses.

Attempting to create a system to monitor and validate artifacts (e.g., model outputs) using not a single model framework, but instead a multi-model superstructure in view of the available conventional approaches created significant technological uncertainty. Creating such system required addressing several unknowns in conventional approaches in artifact validation, such as the integration of diverse models, ensuring interoperability among different models, and maintaining the accuracy and reliability of the validation process across different types of artifacts. Additionally, the system needed to adapt to the dynamic nature of regulatory requirements and integrate new compliance standards without compromising model performance. Conventional approaches in artifact validation did not provide methods of continuously learning and adapting to new regulatory changes and updates.

Conventional approaches rely on static models and periodic updates, which are insufficient in the face of rapidly evolving regulatory landscapes and emerging threats. The static models lacked the flexibility to incorporate real-time data and insights, leading to outdated compliance checks and increased vulnerability to non-compliance and fraud. Furthermore, conventional systems often depend on manual processes and static documentation, which are labor-intensive and prone to human error. The reliance on manual intervention not only slows down the validation process but also increases the risk of oversight and inaccuracies. As a result, organizations using conventional approaches struggle to maintain up-to-date compliance, leaving them exposed to regulatory penalties and reputational damage.

To overcome the technological uncertainties, the inventors systematically evaluated multiple design alternatives. For example, the inventors tested various methods for reducing overfitting on particular monitoring models and increasing the resilience of the monitoring models. For example, the inventors experimented with the periodic retraining and updating of the monitoring models to keep the models current with the latest data and threats. However, periodic training required a substantial amount of data and computational power to retrain the models regularly. Further, the inventors also explored ensemble methods, where multiple models were combined to improve detection accuracy and resilience. However, while ensemble methods showed some improvement in performance, ensemble methods introduced additional complexity and computational overhead.

Thus, the inventors experimented with different methods for integrating the monitoring model into a suite of models in the form of a multi-model superstructure. For example, the inventors tested various orchestration frameworks to manage the interactions between the monitoring models within the superstructure. For example, the inventors tested a centralized orchestration framework, where a single controller managed the flow of data and coordination between models. Another method tested was a decentralized peer-to-peer communication system, where models communicated directly with each other without a central controller. Further, the inventors tested various methods of improving the resilience of the multi-model superstructure by rotating the monitoring models, for example, at random or at predefined intervals.

As such, the inventors have developed a system (e.g., an engine within the data generation platform, a multi-model superstructure) for dynamic multi-model monitoring and validation of a generative artificial intelligence model. The system obtains artifacts, such as a model output generated using a first set of models, which can be within a multi-model superstructure itself. The multi-model superstructure includes a second set of models to test the first set of models. The multi-model superstructure dynamically routes the artifacts of the first set of models to one or more models of the second set of models (using, for example, a third set of models within the multi-model superstructure) by (i) determining a set of dimensions of the artifacts against which to evaluate the artifacts and (ii) identifying the models in the second set used to test the particular dimension. The second set of models assesses each artifact against a set of assessment metrics. If an artifact fails to meet one or more assessment metrics, the second set of models generates actions to align the artifact with the set of assessment metrics.

In some implementations, the system constructs the set of assessments by generating a set of seed assessments that test the particular dimension of the artifact against threshold values of the corresponding assessment metrics. The values of the artifact are compared with these threshold values, and a set of seed assessment results is generated, indicating the degree of satisfaction of the artifact with the threshold values. Based on the results, the system dynamically constructs a set of subsequent assessments to further evaluate the artifact. If an artifact fails to meet one or more assessment metrics, the second set of models generates actions to align the artifact with the set of assessment metrics. The actions can include suggestions for corrections to the artifact or first set of models, automatic adjustments to the artifact or first set of models, and/or feedback loops to the first set of models for retraining or fine-tuning.

Unlike conventional approaches that rely on static models and predefined rules, the system developed by the inventors reduces overfitting by frequently updating and changing (e.g., shuffling, switching, rotating) the models, ensuring that the monitored models do not become too specialized on a particular dataset and remain adaptable to new data. The changing of models can further mean that different monitoring models are used for different tasks over time, preventing any single model from becoming overly dominant and specialized. Further, the dynamic nature of the multi-model superstructure, where models are frequently updated and changed, makes it significantly harder for malicious actors to exploit vulnerabilities, as the attack surface is continuously shifting. The system can establish a predefined schedule to change the models in the second set, using time intervals or the number of output generation requests processed, ensuring that no single model remains static for too long. By continuously refreshing the monitoring models, the system creates a moving target for potential cyber threats.

While the current description provides examples related to LLMs, one of skill in the art can understand that the disclosed techniques can apply to other forms of machine learning or algorithms, including unsupervised, semi-supervised, supervised, and reinforcement learning techniques. For example, the disclosed data generation platform can evaluate model outputs from support vector machine (SVM), k-nearest neighbor (KNN), decision-making, linear regression, random forest, naïve Bayes, or logistic regression algorithms, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Overview of the Data Generation Platform

FIG. 4 shows an illustrative environment 400 for evaluating machine learning model inputs (e.g., language model prompts) and outputs for model selection and validation, in accordance with some implementations of the present technology. For example, the environment 400 includes the data generation platform 402, which is capable of communicating with (e.g., transmitting or receiving data to or from) a data node 404 and/or third-party databases 408a-408n via a network 450. The data generation platform 402 can include software, hardware, or a combination of both and can reside on a physical server or a virtual server (e.g., as described in FIG. 6) running on a physical computer system. For example, the data generation platform 402 can be distributed across various nodes, devices, or virtual machines (e.g., as in a distributed cloud server). In some implementations, the data generation platform 402 can be configured on a user device (e.g., a laptop computer, smartphone, desktop computer, electronic tablet, or another suitable user device). Furthermore, the data generation platform 402 can reside on a server or node and/or can interface with third-party databases 408a-408n directly or indirectly.

The data node 404 can store various data, including one or more machine learning models, prompt validation models, associated training data, user data, performance metrics and corresponding values, validation criteria, and/or other suitable data. For example, the data node 404 includes one or more databases, such as an event database (e.g., a database for storage of records, logs, or other information associated with LLM-related user actions), a vector database, an authentication database (e.g., storing authentication tokens associated with users of the data generation platform 402), a secret database, a sensitive token database, and/or a deployment database.

An event database can include data associated with events relating to the data generation platform 402. For example, the event database stores records associated with users' inputs or prompts for generation of an associated natural language output (e.g., prompts intended for processing using an LLM). The event database can store timestamps and the associated user requests or prompts. In some implementations, the event database can receive records from the data generation platform 402 that include model selections/determinations, prompt validation information, user authentication information, and/or other suitable information. For example, the event database stores platform-level metrics (e.g., bandwidth data, central processing unit (CPU) usage metrics, and/or memory usage associated with devices or servers associated with the data generation platform 402). By doing so, the data generation platform 402 can store and track information relating to performance, errors, and troubleshooting. The data generation platform 402 can include one or more subsystems or subcomponents. For example, the data generation platform 402 includes a communication engine 412, an access control engine 414, a breach mitigation engine 416, a performance engine 418, and/or a generative model engine 420.

A vector database can include data associated with vector embeddings of data. For example, the vector database includes a numerical representations (e.g., arrays of values) that represent the semantic meaning of unstructured data (e.g., text data, audio data, or other similar data). For example, the data generation platform 402 receives inputs such as unstructured data, including text data, such as a prompt, and utilize a vector encoding model (e.g., with a transformer or neural network architecture) to generate vectors within a vector space that represents meaning of data objects (e.g., of words within a document). By storing information within a vector database, the data generation platform 402 can represent inputs, outputs, and other data in a processable format (e.g., with an associated LLM), thereby improving the efficiency and accuracy of data processing.

An authentication database can include data associated with user or device authentication. For example, the authentication database includes stored tokens associated with registered users or devices of the data generation platform 402 or associated development pipeline. For example, the authentication database stores keys (e.g., public keys that match private keys linked to users and/or devices). The authentication database can include other user or device information (e.g., user identifiers, such as usernames, or device identifiers, such as medium access control (MAC) addresses). In some implementations, the authentication database can include user information and/or restrictions associated with these users.

A sensitive token (e.g., secret) database can include data associated with secret or otherwise sensitive information. For example, secrets can include sensitive information, such as application programming interface (API) keys, passwords, credentials, or other such information. For example, sensitive information includes personally identifiable information (PII), such as names, identification numbers, or biometric information. By storing secrets or other sensitive information, the data generation platform 402 can evaluate prompts and/or outputs to prevent breaches or leakage of such sensitive information.

A deployment database can include data associated with deploying, using, or viewing results associated with the data generation platform 402. For example, the deployment database can include a server system (e.g., physical or virtual) that stores validated outputs or results from one or more LLMs, where such results can be accessed by the requesting user.

The data generation platform 402 can receive inputs (e.g., prompts), training data, validation criteria, and/or other suitable data from one or more devices, servers, or systems. The data generation platform 402 can receive such data using communication engine 412, which can include software components, hardware components, or a combination of both. For example, the communication engine 412 includes or interfaces with a network card (e.g., a wireless network card and/or a wired network card) that is associated with software to drive the card and enables communication with network 450. In some implementations, the communication engine 412 can also receive data from and/or communicate with the data node 404, or another computing device. The communication engine 412 can communicate with the access control engine 414, the breach mitigation engine 416, the performance engine 418, and the generative model engine 420.

In some implementations, the data generation platform 402 can include the access control engine 414. The access control engine 414 can perform tasks relating to user/device authentication, controls, and/or permissions. For example, the access control engine 414 receives credential information, such as authentication tokens associated with a requesting device and/or user. In some implementations, the access control engine 414 can retrieve associated stored credentials (e.g., stored authentication tokens) from an authentication database (e.g., stored within the data node 404). The access control engine 414 can include software components, hardware components, or a combination of both. For example, the access control engine 414 includes one or more hardware components (e.g., processors) that are able to execute operations for authenticating users, devices, or other entities (e.g., services) that request access to an LLM associated with the data generation platform 402. The access control engine 414 can directly or indirectly access data, systems, or nodes associated with the third-party databases 408a-408n and can transmit data to such nodes. Additionally or alternatively, the access control engine 414 can receive data from and/or send data to the communication engine 412, the breach mitigation engine 416, the performance engine 418, and/or the generative model engine 420.

The breach mitigation engine 416 can execute tasks relating to the validation of inputs and outputs associated with the LLMs. For example, the breach mitigation engine 416 validates inputs (e.g., prompts) to prevent sensitive information leakage or malicious manipulation of LLMs, as well as validate the security or safety of the resulting outputs. The breach mitigation engine 416 can include software components (e.g., modules/virtual machines that include prompt validation models, performance criteria, and/or other suitable data or processes), hardware components, or a combination of both. As an illustrative example, the breach mitigation engine 416 monitors prompts for the inclusion of sensitive information (e.g., PII), or other forbidden text, to prevent leakage of information from the data generation platform 402 to entities associated with the target LLMs. The breach mitigation engine 416 can communicate with the communication engine 412, the access control engine 414, the performance engine 418, the generative model engine 420, and/or other components associated with the network 450 (e.g., the data node 404 and/or the third-party databases 408a-408n).

The performance engine 418 can execute tasks relating to monitoring and controlling performance of the data generation platform 402 (e.g., or the associated development pipeline). For example, the performance engine 418 includes software components (e.g., performance monitoring modules), hardware components, or a combination thereof. To illustrate, the performance engine 418 can estimate performance metric values associated with processing a given prompt with a selected LLM (e.g., an estimated cost or memory usage). By doing so, the performance engine 418 can determine whether to allow access to a given LLM by a user, based on the user's requested output and the associated estimated system effects. The performance engine 418 can communicate with the communication engine 412, the access control engine 414, the performance engine 418, the generative model engine 420, and/or other components associated with the network 450 (e.g., the data node 404 and/or the third-party databases 408a-408n).

The generative model engine 420 can execute tasks relating to machine learning inference (e.g., natural language generation based on a generative machine learning model, such as an LLM). The generative model engine 420 can include software components (e.g., one or more LLMs, and/or API calls to devices associated with such LLMs), hardware components, and/or a combination thereof. To illustrate, the generative model engine 420 can provide users' prompts to a requested, selected, or determined model (e.g., LLM) to generate a resulting output (e.g., to a user's query within the prompt). As such, the generative model engine 420 enables flexible, configurable generation of data (e.g., text, code, or other suitable information) based on user input, thereby improving the flexibility of software development or other such tasks. The generative model engine 420 can communicate with the communication engine 412, the access control engine 414, the performance engine 418, the generative model engine 420, and/or other components associated with the network 450 (e.g., the data node 404 and/or the third-party databases 408a-408n).

Engines, subsystems, or other components of the data generation platform 402 are illustrative. As such, operations, subcomponents, or other aspects of particular subsystems of the data generation platform 402 can be distributed, varied, or modified across other engines. In some implementations, particular engines can be deprecated, added, or removed. For example, operations associated with breach mitigation are performed at the performance engine 418 instead of at the breach mitigation engine 416.

Suitable Computing Environments for the Data Generation Platform

FIG. 5 shows a block diagram showing some of the components typically incorporated in at least some of the computer systems and other devices 500 on which the disclosed system (e.g., the data generation platform 402) operates in accordance with some implementations of the present technology. In various implementations, these computer systems and other device(s) 500 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 504, including keyboards, microphones, image sensors, touch screens, buttons, track pads, mice, compact disc (CD) drives, digital video disc (DVD) drives, 3.5 mm input jack, High-Definition Multimedia Interface (HDMI) input connections, Video Graphics Array (VGA) input connections, Universal Serial Bus (USB) input connections, or other computing input components; output components 506, including display screens (e.g., liquid crystal displays (LCDs), organic light-emitting diodes (OLEDs), cathode ray tubes (CRTs), etc.), speakers, 3.5 mm output jack, lights, light emitting diodes (LEDs), haptic motors, or other output-related components; processor(s) 508, including a CPU for executing computer programs, a GPU for executing computer graphic programs and handling computing graphical elements; storage(s) 510, including at least one computer memory for storing programs (e.g., application(s) 512, model(s) 514, and other programs) and data while they are being used, including the facility and associated data, an operating system including a kernel, and device drivers; a network connection component(s) 516 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 518, such as a hard drive or flash drive for persistently storing programs and data; and computer-readable media drives 520 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility can be implemented using devices of various types and configurations and having various components.

FIG. 6 is a system diagram illustrating an example of a computing environment 600 in which the disclosed system operates in some implementations of the present technology. In some implementations, environment 600 includes one or more client computing devices 602a-602d, examples of which can host graphical user interfaces associated with client devices. For example, one or more of the client computing devices 602a-602d includes user devices and/or devices associated with services requesting responses to queries from LLMs. Client computing devices 602 operate in a networked environment using logical connections through network 604 (e.g., the network 450) to one or more remote computers, such as a server computing device (e.g., a server system housing the data generation platform 402 of FIG. 4). In some implementations, client computing devices 602 can correspond to device 500 (FIG. 5).

In some implementations, server computing device 606 is an edge server that receives client requests and coordinates fulfillment of those requests through other servers, such as server computing devices 610a-610c. In some implementations, server computing devices 606 and 610 include computing systems. Though each server computing device 606 and 610 is displayed logically as a single server, server computing devices can each be a distributed computing environment encompassing multiple computing devices located at the same or at geographically disparate physical locations. In some implementations, each server computing device 610 corresponds to a group of servers.

Client computing devices 602 and server computing devices 606 and 610 can each act as a server or client to other server or client devices. In some implementations, server computing devices (606, 610a-610c) connect to a corresponding database (608, 612a-612c). For example, the corresponding database includes a database stored within the data node 404 (e.g., a sensitive token database, an event database, or another suitable database). As discussed above, each server computing device 610 can correspond to a group of servers, and each of these servers can share a database or can have its own database (and/or interface with external databases, such as third-party databases 408a-408n). In addition to information described concerning the data node 404 of FIG. 4, databases 608 and 612 can warehouse (e.g., store) other suitable information, such as sensitive or forbidden tokens, user credential data, authentication data, graphical representations, code samples, system policies or other policies, templates, computing languages, data structures, software application identifiers, visual layouts, computing language identifiers, mathematical formulae (e.g., weighted average, weighted sum, or other mathematical formulas), graphical elements (e.g., colors, shapes, text, images, multimedia), system protection mechanisms (e.g., prompt validation model parameters or criteria), software development or data processing architectures, machine learning models, AI models, training data for AI/machine learning models, historical information, or other information.

Though databases 608 and 612 are displayed logically as single units, databases 608 and 612 can each be a distributed computing environment encompassing multiple computing devices, can be located within their corresponding server, or can be located at the same or at geographically disparate physical locations.

Network 604 (e.g., corresponding to the network 450) can be a local area network (LAN) or a wide area network (WAN) but can also be other wired or wireless networks. In some implementations, network 604 is the Internet or some other public or private network. Client computing devices 602 are connected to network 604 through a network interface, such as by wired or wireless communication. While the connections between server computing device 606 and server computing device 610 are shown as separate connections, these connections can be any kind of LAN, WAN, wired network, or wireless network, including network 604 or a separate public or private network.

Example Implementations of Models in the Data Generation Platform

FIG. 7 shows a diagram of an AI model, in accordance with some implementations of the present technology. AI model 700 is shown. In some implementations, AI model 700 can be any AI model. In some implementations, AI model 700 can be part of, or work in conjunction with, server computing device 606 (FIG. 6). For example, server computing device 606 can store a computer program that can use information obtained from AI model 700, provide information to AI model 700, or communicate with AI model 700. In other implementations, AI model 700 can be stored in database 608 and can be retrieved by server computing device 606 to execute/process information related to AI model 700, in accordance with some implementations of the present technology.

In some implementations, AI model 700 can be a machine learning model 702. Machine learning model 702 can include one or more neural networks or other machine learning models. As an example, neural networks can be based on a large collection of neural units (or artificial neurons). Neural networks can loosely mimic the manner in which a biological brain works (e.g., via large clusters of biological neurons connected by axons). Each neural unit of a neural network can be connected with many other neural units of the neural network. Such connections can be enforcing or inhibitory in their effect on the activation state of connected neural units. In some implementations, each individual neural unit can have a summation function that combines the values of all its inputs together. In some implementations, each connection (or the neural unit itself) can have a threshold function such that the signal must surpass the threshold before it propagates to other neural units. These neural network systems can be self-learning and trained, rather than explicitly programmed, and can perform significantly better in certain areas of problem solving, as compared to traditional computer programs. In some implementations, neural networks can include multiple layers (e.g., where a signal path traverses from front layers to back layers). In some implementations, backpropagation techniques can be utilized by the neural networks, where forward stimulation is used to reset weights on the "front" neural units. In some implementations, stimulation and inhibition for neural networks can be more free-flowing, with connections interacting in a more chaotic and complex fashion.

As an example, with respect to FIG. 7, machine learning model 702 can take inputs 704 and provide outputs 706. In one use case, outputs 706 can be fed back to machine learning model 702 as input to train machine learning model 702 (e.g., alone or in conjunction with user indications of the accuracy of outputs 706, labels associated with the inputs, or other reference feedback information). In another use case, machine learning model 702 can update its configurations (e.g., weights, biases, or other parameters) based on its assessment of its prediction (e.g., outputs 706) and reference feedback information (e.g., user indication of accuracy, reference labels, or other information). In another use case, where machine learning model 702 is a neural network, connection weights can be adjusted to reconcile differences between the neural network's prediction and the reference feedback. In a further use case, one or more neurons (or nodes) of the neural network can require that their respective errors are sent backward through the neural network to them to facilitate the update process (e.g., backpropagation of error). Updates to the connection weights can, for example, be reflective of the magnitude of error propagated backward after a forward pass has been completed. In this way, for example, the machine learning model 702 can be trained to generate better predictions.

As an example, where the prediction models include a neural network, the neural network can include one or more input layers, hidden layers, and output layers. The input and output layers can respectively include one or more nodes, and the hidden layers can each include a plurality of nodes. When an overall neural network includes multiple portions trained for different objectives, there may or may not be input layers or output layers between the different portions. The neural network can also include different input layers to receive various input data. Also, in differing examples, data can be input to the input layer in various forms, and in various dimensional forms input to respective nodes of the input layer of the neural network. In the neural network, nodes of layers other than the output layer are connected to nodes of a subsequent layer through links for transmitting output signals or information from the current layer to the subsequent layer, for example. The number of the links can correspond to the number of the nodes included in the subsequent layer. For example, in adjacent fully connected layers, each node of a current layer can have a respective link to each node of the subsequent layer, noting that in some examples such full connections can later be pruned or minimized during training or optimization. In a recurrent structure, a node of a layer can be again input to the same node or layer at a subsequent time, while in a bi-directional structure, forward and backward connections can be provided. The links are also referred to as connections or connection weights, referring to the hardware-implemented connections or the corresponding "connection weights" provided by those connections of the neural network. During training and implementation, such connections and connection weights can be selectively implemented, removed, and varied to generate or obtain a resultant neural network that is thereby trained and that can be correspondingly implemented for the trained objective, such as for any of the above example recognition objectives.

Mapping Gaps in Controls to Operative Standards Using the Data Generation Platform FIG. 8 is an illustrative diagram illustrating an example environment 800 of a platform for automatically managing guideline compliance, in accordance with some implementations of the present technology. Environment 800 includes user 802, platform 804, data provider 806, AI model proxy 808, LLM 810, data cache 812, prompt store 814, and execution store log 816. Platform 804 is implemented using components of example devices 500 and computing devices 602 illustrated and described in more detail with reference to FIG. 5 and FIG. 6, respectively. Likewise, implementations of example environment 800 can include different and/or additional components or can be connected in different ways.

User 802 interacts with the platform 804 via, for example, a user interface. Platform 804 can be the same as or similar to data generation platform 402 with reference to FIG. 4. Users 802 can input data, configure compliance parameters, and manage guideline compliance performance through an intuitive interface provided by the platform. The platform 804 can perform a variety of compliance management tasks, such as compliance checks and regulatory analyses.

Data provider 806 supplies the platform 804 with the data used in the management, which can include regulatory guidelines, compliance requirements, organizational guidelines, and other relevant information. The data supplied by data provider 806 can be accessed via an application programming interface (API) or database that contains policies, obligations, and/or controls in operative standards. In some implementations, the data supplied by data provider 806 contains the publications (e.g., regulatory guidelines, compliance requirements, organizational guidelines) themselves. The structured repository of data provider 806 allows platform 804 to efficiently retrieve and use the data in different management processes. In some implementations, data provider 806 includes existing mappings associated with the operative standards. For example, the pre-established mappings can be between the operative standards and gaps (e.g., issues). In another example, the pre-established mappings can be between the operative standards and publications. Using the existing relationships, the platform 804 can more efficiently map particular identified gaps to the relevant operative standards. For example, if a newly identified gap is similar to or the same as a previously identified gap (e.g., shares similar scenario attributes, metadata tags) within the pre-existing mappings, the platform 804 can use the pre-existing mapping of the previously identified gap to more easily identify the mapping for the newly identified gap.

AI model proxy 808 is an intermediary between the platform and the large language model (LLM) 810. AI model proxy 808 facilitates the communication and data exchange between the platform 804 and the LLM 810. AI model proxy 808, in some implementations, operates as a plugin to interconnect the platform 804 and the LLM 810. The AI model proxy 808, in some implementations, includes distinct modules, such as data interception, inspection, or action execution. In some implementations, containerization methods such as Docker are used within the AI model proxy 808 to ensure uniform deployment across environments and minimize dependencies. LLM 810 analyzes data input by user 802 and data obtained from data provider 806 to identify patterns and generate compliance-related outputs. The AI model proxy 808, in some implementations, enforces access control policies to safeguard sensitive data and functionalities exposed to the LLM 810. For example, the AI model proxy 808 can sanitize the data received from the platform 804 using encryption standards, token-based authentication, and/or role-based access controls (RBAC) to protect sensitive information. The data received can be encrypted to ensure that all sensitive information is transformed into an unreadable format, accessible only through decryption with the appropriate keys. Token-based authentication can be used by generating a unique token for each user session or transaction. The token acts as a digital identifier by verifying the user's identity and granting access to specific data or functions within the system. Additionally, RBACs can restrict data access based on the user's role within the organization. Each role can be assigned specific permissions to ensure that users only access data relevant to the users' responsibilities.

In some implementations, AI model proxy 808 employs content analysis to discern between the sensitive and non-sensitive by identifying specific patterns, keywords, or formats indicative of sensitive information. In some implementations, the list of indicators of sensitive information is generated by an internal generative AI model within the platform 804 (e.g., with a command set that resembles "generate a plurality of examples of PII"). The generative AI model can be trained on a dataset containing examples of sensitive data elements, such as personally identifiable information (PII), financial records, or other confidential information. Once the AI model has been trained, the AI model can generate indicators (e.g., specific patterns, keywords, or formats) of sensitive information based on the model's learned associations. For example, gap data that includes sensitive financial information such as account numbers, transaction details, and personal information of stakeholders can be identified and subsequently removed and/or masked.

Data cache 812 can store data for a period of time to reduce the time required to access frequently used information. Data cache 812 ensures that the system can quickly retrieve necessary data without repeatedly querying the data provider 806, thus improving the overall efficiency of platform 804. In some implementations, a caching strategy is implemented that includes cache eviction policies, such as least recently used (LRU) or time-based expiration, to ensure that the cache remains up-to-date and responsive while optimizing memory usage. LRU allows the data cache 812 to keep track of which data items have been accessed most recently. When the data cache 812 reaches maximum capacity and needs to evict an item (e.g., data packets) to make room for new data, the data cache 812 will remove the least recently used item. Time-based expiration involves setting a specific time duration for which data items are considered valid in the data cache 812. Once this duration expires, the data item is automatically invalidated and removed from the data cache 812 to preserve space in the data cache 812.

Prompt store 814 contains predefined prompts that guide the LLM 810 in processing data and generating outputs. Prompt store 814 is a repository for pre-existing prompts that are stored in a structured and accessible format (e.g., using distributed databases or NoSQL stores), which allows for efficient retrieval and utilization by the AI model. In some implementations, the prompts are preprocessed to remove any irrelevant information, standardize the format, and/or organize the prompts into a structured database schema. In some implementations, prompt store 814 is a vector store where the prompts are vectorized and stored in a vector space model, and each prompt is mapped to a high-dimensional vector representing the prompt's semantic features and relationships with other prompts. In some implementations, the prompts are stored using graph databases such as Neo4j™ or Amazon Neptune™. Graph databases represent data as nodes and edges, allowing for the modeling of relationships between prompts to demonstrate the interdependencies. In some implementations, the prompts are stored in a distributed file system such as Apache Hadoop™ or Google Cloud Storage™. These systems offer scalable storage for large volumes of data and support parallel processing and distributed computing. Prompts stored in a distributed file system can be accessed and processed by multiple nodes simultaneously, which allows for faster retrieval and analysis by the system. For example, the details of a particular gap, such as relevant metrics, severity level, and/or specific publication references, can be used to structure a prompt for the LLM 810 by inserting the details into appropriate places in the predefined prompt.

Execution store log 816 records some or all actions and processes executed by the platform 804. Execution store log 816 can serve as an audit trail, providing a history of compliance activities and decisions made by the platform 804. Each logged entry in execution store log 816 can include details such as timestamps, user identifiers, specific actions performed, and relevant contextual information. Execution store log 816, in some implementations, can be accessed via the platform 804 via an API.

FIG. 9 is an illustrative diagram illustrating an example environment 900 of the platform using guidelines and gaps in controls to generate mapped gaps, in accordance with some implementations of the present technology. Environment 900 includes guidelines 902, operative standards 904, gaps 906, platform 908, and mapped gaps 910. Platform 908 is the same as or similar to platform 804 with reference to FIG. 8. Implementations of example environment 800 can include different and/or additional components or can be connected in different ways.

Guidelines 902 can include publications of regulations, standards, and policies that organizations adhere to. Guidelines 902 serve as the benchmark against which compliance is measured. Guidelines 902 can include publications such as jurisdictional guidelines and organizational guidelines. Jurisdictional guidelines (e.g., governmental regulations) can include guidelines gathered from authoritative sources such as government websites, legislative bodies, and regulatory agencies. Jurisdictional guidelines can be published in legal documents or official publications and cover aspects related to the development, deployment, and use of AI technologies within specific jurisdictions. For example, the California Consumer Privacy Act (CCPA) in the United States mandates cybersecurity measures such as encryption, access controls, and data breach notification requirements to protect personal data. As such, AI developers must implement cybersecurity measures (such as encryption techniques) within the AI models they design and build to ensure the protection of sensitive user data and compliance with the regulations. Organizational guidelines include internal policies, procedures, and guidelines established by organizations to govern activities within the organization's operations. Organizational guidelines can be developed in alignment with industry standards, legal requirements, best practices, and organizational objectives. For example, organizational guidelines can require AI models to include certain access controls to restrict unauthorized access to the model's APIs or data and/or have a certain level of resilience before deployment.

In some implementations, guidelines 902 can any one of text, image, audio, video or other computer-ingestible format. For guidelines 902 that are not text (e.g., image, audio, and/or video), the guidelines 902 can first be transformed into text. Optical character recognition (OCR) can be used for images containing text, and speech-to-text algorithms can be used for audio inputs. For example, an audio recording detailing financial guidelines can be converted into text using a speech-to-text engine that allows the system to parse and integrate the text output into the existing guidelines 902. Similarly, a video demonstrating a particular procedure or protocol can be processed to extract textual information (e.g., extracting captions).

In some implementations, in cases where transforming to text is not feasible or desirable, the system can use vector comparisons to handle non-text inputs directly. For example, images and audio files can be converted into numerical vectors through feature extraction techniques (e.g., by using Convolutional Neural Networks (CNNs) for images and using Mel-Frequency Cepstral Coefficients (MFCCs) for audio files). The vectors represent the corresponding characteristics of the input data (e.g., edges, texture, or shapes of the image, or the spectral features of the audio file).

In some implementations, the guidelines 902 can be stored in a vector store. The vector store stores the guidelines 902 in a structured and accessible format (e.g., using distributed databases or NoSQL stores), which allows for efficient retrieval and utilization by the platform 908. In some implementations, the guidelines 902 are preprocessed to remove any irrelevant information, standardize the format, and/or organize the guidelines 902 into a structured database schema. Once the guidelines 902 are prepared, the guidelines 902 can be stored in a vector store using distributed databases or NoSQL stores. To store the guidelines 902 in the vector store, the guidelines 902 can be encoded into vector representations. The textual data of the guidelines 902 are transformed into numerical vectors that capture the semantic meaning and relationships between words or phrases in the guidelines 902. For example, the text is encoded into vectors using word embeddings and/or TF-IDF encoding. Word embeddings, such as Word2Vec or GloVe, learn vector representations of words based on the word's contextual usage in a large corpus of text data. Each word is represented by a vector in a high-dimensional space, where similar words have similar vector representations. TF-IDF (Term Frequency-Inverse Document Frequency) encoding calculates the importance of a word in a guideline relative to the word's frequency in the entire corpus of guidelines 902. For example, the system can assign higher weights to words that are more unique to a specific document and less common across the entire corpus.

In some implementations, the guidelines 902 are stored using graph databases such as Neo4j™ or Amazon Neptune™. Graph databases represent data as nodes and edges, allowing for the modeling of relationships between guidelines 902 to demonstrate the interdependencies. In some implementations, the guidelines 902 are stored in a distributed file system such as Apache Hadoop™ or Google Cloud Storage™. These systems offer scalable storage for large volumes of data and support parallel processing and distributed computing.

The vector store can be stored in a cloud environment hosted by a cloud provider, or a self-hosted environment. In a cloud environment, the vector store has the scalability of cloud services provided by platforms (e.g., AWS™, Azure™). Storing the vector store in a cloud environment entails selecting the cloud service, provisioning resources dynamically through the provider's interface or APIs, and configuring networking components for secure communication. Cloud environments allow the vector store to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices. Conversely, in a self-hosted environment, the vector store is stored on a private web server. Deploying the vector store in a self-hosted environment entails setting up the server with the necessary hardware or virtual machines, installing an operating system, and storing the vector store. In a self-hosted environment, organizations have full control over the vector store, allowing organizations to implement customized financial measures and compliance policies tailored to the organization's specific needs. For example, organizations in industries with strict data privacy and financial regulations, such as finance institutions, can mitigate security risks by storing the vector store in a self-hosted environment.

Operative standards 904 can be specific obligations derived from the guidelines to comply with the guidelines, and can encompass both specific actionable directives and general principles. In some examples, operative standards 904 can serve as actionable directives that organizations must adhere to in order to meet the requirements laid out in regulatory guidelines or industry best practices (e.g., guidelines 902). For example, an operative standard derived from a data protection guideline can mandate the adoption of a specific framework (e.g., General Data Protection Regulation (GDPR)) for handling personal data, outlining procedures for data access, encryption standards, and breach notification protocols. In another example, an operative standard can include prohibiting a certain action to be taken, such as transmitting confidential information to external sources. In further examples, operative standards 904 encompass the fundamental principles or benchmarks derived from guidelines that guide organizational practices and behaviors towards achieving desired outcomes. For example, in the context of ethical standards within a business, operative standards can include principles such as integrity, transparency, and accountability.

Gaps 906 are instances where the current controls or processes fall short of meeting the operative standards. Gaps 906 can be due to the absence of required controls or the inadequacy of existing controls. For example, in the context of data security, a gap can be identified if a company lacks a comprehensive data encryption policy despite regulatory requirements specifying encryption standards for sensitive information. In another example, though an organization may have implemented access controls for sensitive systems, a gap can be identified when the organization fails to regularly review and update user permissions as required by industry best practices, thereby leaving potential vulnerabilities unaddressed.

Gaps 906 can be managed through a systematic approach that incorporates self-reporting and comprehensive storage of attributes tailored to each scenario associated with the gap 906. A scenario of a gap 906 refers to a specific instance or situation where current controls or processes within an organization do not meet established operative standards 904. Each scenario associated with a gap 906 represents a distinct use case. For instance, a scenario can include a cybersecurity breach due to inadequate data encryption practices, or can include a compliance issue related to incomplete documentation of financial transactions. Each identified gap 906 can be documented with scenario attributes (e.g., metadata, tags) such as a descriptive title, severity level assessment (e.g., graded from 1 to 5, where 1 denotes severe and 5 signifies trivial), and/or tags linking the gap 906 to specific business units or regulatory requirements. The scenario attributes provide a clear understanding of the gap's impact and context. In some implementations, the platform 908 includes a user interface that allows users to input and edit the scenario attributes for each gap of gaps 906.

Platform 908 receives the guidelines, operative standards, and/or identified gaps, and generates mapped gaps 910. The mapped gaps correlate the identified gaps with the specific operative standards the identified gaps fail to meet. Methods of mapping the identified gaps with the specific operative standards are discussed with further reference to FIG. 10.

FIG. 10 is a flow diagram illustrating a process 1000 of mapping identified gaps in controls to operative standards, in accordance with some implementations of the present technology. In some implementations, the process 1000 is performed by components of example devices 500 and computing devices 602 illustrated and described in more detail with reference to FIG. 5 and FIG. 6, respectively. Particular entities, for example, LLM 810, are illustrated and described in more detail with reference to FIG. 8. Likewise, implementations can include different and/or additional operations or can perform the operations in different orders.

In act 1002, the system determines a set of vector representations of alphanumeric characters represented by one or more operative standards containing a first set of actions configured to adhere to constraints in the set of vector representations. The set of vector representations of alphanumeric characters is the same as or similar to publications of guidelines 902 discussed with reference to FIG. 9. Methods of transforming different modes (e.g., text, image, audio, video) of guidelines into vector representations are discussed with reference to FIG. 9.

In some implementations, the system receives an indicator of a type of operation associated with the vector representations. The system identifies a relevant set of operative standards associated with the type of the vector representations. The system obtains the relevant set of operative standards, via an Application Programming Interface (API). For example, the system includes input channels or interfaces capable of receiving signals or data tags that denote the type (e.g., nature or purpose) of the vector representations being processed. The system can use an API to retrieve the relevant set of operative standards by implementing API endpoints or integration points that connect the system to a centralized repository or database housing the operative standards that can be tagged with associated metadata related to the type of the vector representation.

In some implementations, the AI model is a first AI model. The system can supply the set of vector representations or the original publications of the guidelines into a second AI model. In response, the system can receive from the second AI model, a set of summaries summarizing the set of vector representations, where at least one prompt in the set of prompts includes one or more summaries in the set of summaries. The set of summaries is a representation of the set of vector representations. The set of summaries, in some implementations, serves as a distilled and coherent representation of the textual content derived from set of vector representations. The set of summaries encapsulates the key themes, sentiments, or pertinent information embedded in the guidelines. The summarization process not only captures the essence of user sentiments but also allows for efficient comprehension and analysis. By condensing voluminous textual content into condensed summaries (e.g., the set of summaries), the system allows users to obtain a comprehensive and accessible understanding of the guidelines. For example, the prompt input into the second AI model can request a summary of the provided text or guidelines by including directives such as "Summarize the following text into key points," or "Provide a concise summary capturing the main themes and most important information." Additionally, the prompt can include context or specific aspects to focus on, such as "Provide the major regulatory requirements and the requirements' implications." The prompt can also include definitions of particular terms, such as operative standards or controls.

In act 1004, the system receives, via a user interface, an output generation request including an input for generation of an output using a large-language model (LLM). The input includes a set of gaps associated with one or more scenarios failing to satisfy the one or more operative standards of the set of vector representations. Examples of gaps are discussed with reference to gaps 906 in FIG. 9. Each scenario is associated with a unique identifier and corresponding metrics indicating one or more actions in the first set of actions absent from the scenario. Examples of scenarios are discussed with reference to FIG. 9. Each gap in the set of gaps includes a set of attributes defining the scenario including the unique identifier of the scenario, the corresponding metrics of the scenario, the corresponding vector representations associated with the scenario, a title of the scenario, a summary of the scenario, and/or a severity level of the scenario.

In some implementations, the set of attributes defining the scenario includes a binary indicator of the severity level of the scenario, a category of the severity level of the scenario, and/or a probability associated with the severity level of the scenario. For instance, a binary indicator can be set to '1' for severe (indicating an issue that requires immediate attention) or '0' for non-severe (where the issue is less urgent but still requires resolution). In another example, categories can range from 'Low' to 'High' severity, helping prioritize remedial actions based on the potential impact and risk associated with each scenario. In a further example, a high probability value can indicate that the compliance gap is highly likely to lead to regulatory fines or data breaches if not addressed promptly.

In act 1006, using the received input, the system constructs a set of prompts for each gap in the set of gaps. The set of prompts for a particular gap includes the set of attributes defining the scenario, such as scenario identifiers, severity assessments (e.g., criticality level), summaries outlining the compliance issue, the first set of actions (e.g., actionable directives or general principles of FIG. 9) of the one or more operative standards, and/or the set of vector representations. In some implementations, the set of prompts for each gap in the set of gaps includes a set of pre-loaded query contexts defining one or more sets of alphanumeric characters associated with the set of vector representations. The pre-loaded query contexts include predefined templates, rules, or configurations that specify criteria for mapping gaps to operative standards. For example, the pre-loaded query context can include definitions of terms such as operative standards and/or gaps. The prompts serve as input to a large-language model (LLM), which is designed to process natural language inputs and generate structured outputs based on learned patterns and data.

In act 1008, for each gap in the set of gaps, the system maps the gap to one or more operative standards of the set of vector representations. The system supplies the prompt of the particular gap into the LLM. Responsive to inputting the prompt, the system receives, from the LLM, a gap-specific set of operative standards including the one or more operative standards associated with the particular gap. In some implementations, the system can generate, for each gap-specific set of operative standard of the set of gap-specific set of operative standards for each gap, an explanation associated with how the one or more operative standards is mapped. The output of the LLM can be in the form of alphanumeric characters. In some implementations, responsive to inputting the prompt, the system receives, from the AI model, the gap-specific set of operative standards, and the corresponding sets of vector representations.

In some implementations, the prompt into the LLM includes a directive to provide a first explanation of why a particular gap should be mapped to a particular operative standard, and also a second explanation of why a particular gap should not be mapped to a particular operative standard. The prompt can further include a directive to provide why the first explanation or the second explanation is weighted more (e.g., why a certain mapping occurs). In some implementations, a human individual can approve or disapprove the mappings based on the first and/or second explanations. Allowing a human-in-the-loop (HITL) and generating a first and second explanation provides transparency to users of the platform regarding the generated mappings.

In act 1010, the system generates for display at the user interface, a graphical representation indicating the gap-specific set of operative standards. The graphical representation includes a first representation of each gap in the set of gaps and a second representation of the corresponding gap-specific set of operative standards. In some implementations, each gap is visually represented to highlight its specific attributes, such as severity level, scenario identifier, and a summary detailing the gap. The graphical representations can use charts, diagrams, or visual frameworks that integrate color coding, icons, or annotations to denote severity levels, compliance progress, or overdue actions. Annotations within the graphical representation can offer additional context or explanations regarding each gap and its alignment with operative standards. Overlays can be used to indicate overdue actions, completed mappings, and/or compliance deadlines.

In act 1012, using the gap-specific set of operative standards, the system generates a second set of actions for each gap in the set of gaps including one or more actions in the first set of actions indicated by the corresponding gap-specific set of operative standards. The second set of actions can modify a portion of the scenario in the corresponding gap to satisfy the one or more operative standards of the set of vector representations. For instance, actions can involve updating policies, enhancing security measures, implementing new protocols, and/or conducting training sessions to improve organizational practices and mitigate risks. Each action can be linked directly to the corresponding gap and its associated operative standards.

In some implementations, the set of prompts is a first set of prompts, and the gap-specific set of operative standards is a first set of operative standards. Using the received input, the system constructs a second set of prompts for each gap in the set of gaps. The second set of prompts for a particular gap includes the set of attributes defining the scenario and the set of vector representations. Using the second set of prompts, the system receives, from the LLM, a second set of operative standards for each gap in the set of gaps. Using the second set of operative standards, the system constructs a third set of prompts for each gap in the set of gaps. The third set of prompts for the particular gap includes the set of attributes defining the scenario and the first set of actions of the one or more operative standards. Using the third set of prompts, the system receives, from the LLM, a third set of operative standards for each gap in the set of gaps. The iterative approach of using multiple sets of prompts with the LLM enhances the system's capability to adapt and respond dynamically to previously generated mappings and thus contributes to a continuous improvement process where insights gained from each interaction cycle contribute to more refined strategies for achieving alignment of an organization with the operative standards.

In some implementations, the set of prompts is a first set of prompts. For each vector representation in the received set of vector representations, the system identifies a set of textual content representative of the set of vector representations. The system partitions the set of textual content into a plurality of text subsets of the set of textual content based on predetermined criteria. The predetermined criteria can include a length of each text subset and/or a complexity of each text subset. For example, the predetermined criteria can be token count or character limit to ensure uniformity and coherence in the division process. Chunking the textual content breaks down a large amount of textual content into manageable units. For token-based partitioning, the system calculates the number of linguistic units, or tokens, within the textual content. These tokens, in some implementations, encompass individual words, phrases, or even characters, depending on the specific linguistic analysis employed. The predetermined token count criterion sets a quantitative guideline, dictating the number of linguistic units encompassed within each chunk. In some implementations, when employing a character limit criterion, the system focuses on the total number of characters within the textual content character limit criterion, in some implementations, involves assessing both alphanumeric characters and spaces, providing a more fine-grained measure of the content's structural intricacies. The predetermined character limit establishes an upper threshold, guiding the system to create segments that adhere to the predefined character limit.

The system can receive user feedback related to deviations between the gap-specific set of operative standards and a desired set of operative standards. The system can iteratively adjust the sets of prompts to modify the gap-specific set of operative standards to the desired set of operative standards. The system can generate action plans, update compliance strategies, and/or refine operational practices to enhance alignment with the set of vector representations. The system can generate a set of actions (e.g., a modification plan) that adjust the current attributes of the scenario to a desired set of attributes of the scenario. The system can identify the root cause of the difference between the attributes of the scenario and the desired set of attributes of the scenario. For example, the desired set of attributes of the scenario can include a certain action not found in the current attributes of the scenario (e.g., an anonymization procedure). The actions (e.g., the anonymization procedure) can be preloaded into the system.

Generating Actionable Items from Guidelines Using the Data Generation Platform

FIG. 11 is an illustrative diagram illustrating an example environment 1100 of the platform identifying actionable items 1110a-n from guidelines 1102, in accordance with some implementations of the present technology. Environment 1100 includes guidelines 1102, platform 1104, text subsets 1106a-n, prompts 1108a-n, and actionable items 1110a-n. Guidelines 1102 are the same as or similar to guidelines 902 with reference to FIG. 9. Platform 1104 is the same as or similar to platform 804 with reference to FIG. 8. Implementations of example environment 1100 can include different and/or additional components or can be connected in different ways.

Platform 1104 can be a web-based application that hosts various use cases, such as compliance, that allows users to interact via a front-end interface. Inputs to the platform 1104 can be guidelines 1102 in various formats (e.g., text, Excel). Further examples of platform 1104 are discussed with reference to platform 804 in FIG. 8. The backend of platform 1104 can chunk (e.g., partition) the guidelines into text subsets 1106a-n and vectorize the text subsets 1106a-n. The vectorized representations of the text subsets 1106a-n can be stored in a database accessible by the platform 1104. The platform 1104 can use an API call to send prompts to an AI model (such as an LLM), as described further in FIG. 8. The AI model processes the prompts and returns the output of actionable items to the backend of platform 1104, which can format the output into a user-friendly structure.

Text subsets 1106a-n refer to portions of the guidelines 1102 that have been extracted or divided (e.g., based on specific criteria) into smaller segments. Each text subsets 1106a-n can be categorized by topic, section, or other relevant factors. By breaking down large volumes of text into subsets, the platform can focus on specific parts of the guidelines. The structured approach additionally allows the platform to handle large volumes of regulatory text efficiently.

Prompts 1108a-n are specific queries or instructions generated from the text subsets 1106a-n that are formulated to direct the behavior and output of an AI model, such as identifying actionable items from the text subsets 1106a-n of regulatory guidelines 1102. For example, for text subset 1106a, a corresponding prompt 1108a is constructed. In some implementations, a prompt can include multiple text subsets. In some implementations, a single text subset can be associated with multiple prompts. Prompts 1108a-n causes the AI model to identify particular attributes of the text subsets 1106a-n, such as regulatory obligations or compliance requirements to dynamically generate meaningful outputs (e.g., actionable items). In some implementations, the prompts 1108a-n can be generated using a second AI model. The second AI model can analyze the text subsets 1106a-n or the guidelines 1102 directly to identify features of the text subset such as context, entities, and the relationships between the features by, for example, breaking down the input into smaller components and/or tagging predefined keywords. The second AI model can construct prompts that are contextually relevant using the identified features. For instance, if the input pertains to compliance guidelines, the second AI model can identify sections within the guidelines and frame prompts that highlight the most relevant information (e.g., information directed towards compliance guidelines). The prompts can include specific questions or statements that direct the first AI model to focus on particular aspects, such as "What are the key compliance requirements for data protection in this guideline?"

The second AI model can, in some implementations, employ query expansion. Query expansion is a process that enhances the original query by including synonyms, related concepts, and/or additional contextually relevant terms to improve the comprehensiveness of the response. For example, if the initial prompt is "Identify key actionable items for data protection," the second AI model can expand the query by including keywords such as "privacy regulations," "data security measures," and "information governance." In some implementations, the second AI model can reference domain-specific thesauruses and/or pre-trained word embeddings to find synonyms and related terms to the identified elements.

Prompts 1108a-n can include definitions, keywords, and instructions that guide the AI model in identifying relevant actionable items. For instance, definitions can clarify what constitutes an "actionable item" or "obligation." Further, prompts 1108a-n can specify keywords like "must," "shall," or "required." The keywords can indicate mandatory actions or prohibitions that need to be identified as actionable items. For example, a prompt can instruct the AI model to flag any sentence containing the word "must" as it likely denotes a regulatory requirement. In another example, prompts 1108a-n can direct the AI model to extract all instances of deadlines for compliance actions, descriptions of required documentation, or procedures for reporting to regulatory bodies. Instructions can also include formatting guidelines, ensuring that the extracted actionable items are presented in a consistent and usable format.

Actionable items 1110a-n (e.g., directives, actions) are the specific tasks or requirements identified by the AI model from the guidelines, based on the analysis of text subsets 1106a-n and prompts 1108a-n. In some implementations, rather than being mere excerpts from the text subsets 1106a-n, actionable items 1110a-n can be distilled, comprehensive instructions that define specific measures or procedures to implement. For instance, an actionable item can outline the frequency and format of compliance reports required, specify the data to be included, and designate the department responsible for submission. Actionable items 1110a-n are designed to translate regulatory text into actionable operations that organizations can directly operationalize. Actionable items 1110a-n can include tasks such as reporting, record-keeping, compliance checks, and other regulatory actions.

Each actionable item can include metadata such as the responsible party within the organization, the type of customer or stakeholder affected, and/or other relevant identifiers. An AI model can use natural language processing (NLP) algorithms to parse through text subsets 1106a-n to identify relevant phrases, keywords, and semantic structures (e.g., as instructed by the prompts 1108a-n) that indicate actionable items 1110a-n within the guidelines 1102. Prompts 1108a-n can direct the AI model by providing contextual cues and specific queries that direct the AI model to focus on particular guidelines or aspects of guidelines within guidelines 1102.

Example Implementations of a Validation Engine of the Data Generation Platform

FIG. 12 is a block diagram illustrating an example environment 1200 for using the guidelines input into the validation engine for determining AI compliance, in accordance with some implementations of the present technology. Environment 1200 includes guidelines 1202 (e.g., jurisdictional regulations 1204, organization regulation 1206, AI application-specific regulations 1208), vector store 1210, and validation engine 1212. Validation engine can be the same as or similar to generative model engine 420 in data generation platform 402 discussed with reference to FIG. 4. Vector store 1210 and validation engine 1212 are implemented using components of example devices 500 and computing devices 602 illustrated and described in more detail with reference to FIG. 5 and FIG. 6, respectively. Likewise, implementations of example environment 1200 can include different and/or additional components or can be connected in different ways.

Guidelines 1202 can include various elements such as jurisdictional regulations 1204, organizational regulations 1206, and AI applications-specific regulations 1208 (e.g., unsupervised learning, natural language processing (NLP), generative AI). Jurisdictional regulations 1204 (e.g., governmental regulations) can include regulations gathered from authoritative sources such as government websites, legislative bodies, and regulatory agencies. Jurisdictional regulations 1204 can be published in legal documents or official publications and cover aspects related to the development, deployment, and use of AI technologies within specific jurisdictions. Organizational regulations 1206 includes internal policies, procedures, and guidelines established by organizations to govern AI-related activities within the organization's operations. Organizational regulations 1206 can be developed in alignment with industry standards, legal requirements, and organizational objectives. AI application-specific regulations 1208 include regulations that pertain to specific types of AI applications, such as unsupervised learning, natural language processing (NLP), and generative AI. Each type of AI application presents unique challenges and considerations in terms of compliance, ethical use, and/or regulatory adherence. For example, unsupervised learning algorithms, where the model learns from input data without labeled responses, can be subject to regulations that prevent bias and discrimination in unsupervised learning models. Natural language processing (NLP) technologies, which enable computers to understand, interpret, and generate human language, can be subject to specific regulations aimed at safeguarding user privacy. Generative AI, which autonomously creates new content, can focus on intellectual property rights, content moderation, and ethical use cases. AI developers may need to incorporate additional mechanisms for copyright protection, content filtering, and/or user consent management to comply with regulations related to generative AI technologies.

The guidelines 1202 are stored in a vector store 1210. The vector store 1210 stores the guidelines 1202 in a structured and accessible format (e.g., using distributed databases or NoSQL stores), which allows for efficient retrieval and utilization by the validation engine 1212. In some implementations, the guidelines 1202 are preprocessed to remove any irrelevant information, standardize the format, and/or organize the guidelines 1202 into a structured database schema. Once the guidelines 1202 are prepared, the guidelines 1202 can be stored in a vector store 1210 using distributed databases or NoSQL stores.

To store the guidelines 1202 in the vector store 1210, the guidelines 1202 can be encoded into vector representations for subsequent retrieval by the validation engine 1212. The textual data of the guidelines 1202 are transformed into numerical vectors that capture the semantic meaning and relationships between words or phrases in the guidelines 1202. For example, the text is encoded into vectors using word embeddings and/or TF-IDF encoding. Word embeddings, such as Word2Vec or GloVe, learn vector representations of words based on the word's contextual usage in a large corpus of text data. Each word is represented by a vector in a high-dimensional space, where similar words have similar vector representations. TF-IDF (Term Frequency-Inverse Document Frequency) encoding calculates the importance of a word in a guideline relative to the word's frequency in the entire corpus of guidelines 1202. For example, the system can assign higher weights to words that are more unique to a specific document and less common across the entire corpus.

In some implementations, the guidelines 1202 are stored using graph databases such as Neo4j™ or Amazon Neptune™. Graph databases represent data as nodes and edges, allowing for the modeling of relationships between guidelines 1202 to demonstrate the interdependencies. In some implementations, the guidelines 1202 are stored in a distributed file system such as Apache Hadoop™ or Google Cloud Storage™. These systems offer scalable storage for large volumes of data and support parallel processing and distributed computing. Guidelines 1202 stored in a distributed file system can be accessed and processed by multiple nodes simultaneously, which allows for faster retrieval and analysis by the validation engine.

The vector store 1210 can be stored in a cloud environment hosted by a cloud provider, or a self-hosted environment. In a cloud environment, the vector store 1210 has the scalability of cloud services provided by platforms (e.g., AWS™, Azure™). Storing the vector store 1210 in a cloud environment entails selecting the cloud service, provisioning resources dynamically through the provider's interface or APIs, and configuring networking components for secure communication. Cloud environments allow the vector store 1210 to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices.

Conversely, in a self-hosted environment, the vector store 1210 is stored on a private web server. Deploying the vector store 1210 in a self-hosted environment entails setting up the server with the necessary hardware or virtual machines, installing an operating system, and storing the vector store 1210. In a self-hosted environment, organizations have full control over the vector store 1210, allowing organizations to implement customized security measures and compliance policies tailored to the organization's specific needs. For example, organizations in industries with strict data privacy and security regulations, such as finance institutions, can mitigate security risks by storing the vector store 1210 in a self-hosted environment.

The validation engine 1212 accesses the guidelines 1202 from the vector store 1210 to initiate the compliance assessment. The validation engine 1212 can establish a connection to the vector store 1210 using appropriate APIs or database drivers. The connection allows the validation engine 1212 to query the vector store 1210 and retrieve the relevant guidelines for the AI application under evaluation. Frequently accessed guidelines 1202 are stored in memory, which allows the validation engine 1212 to reduce latency and improve response times for compliance assessment tasks. In some implementations, only the relevant guidelines are retrieved based on the specific AI application under evaluation. For example, metadata tags, categories, or keywords associated with the AI application can be used to filter the guidelines 1202.

The validation engine 1212 evaluates the AI application's compliance with the retrieved guidelines 1202, (e.g., using semantic search, pattern recognition, and machine learning techniques). For example, the validation engine 1212 compares the vector representations of the different explanations and outcomes by calculating the cosine of the angle between the two vectors indicating the vectors' directional similarity. Similarly, for comparing explanations, the validation engine 1212 can measure the intersection over the union of the sets of words in the expected and case-specific explanations.

FIG. 13 is a block diagram illustrating an example environment 1300 for generating validation actions to determine AI model compliance, in accordance with some implementations of the present technology. Environment 1300 includes training data 1302, meta-model 1310, validation actions 1312, cache 1314, and vector store 1316. Meta-model 1310 is implemented using components of example devices 500 and computing devices 602 illustrated and described in more detail with reference to FIG. 5 and FIG. 6, respectively. Likewise, implementations of example environment 1300 can include different and/or additional components or can be connected in different ways.

The training data includes data from sources such as business applications 1304, other AI applications 1306, and/or an internal document search AI 1308. Business applications 1304 refer to software tools or systems used to facilitate various aspects of business operations and can include data related to, for example, loan transaction history, customer financial profiles, credit scores, and income verification documents. For example, data from a banking application can provide insights into an applicant's banking behavior, such as average account balance, transaction frequency, and bill payment history. Other AI applications 1306 can include, for example, credit scoring models, fraud detection algorithms, and risk assessment systems that can be used by lenders to evaluate loan applications. Data from AI applications 1306 refer to various software systems that utilize artificial intelligence (AI) techniques to perform specific tasks or functions. The data can include credit risk scores and fraud risk indicators. For example, an AI-powered credit scoring model can provide a risk assessment score based on an applicant's credit history, debt-to-income ratio, and other financial factors. The internal document search AI 1308 is an AI system tailored for searching and retrieving information from internal documents within an organization. For example, the internal document search AI 1308 can be used to retrieve and analyze relevant documents such as loan agreements, regulatory compliance documents, and internal policies. Data from internal documents can include, for example, legal disclosures, loan terms and conditions, and compliance guidelines. For example, the AI system can flag loan applications that contain discrepancies or inconsistencies with regulatory guidelines or internal policies.

The training data 1302 is fed into the meta-model 1310 to train the meta-model 1310, enabling the meta-model 1310 to learn patterns and characteristics associated with compliant and non-compliant AI behavior. Further discussion of Artificial Intelligence and training methods are discussed in FIG. 10. The meta-model 1310 leverages the learned patterns and characteristics to generate validation actions 1312, which serve as potential use-cases designed to evaluate AI model compliance. The validation actions 1312 can encompass various scenarios and use cases relevant to the specific application domain of the AI model under assessment. Further methods of creating validation actions are discussed in FIGS. 12-14.

In some implementations, the generated validation actions 1312 can be stored in a cache 1314 and/or a vector store 1316. The cache 1314 is a temporary storage mechanism for storing recently accessed or frequently used validation actions, and facilitates efficient retrieval when needed. On the other hand, the vector store 1316 provides a structured repository for storing vector representations of validation actions, enabling efficient storage and retrieval based on similarity or other criteria. The vector store 1316 stores the generated validation actions 1312 in a structured and accessible format (e.g., using distributed databases or NoSQL stores), which allows for efficient retrieval and utilization by the meta-model 1310. The generated validation actions 1312 can be preprocessed to remove any irrelevant information, standardize the format, and/or organize the generated validation actions 1312 into a structured database schema. Once the generated validation actions 1312 are prepared, the generated validation actions 1312 can be stored in a vector store 1316 using distributed databases or NoSQL stores.

In some implementations, the generated validation actions 1312 are stored using graph databases such as Neo4j™ or Amazon Neptune™. Graph databases represent data as nodes and edges, allowing for the modeling of relationships between generated validation actions 1312 to demonstrate the interdependencies. In some implementations, the generated validation actions 1312 are stored in a distributed file system such as Apache Hadoop™ or Google Cloud Storage™. The systems offer scalable storage for large volumes of data and support parallel processing and distributed computing. Generated validation actions 1312 stored in a distributed file system can be accessed and processed by multiple nodes simultaneously, which allows for faster retrieval and analysis by the meta-model 1310.

The vector store 1316 can be stored in a cloud environment hosted by a cloud provider, or a self-hosted environment. In a cloud environment, the vector store 1316 has the scalability of cloud services provided by platforms (e.g., AWS™, Azure™). Storing the vector store 1316 in a cloud environment entails selecting the cloud service, provisioning resources dynamically through the provider's interface or APIs, and configuring networking components for secure communication. Cloud environments allow the vector store 1316 to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices.

Conversely, in a self-hosted environment, the vector store 1316 is stored on a private web server. Deploying the vector store 1316 in a self-hosted environment entails setting up the server with the necessary hardware or virtual machines, installing an operating system, and storing the vector store 1316. In a self-hosted environment, organizations have full control over the vector store 1316, allowing organizations to implement customized security measures and compliance policies tailored to the organization's specific needs. For example, organizations in industries with strict data privacy and security regulations, such as finance institutions, can mitigate security risks by storing the vector store 1316 in a self-hosted environment.

The meta-model 1310 accesses the generated validation actions 1312 from the vector store 1316 to initiate the compliance assessment. The system can establish a connection to the vector store 1316 using appropriate APIs or database drivers. The connection allows the meta-model 1310 to query the vector store 1316 and retrieve the relevant vector constraints for the AI application under evaluation. Frequently accessed validation actions 1312 are stored in memory, which allows the system to reduce latency and improve response times for compliance assessment tasks.

In some implementations, only the relevant validation actions are retrieved based on the specific AI application under evaluation. For example, metadata tags, categories, or keywords associated with the AI application can be used to filter the validation actions 1312. The relevant validation actions can be specifically selected based on the specific context and requirements of the AI application being evaluated. For example, the system analyzes metadata tags, keywords, or categories associated with the validation actions 1312 stored in the system's database. Using the specific context and requirements of the AI application, the system filters and retrieves the relevant validation actions from the database.

Various filters can be used to select relevant validation actions. In some implementations, the system uses natural language processing (NLP) to parse through the text of the validation action 1312 and identify key terms, phrases, and clauses that denote regulatory obligations relevant to the AI application's domain. The specific terms related to the AI application's domain can be predefined and include, for example, "patient privacy" for healthcare sector applications. Using the specific terms related to the AI application's domain as a filter, the system can filter out the non-relevant validation actions. To identify the relevant validation actions from the validation actions 1312, the system can determine the specific terms to use as filters by calculating the similarity between vectors representing domain-specific terms (e.g., "healthcare") and vectors representing other terms related to the domain (e.g., "patient privacy"), domain-specific terms can be identified based on the proximity of the other terms to known terms of interest. A similarity threshold can be applied to filter out terms that are not sufficiently similar to known domain-specific terms.

In some implementations, the system can tag relevant validation actions with attributes that help contextualize the relevant validation actions. The tags serve as markers that categorize and organize the validation actions 1312 based on predefined criteria, such as regulatory topics (e.g., data privacy, fairness, transparency) or jurisdictional relevance (e.g., regional regulations, industry standards). The tags provide a structured representation of the validation actions 1312 and allow for easier retrieval, manipulation, and analysis of regulatory content. The tags and associated metadata can be stored in a structured format, such as a database, where each validation action 1312 is linked to the validation action's 1312 corresponding tags and/or regulatory provisions.

The meta-model 1310 evaluates the AI application's compliance with the vector constraints through the use of validation actions 1312 (e.g., using semantic search, pattern recognition, and machine learning techniques). Further evaluation methods in determining compliance of AI applications are discussed with reference to FIGS. 12-14.

FIG. 14 is a block diagram illustrating an example environment 1400 for automatically implementing corrective actions on the AI model, in accordance with some implementations of the present technology. Environment 1400 includes training dataset 1402, meta-model 1404 (which includes validation models 1406A-D, validation actions 1408, AI application 1410), outcome and explanation 1412, recommendation 1414, and corrective actions 1416. Meta-model 1404 is the same as or similar to meta-model 1310 illustrated and described in more detail with reference to FIG. 13. Meta-model 1404 and AI application 1410 are implemented using components of example devices 500 and computing devices 602 illustrated and described in more detail with reference to FIG. 5 and FIG. 6, respectively. Likewise, implementations of example environment 1400 can include different and/or additional components or can be connected in different ways.

A training dataset 1402, which includes a collection of data used to train machine learning models, is input into meta-model 1404. The meta-model 1404 is a comprehensive model that encompasses multiple sub-models tailored to address specific aspects of AI compliance. Within the meta-model 1404, various specialized models are included, such as a bias model 1406A (described in further detail with reference to FIG. 8), a toxicity model 1406B (described in further detail with reference to FIG. 9), an IP violation model 1406C (described in further detail with reference to FIG. 10), and other validation models 1406D. Each of the models is responsible for detecting and assessing specific types of non-compliant content within AI models. Upon processing the training dataset 1402, each model generates validation actions tailored to evaluate the presence or absence of specific types of non-compliant content. Further evaluation techniques in generating validation actions using the meta-model 1404 are discussed with reference to FIGS. 12-14.

The set of generated validation actions 1408 is provided as input to an AI application 1410 in the form of a prompt. The AI application 1410 processes the validation actions 1408 and produces an outcome along with an explanation 1412 detailing how the outcome was determined. Subsequently, based on the outcome and explanation 1412 provided by the AI application 1410, the system can generate recommendations 1414 for corrective actions. The recommendations are derived from the analysis of the validation action outcomes and aim to address any identified issues or deficiencies. For example, if certain validation actions fail to meet the desired criteria due to specific attribute values or patterns, the recommendations can suggest adjustments to those attributes or modifications to the underlying processes.

For a bias detection model, such as the ML model discussed in FIG. 8, if certain attributes exhibit unexpected associations or distributions, the system can retrain the tested AI model with revised weighting schemes to better align with the desired vector constraints. In a toxicity model, such as the ML model discussed in FIG. 9, the corrective actions can include implementing post-processing techniques in the tested AI model to filter out responses that violate the vector constraints (e.g., filtering out responses that include the identified vector representations of the alphanumeric characters). Similarly, in an IP rights violation model, such as the ML model discussed in FIG. 10, the corrective actions can include implementing post-processing techniques in the tested AI model to filter out responses that violate the IP rights (e.g., filtering out responses including the predetermined alphanumeric characters).

In some implementations, based on the outcomes and explanations, the system applies predefined rules or logic to determine appropriate corrective actions. The rules can be established by users and can consider factors such as regulatory compliance, risk assessment, and business objectives. For example, if an application is rejected due to insufficient income, the system can recommend requesting additional financial documentation from the applicant.

In some implementations, the system can use machine learning models to generate recommendations. The models learn from historical data and past decisions to identify patterns and trends that indicate a set of actions the AI model can take to comply with the vector constraints. By training on a dataset of past corrective actions and the outcomes, the machine learning models can predict the most effective recommendations for new cases. Further discussion of Artificial Intelligence and training methods are discussed in FIG. 10. The recommendations 1414 can be automatically implemented as corrective actions 1416 by the system. The automated approach streamlines the process of addressing identified issues and ensures swift remediation of non-compliant content within AI models, enhancing overall compliance and reliability.

Certifying and Benchmarking Artifacts Using the Data Generation Platform

FIG. 15 is an illustrative diagram illustrating an example environment 1500 for grading an AI model using guidelines stored in a vector store. Environment 1500 includes guidelines 1502, vector store 1510, and grading engine 1512, which includes test categories 1514*a-e*. Guidelines 1502 is the same as or similar to guidelines 1202 illustrated and described in more detail with reference to FIG. 12. Grading engine 1512 is implemented using components of example devices 500 and computing devices 602 illustrated and described in more detail with reference to FIG. 5 and FIG. 6, respectively. Likewise, implementations of example environment 1500 can include different and/or additional components or can be connected in different ways.

The guidelines 1502 can be determined using obtained application domains (e.g., domain contexts) of the AI model. Guidelines 1502 can include various elements such as jurisdictional guidelines 1504, organizational guidelines 1506, and AI applications-specific guidelines 1508 (e.g., unsupervised learning, natural language processing (NLP), generative AI). Jurisdictional guidelines 1504 (e.g., governmental regulations) can include guidelines gathered from authoritative sources such as government websites, legislative bodies, and regulatory agencies. Jurisdictional guidelines 1504 can be published in legal documents or official publications and cover aspects related to the development, deployment, and use of AI technologies within specific jurisdictions. For example, the California Consumer Privacy Act (CCPA) in the United States mandates cybersecurity measures such as encryption, access controls, and data breach notification requirements to protect personal data. As such, AI developers must implement cybersecurity measures (such as encryption techniques) within the AI models they design and build to ensure the protection of sensitive user data and compliance with the regulations.

Organizational guidelines 1506 include internal policies, procedures, and guidelines established by organizations to govern software- and/or AI-related activities within the organization's operations. Organizational guidelines 1506 can be developed in alignment with industry standards, legal requirements, best practices, and organizational objectives. For example, organizational guidelines can require AI models to include certain access controls to restrict unauthorized access to the model's APIs or data and/or have a certain level of resilience before deployment.

In some implementations, guidelines 1502 can any one of text, image, audio, video or other computer-ingestible format. For guidelines 1502 that are not text (e.g., image, audio, and/or video), the guidelines 1502 can first be transformed into text. Optical character recognition (OCR) can be used for images containing text, and speech-to-text algorithms can be used for audio inputs. For example, an audio recording detailing security guidelines can be converted into text using a speech-to-text engine that allows the system to parse and integrate the text output into the existing guidelines 1502. Similarly, a video demonstrating a particular procedure or protocol can be processed to extract textual information (e.g., extracting captions).

In some implementations, in cases where transforming to text is not feasible or desirable, the system can use vector comparisons to handle non-text inputs directly. For example, images and audio files can be converted into numerical vectors through feature extraction techniques (e.g., by using Convolutional Neural Networks (CNNs) for images and using Mel-Frequency Cepstral Coefficients (MFCCs) for audio files). The vectors represent the corresponding characteristics of the input data (e.g., edges, texture, or shapes of the image, or the spectral features of the audio file). The system can then perform vector comparisons between the inputs and the outputs of the AI model to determine the satisfaction of the AI model with guidelines 1502. For example, an image depicting a secure login process can be compared against a library of vectors representing various secure and insecure login methods. If the image vector closely aligns with vectors in the secure category, it can be positively assessed; otherwise, the AI model can be flagged for review.

AI application-specific guidelines 1508 include guidelines that pertain to specific types of AI applications, such as unsupervised learning, natural language processing (NLP), and generative AI. Each type of AI application presents unique challenges and considerations in terms of best practices, compliance, ethical use, and/or regulatory adherence. For example, unsupervised learning algorithms, where the model learns from input data without labeled responses, can be subject to regulations that prevent bias and discrimination in unsupervised learning models. Natural language processing (NLP) technologies, which enable computers to understand, interpret, and generate human language, can be subject to specific regulations aimed at safeguarding user privacy. Generative AI, which autonomously creates new content, can focus on intellectual property rights, content moderation, and ethical use cases. AI developers can incorporate additional mechanisms for copyright protection, content filtering, and/or user consent management to comply with regulations related to generative AI technologies.

Best practices in the guidelines 1502 can include the resilience of the AI model or the data quality the AI model is trained on. For example, best practices for AI model resilience involve ensuring the AI model's ability to withstand cyber threats and adversarial attacks. The AI model is expected to implement security measures within the model architecture, such as encryption, access controls, and anomaly detection algorithms, to detect and mitigate potential security breaches or attacks. Further, ensuring the quality of training data can include thorough data quality assessments to identify and mitigate biases, anomalies, and inaccuracies in the training dataset. Data preprocessing techniques, such as data normalization and outlier detection, can be expected to be applied to enhance the quality and integrity of the training data, reducing the risk of security incidents.

The guidelines 1502 can be stored in a vector store 1510. The vector store 1510 stores the guidelines 1502 in a structured and accessible format (e.g., using distributed databases or NoSQL stores), which allows for efficient retrieval and utilization by the grading engine 1512. In some implementations, the guidelines 1502 are preprocessed to remove any irrelevant information, standardize the format, and/or organize the guidelines 1502 into a structured database schema. Once the guidelines 1502 are prepared, the guidelines 1502 can be stored in a vector store 1510 using distributed databases or NoSQL stores.

To store the guidelines 1502 in the vector store 1510, the guidelines 1502 can be encoded into vector representations for subsequent retrieval by the grading engine 1512. The textual data of the guidelines 1502 are transformed into numerical vectors that capture the semantic meaning and relationships between words or phrases in the guidelines 1502. For example, the text is encoded into vectors using word embeddings and/or TF-IDF encoding. Word embeddings, such as Word2Vec or GloVe, learn vector representations of words based on the word's contextual usage in a large corpus of text data. Each word is represented by a vector in a high-dimensional space, where similar words have similar vector representations. TF-IDF (Term Frequency-Inverse Document Frequency) encoding calculates the importance of a word in a guideline relative to the word's frequency in the entire corpus of guidelines 1502. For example, the system can assign higher weights to words that are more unique to a specific document and less common across the entire corpus.

In some implementations, the guidelines 1502 are stored using graph databases such as Neo4j™ or Amazon Neptune™. Graph databases represent data as nodes and edges, allowing for the modeling of relationships between guidelines 1502 to demonstrate the interdependencies. In some implementations, the guidelines 1502 are stored in a distributed file system such as Apache Hadoop™ or Google Cloud Storage™. These systems offer scalable storage for large volumes of data and support parallel processing and distributed computing. Guidelines 1502 stored in a distributed file system can be accessed and processed by multiple nodes simultaneously, which allows for faster retrieval and analysis by the grading engine 1512.

The vector store 1510 can be stored in a cloud environment hosted by a cloud provider, or a self-hosted environment. In a cloud environment, the vector store 1510 has the scalability of cloud services provided by platforms (e.g., AWS™, Azure™). Storing the vector store 1510 in a cloud environment entails selecting the cloud service, provisioning resources dynamically through the provider's interface or APIs, and configuring networking components for secure communication. Cloud environments allow the vector store 1510 to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices.

Conversely, in a self-hosted environment, the vector store 1510 is stored on a private web server. Deploying the vector store 1510 in a self-hosted environment entails setting up the server with the necessary hardware or virtual machines, installing an operating system, and storing the vector store 1510. In a self-hosted environment, organizations have full control over the vector store 1510, allowing organizations to implement customized security measures and compliance policies tailored to the organization's specific needs. For example, organizations in industries with strict data privacy and security regulations, such as finance institutions, can mitigate security risks by storing the vector store 1510 in a self-hosted environment.

The grading engine 1512 accesses the guidelines 1502 from the vector store 1510 to initiate grading the AI model. The grading engine 1512 can establish a connection to the vector store 1510 using appropriate APIs or database drivers. The connection allows the grading engine 1512 to query the vector store 1510 and retrieve the relevant guidelines for the AI application under evaluation. Frequently accessed guidelines 1502 can be stored in memory, which allows the grading engine 1512 to reduce latency and improve response times for compliance assessment tasks.

In some implementations, only the relevant guidelines are retrieved based on the specific AI application under evaluation. For example, metadata tags, categories, or keywords associated with the AI application can be used to filter the guidelines 502. The grading engine 1512 evaluates the AI application against the retrieved guidelines 1502.

Assessment domains, such as test categories 1514a-e, encompass various aspects of evaluating the AI model's performance and adherence to predefined guidelines. Each assessment domain is designed to assess a specific context, such as data quality 1514a, security measures 1514b, software development 1514c, regulatory compliance 1514d, and/or AI explainability 1514e. The test categories 1514a-e can overlap in the corresponding contexts.

Data quality 1514a evaluates the quality, accuracy, and integrity of the data used to train and operate the AI model. The test category includes tests to identify biases, anomalies, and inconsistencies in the training data. Security measures 1514b assesses the AI model's resilience against cyber threats and vulnerabilities. The test category includes tests for data encryption, access controls, vulnerability management, threat detection, and remediation capabilities to protect against cyberattacks and unauthorized access to sensitive information. Software development 1514c evaluates the robustness and reliability of the software development practices used to build and deploy the AI model. For example, software development 1514c includes tests for code quality, version control, testing methodologies, and deployment procedures to ensure the integrity and stability of the AI model throughout its lifecycle. The regulatory compliance 1514d test category assesses the AI model's adherence to relevant legal and regulatory requirements governing its use and deployment. Regulatory compliance 1514d includes tests to verify compliance with data protection laws, industry regulations, and ethical guidelines, ensuring that the AI model operates within the boundaries of applicable regulations. The AI explainability test category focuses on the AI model's ability to provide transparent and interpretable explanations for its decisions and predictions. For example, the test category includes tests to evaluate the model's reasoning behind the model's outputs and ensure that the reasoning does not violate other guidelines. Additional test categories 1514a-e can include any context of the AI model that the user desires to evaluate. For example, the grading engine 1512 can evaluate performance efficiency by assessing the efficiency and optimization of the AI model's performance, and include tests for resource utilization, latency, and scalability. Additionally, the test categories 1514a-e can include testing an AI model's resilience against adversarial attacks and attempts to manipulate its outputs.

FIG. 16 is an illustrative diagram illustrating an example environment 1600 presenting application-domain-specific grades generated for an AI model. Environment 1600 includes an overall set of grades 1602, an overall grade 1604, a binary indicator 1606, test categories 1608, and individual grades 1610. Test categories 1608 is the same as or similar to test categories 1514a-e illustrated and described in more detail with reference to FIG. 15. Likewise, implementations of example environment 1600 can include different and/or additional components or can be connected in different ways.

The overall set of grades 1602 presents a cumulative view of the AI model's grading evaluation. The overall set of grades 1602 is a holistic assessment of the AI model's capabilities, reliability, and adherence to predefined guidelines (e.g., guidelines 1502 in FIG. 15). In some implementations, the overall set of grades 1602 includes an approximation of the weights, biases, and/or activation functions that the AI model should follow to satisfy the guidelines. The overall set of grades can indicate what the AI model currently follows. A comparison between the weights, biases, and/or activation functions of what the AI model should follow and what the AI model currently follows can be used to identify discrepancies between the desired performance and the actual performance of the AI model. Weights in an AI model can be defined as the parameters within the model that transform input data used by the AI model to produce the output. Biases are additional parameters that allow the model to adjust the output along with the weighted sum of the inputs to the neuron, and activation functions determine the output of a neural network node.

Using the assessments that test the AI model against the guidelines, the system can identify the variations and, in some implementations, suggest adjustments in the weights and biases or recommend different activation functions that would potentially enhance the model's performance. For instance, if an AI model uses a ReLU (Rectified Linear Unit) activation function but performs poorly in specific scenarios, the system can suggest experimenting with a different function like Leaky ReLU or SELU (Scaled Exponential Linear Unit). By adjusting the weights, biases, and/or activation functions, developers can refine the AI model to align more closely with the desired level of satisfaction with the guidelines. For example, suggestions can include using a universal data format, tagging metadata, or implementing more security measures in storing data.

Overall grade 1604 is an aggregated representation of the individual grades 1610 assigned to the AI model based on its performance in different test categories. Overall grade 1604 provides a single, summarized rating of the AI model's performance. This overarching grade offers users a concise representation of the AI model's overall quality, allowing for quick assessments and decision-making. In some implementations, a binary indicator 1606 can be included to signify whether the AI model meets specific criteria or thresholds, such as regulatory compliance or certification requirements (e.g., "PASS," "FAILED").

Test categories 1608 includes the areas evaluated by the grading engine, which can include assessment domains such as data quality, security measures, software development practices, regulatory compliance, and AI explainability. Further examples of test categories 1514a-e and test category 1702 are described in further detail with reference to FIG. 15 and FIG. 17, respectively. Each test category of the test categories 1608 provides users with insights into the AI model's performance in key areas, helping them identify strengths, weaknesses, and areas for improvement. The assessment-domain-specific grades, or individual grades 1610, received from each test category 1608 are described in further detail with reference to assessment-domain-specific grade 1708 in FIG. 17.

In some implementations, tiered indicators can be included to categorize the AI model into different tiers or levels based on its performance. These tiered indicators offer a structured framework for classifying AI models according to predefined criteria, such as performance thresholds for each tier or tiers based on compliance standards. By categorizing AI models into tiers, users can identify differences in performance and make informed decisions about their suitability for specific applications or use cases (e.g., filtering AI models by tier). The benchmarking process provides context for the overall set of grades and helps organizations assess the model's performance relative to other models.

FIG. 17 is an illustrative diagram illustrating an example environment 1700 for assigning a grade to an AI model for a test category. Environment 1700 includes a test category 1702, tests 1704a-n, AI model 1706, and assessment-domain-specific grade 1708. Test categories 1702 is the same as or similar to one or more test categories 1514a-e and test categories 1608 illustrated and described in more detail with reference to FIG. 15 and FIG. 16. Assessment-domain-specific grade 1708 is the same as or similar to one or more individual grades 1610 illustrated and described in more detail with reference to FIG. 16. Implementations of example environment 1700 can include different and/or additional components or can be connected in different ways.

Test category 1702 defines the specific criteria against which the AI model's performance will be evaluated. Test categories such as data quality, security measures, software development practices, regulatory compliance, or AI explainability can be included, depending on the objectives and requirements of the evaluation. Further examples of test categories 1514*a-e* are described with reference to FIG. 15.

Within each test category, a series of tests 1704*a-n* are conducted to assess the AI model's adherence to and/or satisfaction with the corresponding predefined guidelines of the test category. The series of tests 1704*a-n* evaluate different aspects or sub-components of the test category 1702 and can provide a multi-prompt assessment of the AI model's performance across various dimensions. For example, in a data quality test category, individual tests can focus on aspects such as bias detection, data completeness, or outlier detection. The bias test examines the AI model's training data for any biases that can lead to discriminatory or unfair outcomes. The bias test analyzes the distribution of data across different demographic groups and identifies any patterns of bias that can exist. The data completeness test evaluates the completeness of the AI model's training data by assessing whether the metadata of the training data has missing values, incomplete records, and/or other gaps in the data that could affect the AI model's performance. To test for outliers, the AI model's training data is evaluated for anomalies that deviate significantly from the norm. For example, one or more of the tests testing for outliers can aim to identify data points that are unusually large, small, or different from the majority of the dataset, which could potentially skew the AI model's predictions.

The system can assess the data quality by evaluating the AI model's performance metrics such as accuracy, precision, recall, and F1 score. For example, if an AI model consistently misclassifies certain types of data or shows a significant drop in performance in specific scenarios, this could indicate underlying data quality issues. Additionally, the system can identify out-of-distribution data, regime changes, or shifts in data distribution that could affect model performance. Further, the system can identify the AI model's use case limitations. For example, a model trained extensively on financial data from a specific region may not perform well when applied to data from a different region due to differences in regulatory environments. Analyzing the AI model's limitations helps in setting realistic expectations for the AI model's performance and identifying areas where additional data or retraining are necessary.

In some implementations, for prompt-based AI models such as large language models (LLMs), prompts are input into the AI model 1706 to initiate the tests 1704*a-n* within each category. The prompts can take various forms depending on the nature of the test. For example, the prompt can be a simulated scenario of particular security incidents, or specific queries about the AI model's model architecture. For example, in a test category focusing on threat detection, prompts can simulate suspicious network activity or attempt to breach system security. The AI model 1706 receives the prompts of the tests 1704*a-n* defined by the test category 1702 and generates responses or outcomes based on the AI model's 1706 algorithms. For instance, in response to a prompt about identifying potential malware in network traffic, the AI model 1706 can analyze packet headers, payload contents, and behavioral patterns to make a determination, and output whether or not there is malware and why the AI model came to that conclusion (e.g., abnormal behavior patterns). The responses are then compared against predefined expectations or benchmarks to determine the AI model's 1706 performance in each test. The comparison process assesses how closely the AI model's 1706 responses align with expected responses.

Based on the results of the tests conducted within the test category 1702, an assessment-domain-specific grade 1708 is assigned to the AI model. This grade reflects the AI model's overall performance in meeting the criteria outlined by the test category, providing users with valuable insights into its strengths, weaknesses, and areas for improvement within that specific dimension. For example, a high grade can indicate that the AI model 1706 demonstrates strong capabilities in detecting and mitigating security threats, while a lower grade can signal areas of improvement or potential vulnerabilities that need to be addressed.

Dynamic Multi-Model Monitoring of Artifacts Using the Data Generation Platform

FIG. 18 is a block diagram illustrating an example environment 1800 for dynamic multi-model monitoring and validation of a generative artificial intelligence model. Environment 1800 includes artifact 1802, policy sources 1804 (which can include knowledge base 1806), and artifact observation platform 1808. Artifact observation platform 1808 can include policy context extraction module 1810, monitoring engine 1812, data ingestion module 1814, data transformation module 1816, data enrichment module 1818, synthetic data generation module 1820, synthetic data enrichment module 1822, self-learning module 1824, AI training module 1826, validation model 1828, compliance and fairness module 1830, and evaluation report 1832. Implementations of example environment 1800 can include different and/or additional components or can be connected in different ways.

The artifact 1802 can be thought of as the subject to be monitored and validated, such as an output generated by the generative AI model. For example, the artifact 1802 can be any form of data, such as text, images, or other multimedia content, produced by the AI model. In some implementations, artifact 1802 can include structured data outputs, such as tables or graphs. For example, an artifact can be a text summary of a legal document, an image generated from a text description, and/or a graph representing data trends. The artifact 1802 is evaluated against various compliance and performance metrics by the artifact observation platform 1808 using methods discussed with reference to FIG. 21.

The artifact 1802 can be evaluated for compliance against the criteria within the policy sources 1804. The policy sources 1804 encompass a range of regulatory and policy documents that provide guidelines and standards for AI model compliance. The policy sources can be the same as or similar to guidelines 1202 discussed in further detail with reference to FIG. 12. The policy sources 1804 can include internal company policies, industry standards, legal regulations, and/or other guidelines. For example, policy sources 1804 can include ethical guidelines that ensure AI models operate within moral boundaries, such as avoiding bias and ensuring fairness. Additionally, policy sources 1804 can include regulations from financial regulatory bodies like the Financial Industry Regulatory Authority (FINRA). Compliance with FINRA regulations can include adhering to standards for transparency, accuracy, and/or investor protection. Policy sources can further include regulations such as the Sarbanes-Oxley Act (SOX), which sets requirements for financial reporting and corporate governance. For example, AI models used in financial reporting are required to comply with SOX standards relating to the accuracy and integrity of financial data. In some implementations, policy sources 1804 can integrate real-time updates from regulatory bodies to ensure the AI model remains compliant with the latest standards using methods discussed with reference to FIG. 21. The knowledge base 1806 within policy sources 1804 stores structured and unstructured data related to the policies. For example, structured data can be structured databases of regulations, while unstructured data can be text documents or emails.

The artifact 1802 can be evaluated for compliance against the criteria within the policy sources 1804 using the artifact observation platform 1808. The artifact observation platform 1808 can be the same as or similar to data generation platform 402 discussed with reference to FIG. 4. The artifact observation platform 1808 can be implemented using components of example devices 500 and computing devices 602 illustrated and described in more detail with reference to FIG. 5 and FIG. 6, respectively. In some implementations, the artifact observation platform 1808 can be distributed across multiple servers. For example, the artifact observation platform 1808 can be a multi-model superstructure within the data generation platform 402 that monitors and validates artifact 1802 against the criteria in policy sources 1804. In some implementations, the artifact 1802 can be a model output of a model within the artifact observation platform 1808 itself.

To enable the artifact observation platform 1808 to evaluate the artifact 1802, the policy context extraction module 1810 identifies the criteria within the policy sources 1804. In particular, the policy context extraction module 1810 within the artifact observation platform 1808 extracts criteria and/or context within the knowledge base 1806 containing the policy sources 1804 to provide assessment metrics and threshold values of the assessment metrics in which to use to evaluate artifact 1802. The policy context extraction module 1810 can extract criteria and/or context by using methods discussed with reference to FIG. 21. The extracted information can be used by the monitoring engine 1812 to continuously observe the artifact 1802 and detect deviations from expected behavior. For example, the monitoring engine 1812 can task one or more validation model(s) 1828 to detect bias, inaccuracies, and non-compliance with guidelines of the artifact 1802. Methods of determining which validation model(s) 1828 to evaluate artifact 1802 is discussed in further detail with reference to FIG. 21.

The data ingestion module 1814 collects data from various sources, including for example historical AI model outputs, external dataset (e.g., publicly available data, industry benchmarks), the criteria extracted from the policy context extraction module 1810, user interaction data, system logs of the model generating the artifact 1802 and/or the validation model 1828, and so forth. The ingested data can be processed by the data transformation module 1816 to transform the ingested data using techniques such as normalization (e.g., scaling numerical data to a standard range, such as 0 to 1), aggregation (e.g., summarizing/averaging data points), and/or other preprocessing techniques. In some implementations, the data transformation module 1816 can include data anonymization (e.g., replacing personally identifiable information (PII) such as names and social security numbers with pseudonyms or hashed values) to protect sensitive information. The data enrichment module 1818 can supplement the transformed data by adding additional context or metadata, such as appending geolocation data to provide geographical context (e.g., a guideline only affects artifacts within a certain region), or adding timestamps to provide temporal context for particular guidelines (e.g., a guideline only affects artifacts within a certain range of timestamps). For example, the additional context/metadata can be appended as a new field in the dataset.

The synthetic data generation module 1820 creates new data samples to test the AI model that generated the artifact 1802 under various scenarios. The synthetic data generation module 1820 can produce artificial data that mimics real-world conditions, allowing the data generation platform 402 to evaluate the model's performance in different situations. In some implementations, the synthetic data generation module 1820 can use generative adversarial networks (GANs) to create realistic synthetic data. To generate synthetic data for various types of ingested data, the synthetic data generation module 1820 can use GANs to create synthetic outputs that mimic the patterns and distributions observed in the ingested data by training the generator on historical data to produce statistically similar samples. Further, the synthetic data generation module 1820 can create synthetic data that adheres to the specified policies and guidelines using information identified in the policy context extraction module 1810. The synthetic data enrichment module 1822 can further refine the synthetic data, ensuring that the synthetic data accurately represents the conditions it is meant to simulate. For example, the synthetic data enrichment module 1822 can add noise to the synthetic data to simulate real-world variability or integrate contextual metadata, such as geolocation information or temporal markers.

The self-learning module 1824 enables the data generation platform to learn from past monitoring results and continuously refine its ability to detect and address issues by training the monitoring model (e.g., the validation model 1828) on data that becomes available over time. In some implementations, the self-learning module 1824 can incorporate reinforcement learning algorithms (e.g., Q-learning or policy gradient methods) to improve the accuracy and consistency of its decision-making process. The AI training module 1826 module trains the validation model 1828 using the enriched data of the data enrichment module 1818, the synthetic data from the synthetic data enrichment module 1822, and updated adjustments from the self-learning module 1824.

The trained validation model 1828 and the compliance and fairness module 1830 can be thought of as a part of the suite of monitoring models used to evaluate the artifact 1802. In some implementations, the compliance and fairness module 1830 contains pre-trained models to evaluate the artifact 1802 for compliance with the guidelines (e.g., policy sources 1804). For example, the monitoring models can evaluate the artifact 1802 (e.g., an AI model's outputs) against predefined metrics. For example, the monitoring models can assess the quality, accuracy, and compliance of the generated artifacts 1802 using methods discussed with reference to FIG. 21. The compliance and fairness module 1830 can be the same as the validation model 1828, or a separate model to ensure that the AI model adheres to ethical guidelines and regulatory standards within the policy context extraction module 1810 and knowledge base 1806. In some implementations, the suite of models including the compliance and fairness module 1830 and the validation model 1828 can monitor the artifact 1802 using a changed architecture discussed with reference to FIG. 21. The evaluation report 1832 can be thought of as the compliance indicator of the artifact 1802. In some implementations, the evaluation report 1832 can include confidence scores or other metrics to indicate the reliability of the output. The evaluation report 1832 can provide a summary of the monitoring and validation process, including any issues detected and the corrective actions suggested or taken.

FIG. 19 is a block diagram illustrating an example architecture 1900 of the artifact observation platform 1808 of FIG. 18. Architecture 1900 can ingest artifact 1802 via artifact observation platform 1808, which can include monitoring engine 1812 and validation models 1902. Implementations of example architecture 1900 can include different and/or additional components or can be connected in different ways.

The monitoring engine 1812 can assess the artifact 1802 using a suite of validation models 1902, which include one or more types of AI models. Validation models 1902 can be the same as or similar to validation model 1828 or model(s) within the compliance and fairness module 1830. The validation models 1902 can be domain-specific and/or generic. Generic validation models 1902 can be used to evaluate the artifact 1802 against a series of common assessment metrics and standards, while domain-specific validation models can be tailored to specific types of artifacts 1802 or industries (e.g., trained on domain-specific data). For example, a generic validation model can assess the readability of text outputs or the accuracy of numerical data. Domain-specific validation models for the financial industry, for example, can evaluate the compliance of financial reports with regulations such as the SOX and/or FINRA guidelines. The monitoring engine 1812 continuously observes the AI model's outputs (e.g., artifacts 1802) and uses the validation models 1902 to assess the artifact against various compliance and performance metrics. For example, the monitoring engine 1812 can use a generic validation model to assess the readability of a text output and a domain-specific validation model to evaluate the compliance of a financial report with SOX regulations. Within the monitoring engine 1812, there can be a suite of monitoring models, each determining the validation models 1902 to be used using different methods discussed with reference to FIG. 21 (e.g., random, predefined intervals).

FIG. 20 is a block diagram illustrating an example architecture 2000 of a suite of monitoring models 2002 in the monitoring engine 1812 of FIG. 18. Architecture 2000 includes monitoring engine 1812, monitoring models 2002, and validation models 2004. Implementations of example architecture 2000 can include different and/or additional components or can be connected in different ways.

Each monitoring model 2002 in the suite can have its own set of validation models 2004 (e.g., validation model 1828) or share a single set of validation models 2004 with other monitoring models 2002. The particular monitoring model(s) 2002 can be assigned to validate artifact 1802 either randomly, based on predefined criteria, through a rotating schedule, and so forth. In some implementations, the assignment of monitoring models can be dynamic, adapting to the specific needs of the artifact 1802 being evaluated. For example, an artifact 1802 that is image based can automatically be assigned a monitoring model 2002 specialized in image artifacts. Each monitoring model 2002 can validate the artifact 1802 using different methods. For example, one monitoring model 2002 can validate the artifact 1802 using a majority vote between the validation models 2004, whereas another monitoring model 2002 can use a singular validation model 2004 to validate the artifact 1802. In some implementations, similarly to that of the validation models 2004, the monitoring models 2002 can also be generic or domain-specific. The monitoring models 2002 and/or validation models 2004 can operate either in parallel or sequentially. When running in parallel, multiple models-whether identical or different-simultaneously analyze the same input data. In some implementations, different portions of the input data can be assigned to different models. On the other hand, when running sequentially, the models can operate individually or be arranged in an end-to-end pipeline where the output of one model serves as the input for the next.

In a random assignment, the monitoring engine 1812 can select a monitoring model 2002 (or multiple) from the suite of monitoring models 2002 at random to evaluate the artifact to ensure that the artifact is evaluated from different perspectives, reducing the risk of bias or overfitting. In a predefined assignment, the monitoring engine 1812 can select a monitoring model 2002 based on specific criteria, such as the type of artifact 1802 and/or particular policy sources (e.g., policy sources 1804 in FIG. 18). For example, a financial report artifact can be evaluated by a monitoring model specialized in financial compliance, while a medical record artifact can be evaluated by a monitoring model focused on healthcare regulations. In a rotating assignment, the monitoring engine 1812 can cycle through the suite of monitoring models 2002 to prevent any single monitoring model from being overfitted. In some implementations, the monitoring engine 1812 can dynamically adapt the assignment of monitoring models 2002 based on the specific needs of the artifact 1802 using methods discussed with reference to FIG. 21. For example, if the artifact 1802 is a complex document with multiple sections, the monitoring engine 1812 can assign different monitoring models to evaluate each section. Further, in some implementations, the system reduces overfitting by using k-fold cross-validation (i.e., dividing the dataset into k subsets and trains the model k times, each time using a different subset as the validation set), regularization techniques (i.e., L1 and L2 regularization to penalize large coefficients to prevent fitting noise, data augmentation (i.e., artificially expanding the training data by creating modified versions of existing data, feature selection (i.e., identifying and retaining only the most relevant features to reduce model complexity, dropout (i.e., randomly deactivating a fraction of neurons during training to prevent over-reliance on specific neurons, and/or ensembling techniques (e.g., such as bagging, stacking, and boosting to combine predictions from multiple models).

FIG. 21 is a flow diagram illustrating a process 2100 of dynamic multi-model monitoring and validation of a generative AI model. In some implementations, the process 2100 is performed by components of example devices 500 and computing devices 602 illustrated and described in more detail with reference to FIG. 5 and FIG. 6, respectively. The process 2100 can be performed using one or more components or methods described in FIGS. 1-17. Specific models enumerated in the process 2100, such as the first, second, and third set of models, can be the same as or different from each other (e.g., the first and second can be same, the first and second can be different, and so forth). Implementations of process 2100 can include different and/or additional operations or can perform the operations in different orders.

In operation 2102, a multi-model superstructure can receive, from a computing device, an output generation request including a prompt for generation of an output using the multi-model superstructure. The multi-model superstructure can include a first set of models and a second set of models. The first set of models can be thought of as the monitored model(s) generating the artifact (e.g., an output based on the prompt or other output generation request such as artifact 1802). The models in the multi-model superstructure can include various types of generative models (e.g., language models, image generation models, data synthesis models). The second set of models can be thought of as the monitoring model(s) evaluating and validating the artifact generated by the first set of models (e.g., checking accuracy, detecting biases, ensuring compliance with regulations such as the validation model 1828 and validating models 2004). In some implementations, the multi-model superstructure can use a modular architecture to enable easy integration and replacement of models within the multi-model superstructure. Each model can be encapsulated within a microservice, which communicates with other microservices via APIs. Additionally, the multi-model superstructure can use containerization technologies, such as Docker, to package and deploy the models.

In operation 2104, the multi-model superstructure can supply the output generation request to one or more models of the first set of models to generate a set of model-specific outputs. The multi-model superstructure can determine which models of the first set to use based on the nature of the prompt, the desired output type, and/or the specific capabilities of each model. In some implementations, the multi-model superstructure can determine the most appropriate models from the first set of models to handle the output generation request using factors such as the complexity of the prompt, the historical performance of the models, and/or the specific requirements of the task. For example, if the prompt includes creating a visual representation, the multi-model superstructure can select an image generation model.

In some implementations, the multi-model superstructure can use a load balancer to distribute the output generation request across multiple models in the first set of models. The load balancer can dynamically allocate resources based on the current workload of each model to prevent any single model from becoming a bottleneck. In some implementations, the multi-model superstructure can use a parallel processing framework to supply the output generation request to multiple models simultaneously. The multi-model superstructure can aggregate the model-specific outputs into a single output. For example, if the prompt involves generating a multi-faceted report, different sections of the report can be generated by different models in parallel, and the multi-model superstructure can combine these sections into a final document. In some implementations, the multi-model superstructure can use a cascading model architecture, where the output of one model in the first set of models is used as the input for another model. For example, an initial language model can generate a rough draft of a document, and a subsequent model can refine the language and improve the coherence of the text.

In operation 2106, the multi-model superstructure can dynamically route, by the multi-model superstructure, a set of artifacts (e.g., the model-specific outputs) of the first set of models to one or more models of the second set of models. For example, the multi-model superstructure can determine a set of dimensions (e.g., test category 1608 in FIG. 16) of the set of model-specific outputs in which the set of model-specific outputs will be evaluated against. Dimensions can be thought of as the specific aspects or attributes of the artifact that need to be evaluated. For example, in the case of a text document, dimensions can include grammar, style, factual accuracy, coherence, and/or relevance. In the case of a financial report, dimensions can include compliance with financial regulations and/or accuracy of numerical data. In some implementations, the multi-model superstructure can use a predefined set of dimensions based on the type of artifact. For example, a legal document can have predefined dimensions such as legal compliance, clarity of language, and/or logical consistency. In some implementations, the multi-model superstructure can enable users to specify the dimensions that need to be evaluated. Users can provide a list of dimensions and/or the specific criteria for each dimension.

To dynamically determine a dimension from an artifact, the multi-model superstructure can parse the artifact using tokenization and part-of-speech tagging to break down the text into smaller components. For text-based artifacts, the multi-model superstructure can use NLP models that use word embeddings, which are dense vector representations of words that capture semantic and syntactic meanings based on context. For example, the word "bank" can have different embeddings in the contexts of "river bank" and "financial bank." The multi-model superstructure can apply clustering algorithms, such as k-means or hierarchical clustering, to group similar features and identify common themes or dimensions. Additionally, supervised ML models, trained on labeled datasets, can predict relevant dimensions based on the artifact's characteristics and historical data. For instance, a labeled dataset for text classification can include particular words or phrases and their corresponding guidelines. The multi-model superstructure can use the labeled datasets to train models to recognize and predict dimensions such as criteria within relevant guidelines. In some implementations, the multi-model superstructure can use a hierarchical approach to determine the dimensions of the artifact. The multi-model superstructure can start with high-level dimensions and progressively refine the dimensions into more specific sub-dimensions. For example, a high-level dimension for a text document can be compliance with a broader guideline which can be further refined into sub-dimensions such as narrower organizational-specific guidelines.

In some implementations, criteria from relevant guidelines are used to determine the dimensions of the artifact. The relevant guidelines can be predetermined, or dynamically determined based on the artifact. To dynamically determine relevant guidelines for an artifact, the multi-model superstructure can evaluate metadata tags, keywords, or categories associated with stored guidelines to filter and retrieve those pertinent to the specific context and requirements of the application. Using NLP, the multi-model superstructure can parse the text of the guidelines to identify key terms and phrases that denote regulatory obligations, such as "patient privacy" for healthcare applications. The terms can act as filters to exclude non-relevant guidelines. Additionally, guidelines can be stored in vector space, allowing the multi-model superstructure to calculate the similarity between vectors representing domain-specific terms and other related terms, applying a similarity threshold to filter out insufficiently similar terms.

For each particular dimension in the determined set of dimensions, the multi-model superstructure can determine the one or more models of the second set of models used test the particular dimension. The multi-model superstructure can include a third set of models used to dynamically route the artifacts to the second set of models. The third set of models can be interchangeable with the second set of models, meaning that sometimes the third set of models can be used to validate the artifact, and sometimes the second set of models can be used to validate the artifact.

In some implementations, the models in the multi-model superstructure include 1) general-purpose models and/or 2) domain-specific models. The artifacts can be routed to the one or more models of the second set of models trained on data sharing a common domain with one or more artifacts of the set of artifacts. The domain can indicate 1) an area of knowledge, such as healthcare or finance, 2) a data type, such as text, image, or numerical data, 3) a guideline type, such as regulatory compliance or industry standards, and/or 4) a type of task, such as classification, prediction, or summarization. The multi-model superstructure can catego-rize/tag the artifacts from the first set of models based on the artifact's domain's characteristics (e.g., keywords identified using NLP). For instance, if the artifact is a text document related to healthcare, it is tagged with the "healthcare" domain. The multi-model superstructure can use the tags to route the artifacts to the models in the second set.

The models in the first, second, and/or third set can be trained to execute specific types of tasks through transfer learning, where a pre-trained model is adapted to a specific task using a smaller, task-specific dataset. Transfer learning uses the knowledge gained from a large, general-purpose dataset to improve performance on a related but more specialized task. For example, a pre-trained language model like BERT, initially trained on a vast corpus of general text, can be fine-tuned on a specialized dataset including financial regulations, compliance guidelines, and historical compli-ance reports by adjusting the model's weights and param-eters to improve interpretation of the specific language and requirements of financial compliance documents. The adapted model can perform tasks such as identifying non-compliant sections in financial reports, extracting regulatory requirements, and/or suggesting modifications to ensure compliance.

In some implementations the one or more models of the second set of models are determined randomly to introduce variability. By randomly selecting models from the second set, the multi-model superstructure can avoid potential biases that can arise from consistently using the same models. The random selection process can be implemented using algorithms such as random sampling or stochastic processes to ensure that each model in the second set has an equal probability of being chosen. The random determina-tion can be combined with other selection criteria, such as performance metrics or resource availability, to balance randomness with practical considerations.

In some implementations, the multi-model superstructure can establish a predefined schedule to change the one or more models in the second set of models. The predefined schedule can be established using time intervals, such as changing models every hour or day, and/or a number of output generation requests processed, such as switching models after every 400 requests. Using the predefined schedule, the multi-model superstructure can determine the one or more models of the second set of models. By adhering to this schedule, the multi-model superstructure ensures that different models are periodically utilized, which can help in balancing the load, preventing model overfitting, and intro-ducing variability in the outputs. The scheduling algorithm used can be, for example, a round-robin scheduling algo-rithm that assigns a fixed time slice to each model in a cyclic order. A weighted round-robin algorithm can allocate more processing time to higher-performing models based on assigned weights. Further, the scheduling algorithm used can include priority scheduling to ensure that preferred models are used more frequently by assigning them higher priority levels. Least Recently Used (LRU) scheduling can be used to ensure periodic usage of all models by selecting the model(s) that have been used the least recently. Dynamic scheduling can adjust the shifting of the models based on real-time metrics such as model performance and system load.

In some implementations, the multi-model superstructure can dynamically select the one or more models of the second set of models using the third set of models and using dimension-specific features of the particular dimension being evaluated. For instance, if the dimension being evalu-ated is related to financial data, the third set of models can extract features such as transaction types, regulatory require-ments, and market conditions. The features can be used to match the artifact with models in the second set that are specifically trained on similar financial datasets. The selec-tion process can be implemented (e.g., using the third set of models) using machine learning algorithms, such as decision trees, which are a type of supervised learning algorithm that splits the data into branches based on feature values, ulti-mately leading to a decision node that indicates the most suitable model. Alternatively, the third set of models can map the artifact to the most suitable model(s) in the second set by minimizing a loss function, which measures the difference between the predicted and actual model selec-tions. When a new artifact is received, the multi-model superstructure can input certain features (e.g., artifact type, artifact timestamp, artifact location, last used models in the second set, predefined schedules, metadata of capabilities and specializations of models in the second set, other metadata, and so forth) into the trained third set of models, which then predicts the most suitable model(s) from the second set of models to use to validate the artifact. Dynami-cally determining the monitoring models enables the multi-model superstructure to use, for example, different monitor-ing models on different artifact types (e.g., format, domain such as technical field) depending on the monitoring mod-el's performance (e.g., better performing monitoring models for a particular artifact type is used on the particular artifact).

In addition to dynamically selecting models based on dimension-specific features, the multi-model superstructure can vary the monitoring models using dynamic balancing based on model performance metrics such as latency, accu-racy, and/or precision. For instance, monitoring models with lower latency and higher accuracy can be prioritized for real-time applications, while those with higher precision can be selected for tasks executed by higher risk applications. Furthermore, the superstructure can use previous results by clustering artifacts with similar characteristics and thus select monitoring models that have historically performed well on similar artifacts.

In operation 2108, the second set of models can, for each particular dimension in the determined set of dimensions, evaluate each particular model-specific output of the set of model-specific outputs against a set of assessments to deter-mine satisfaction of the particular model-specific output with a corresponding set of assessment metrics of each assessment. In some implementations, the set of assessments are predefined for each dimension. In some implementa-tions, the multi-model superstructure dynamically maps assessments to the particular dimensions. For example, the multi-model superstructure can evaluate historical data and identify patterns that indicate which metrics are most related for different types of artifacts and/or determined dimensions. For example, clustering algorithms like K-means can group similar artifacts/dimensions and identify common charac-teristics. In some implementations, the multi-model super-structure can use a rules engine to define and manage the logic for dynamically selecting assessment metrics. The rules engine can evaluate the artifact and/or dimensions, and apply predefined rules to determine the most appropriate metrics. For example, a rule can state that if the artifact is related to financial transactions, the system prioritizes accuracy and compliance metrics.

Once the assessment metrics are defined, the system can implement a scoring mechanism to evaluate each artifact, such as a model-specific output. For instance, a rule-based system can apply predefined rules to check if the artifact meets the required assessment metric values. In some implementations, the system can use ensemble methods to combine the evaluations from multiple models in the second set of models. For example, the multi-model superstructure can use multiple models trained different subsets of the data and average their predictions.

In some implementations, the second set of models can construct the set of assessments including a set of seed assessments testing the particular dimension of the particular model-specific output against threshold values of the corresponding set of assessment metrics. For example, in a financial context, seed assessments can include checks for basic accuracy, compliance with the broadest regulations, and initial risk assessments. The threshold values for these metrics can be established based on industry standards, regulatory requirements, and historical performance data. The second set of models can compare values of the corresponding set of assessment metrics of the particular model-specific output with the threshold values of the corresponding set of assessment metrics by calculating the actual values of the assessment metrics for the output and checking whether the values satisfy the predefined thresholds. For example, the system can check that all PII, such as names, addresses, social security numbers, and other sensitive information, is properly anonymized or pseudonymized in the artifact.

Using the comparison, the second set of models can generate a set of seed assessment results indicating a degree of satisfaction of the particular model-specific output with the threshold values of the corresponding set of assessment metrics of the set of seed assessments. The degree of satisfaction can be represented using various scales, such as binary (e.g., pass/fail, 0/1), categorical (e.g., high/medium/low, one through five), or continuous (e.g., percentage or score).

Using the set of seed assessment results, the second set of models can dynamically construct a set of subsequent assessments within the set of assessments constructed subsequent to the set of seed assessments. For example, if the seed assessments indicate that the output meets basic accuracy requirements but falls short in financial compliance, the subsequent assessments can include more detailed financial compliance checks, such as verifying adherence to specific regulatory clauses or conducting a more detailed risk analysis. The second set of models can apply the set of subsequent assessments of the set of assessments to the particular model-specific output to generate a set of overall assessment results based on a degree of satisfaction of the particular model-specific output with the threshold values of the assessment metrics of: (i) the set of seed assessments and (ii) the set of subsequent assessments. The overall assessment results can be aggregated using various techniques, such as weighted averaging, where more prioritized metrics are given higher weights.

In some implementations, the multi-model superstructure can determine whether the particular model-specific output fails to satisfy one or more particular assessment metrics of the set of assessments using a majority vote between the one or more models of the second set of models. Each model in the second set of models can independently evaluate the artifact against the predefined assessment metrics. A majority voting mechanism is applied to decide whether the artifact meets the criteria of the dimensions. For instance, if three models are used and two of them determine that the output fails to meet a specific compliance metric, the majority vote can indicate a failure for that metric, reducing the likelihood of errors and biases that might occur if a single model were used.

In operation 2110, responsive to the set of assessment results of a particular model-specific output failing to satisfy one or more threshold values of the corresponding set of assessment metrics of the set of assessments, the second set of models can generate a set of actions to add a set of pre-loaded query context to the output generation request indicated by the particular assessment metrics. For example, if the assessment results indicate that the artifact fails to comply with certain regulatory requirements, the second set of models can augment the original request with additional context or queries that target these specific issues. This pre-loaded query context can include supplementary data, clarifying questions, or specific instructions to generate a new artifact that better complies with the threshold values of the corresponding set of assessment metrics.

The generated set of actions include any task, computer-executable or not, to improve the degree of satisfaction of the artifact with the threshold values of the assessment metrics. For instance, the actions can include additional data validation steps, where the system cross-references the artifact with external databases to ensure data accuracy and integrity. Another action can be enrichment, where additional data is fetched and integrated into the artifact directly (e.g., adding a required clause that was not identified in a contract) and/or the first set of models (e.g., identifying bias from the artifact and thus adding a weight into the model to bias the prediction a certain direction to remove the bias). The system can further trigger formatting and standardization actions to ensure that the artifact adheres to specific presentation guidelines or regulatory formats. The system can further initiate review and approval processes, where the artifact is routed to subject matter experts for manual validation and feedback (e.g., human-in-the-loop).

In some implementations, using the generated set of actions, the multi-model superstructure can update the output generation request by automatically triggering an automated workflow indicated by the generated set of actions. The automated workflow can include executing the generated set of actions. For example, the multi-model superstructure can define the generated set of actions as discrete steps within a workflow definition file. The workflow definition specifies each step's action and parameters, such as querying a database, using NLP to generate clarifying questions, and/or updating the request with the new context. Once the workflow definition is created, a workflow engine (e.g., APACHE AIRFLOW, AWS STEP FUNCTIONS) can execute each step in the defined sequence. As each step is completed, the workflow engine can update the state of the workflow and passes the intermediate results to the next step.

In some implementations the multi-model superstructure can automatically take corrective measures on both the model output and the monitored model that generated the output, based on the compliance indicators in the evaluation report 1832. For example, if the evaluation report 1832 indicates non-compliant results, the superstructure can modify the input data of the monitored model(s) to drive desired changes, such as adjusting data distributions or incorporating additional data sources (i.e., knowledge bases). Additionally, the superstructure can initiate a retraining process for the monitored model(s) to guide the selection of new training data that addresses the indicated issues. For example, the superstructure can retrain the monitored model(s) with reduced or different input variables to eliminate those contributing to non-compliance.

For example, using the updated output generation request, the multi-model superstructure can supply the updated output generation request to the one or more models of the first set of models to generate a set of updated model-specific outputs. The second set of models can re-evaluate each particular updated model-specific output of the updated model-specific outputs against the set of assessments to determine satisfaction of the particular updated model-specific output with the corresponding set of assessment metrics of each assessment.

In some implementations, the set of model-specific outputs is a first set of model-specific outputs. The multi-model superstructure can provide the output generation request loaded with the pre-loaded query context to the one or more models of the first set of models to generate a second set of model-specific outputs. Responsive to the second set of model-specific outputs satisfying each assessment metrics of the set of assessments, the multi-model superstructure can automatically transmit, to the computing device, the second set of model-specific outputs.

In some implementations, for each particular artifact of the set of artifacts, the multi-model superstructure can generate for display on the computing device, a layout indicating the set of assessment results. The layout can include a first representation of the particular artifact (e.g., model output, document, report, data visualization) and a second representation of the corresponding set of actions generated. The second representation can be displayed as a graphical representation, a list and/or a flowchart, showing one or more of the generated actions.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

We claim:

1. One or more non-transitory, computer-readable storage medium comprising instructions recorded thereon, wherein the instructions, when executed by at least one data processor of a system, cause the system to:

monitor, in real time, a series of communications between a plurality of autonomous agents operating within an operational environment, wherein the plurality of autonomous agents are organized into a plurality of agent meshes based on functional domains of the plurality of autonomous agents, the series of communications comprising intra-mesh communications within individual agent meshes and inter-mesh communications across agent mesh boundaries of some of the individual agent meshes, and wherein monitoring the series of communications comprises intercepting and recording each communication of the series of communications;

translate each communication in the series of communications to a standardized language;

implement, for each communication translated to the standardized language, at least one communication protocol filter, wherein the at least one communication protocol filter is configured to evaluate each communication based on predefined operational policies, and wherein the predefined operational policies comprise domain-specific policies associated with respective individual agent meshes of the plurality of agent meshes;

using the at least one communication protocol filter, parse each communication translated to the standardized language to determine whether each communication violates at least one relevant domain-specific policy of the domain-specific policies;

based on determining that a particular communication translated to the standardized language violates the at least one relevant domain-specific policy, perform one or more modifications to the particular communication to render the particular communication compliant with the at least one relevant domain-specific policy; and execute a smart contract to record, via a distributed ledger, the particular communication and the one or more modifications to the particular communication.

2. The one or more non-transitory, computer-readable storage medium of claim 1, wherein the instructions for monitoring the series of communications further cause the system to employ a transformer-based language model configured to automatically detect and translate communications that utilize novel or evolving AI agent languages.

3. The one or more non-transitory, computer-readable storage medium of claim 1, wherein the at least one communication protocol filter comprises hybrid violation detection using both a rule-based filter encoded with a declarative policy language and a machine learning-based model trained to score violation risk.

4. The one or more non-transitory, computer-readable storage medium of claim 1, wherein the instructions for parsing each communication further cause the system to apply semantic analysis through natural language processing models for policy violation assessment.

5. The one or more non-transitory, computer-readable storage medium of claim 1, wherein the instructions for parsing each communication further cause the system to perform anomaly detection on message frequency, entropy, or known abuse patterns.

6. The one or more non-transitory, computer-readable storage medium of claim 1, wherein the instructions for performing the one or more modifications to the particular communication further cause the system to block or quarantine the particular communication.

7. A method comprising:
monitoring, in real time, a series of communications between a plurality of autonomous AI agents operating within an operational computing environment, wherein the plurality of autonomous AI agents are organized into a plurality of agent meshes based on functional domains of the plurality of autonomous AI agents, the series of communications comprising intra-mesh communications within agent meshes and inter-mesh communications across agent mesh boundaries;

implementing, for the series of communications, at least one communication protocol filter, wherein the at least one communication protocol filter is configured to evaluate the series of communications based on predefined operational policies, and wherein the predefined operational policies comprise domain-specific policies associated with respective agent meshes of the plurality of agent meshes;

determining, using the at least one communication protocol filter, whether a particular communication of the series of communications violates at least one domain-specific policy of the domain-specific policies;

based on determining that the particular communication violates the at least one domain-specific policy, performing one or more modifications to the particular communication to render the particular communication compliant with the at least one domain-specific policy; and recording, via a distributed ledger, the particular communication and the one or more modifications to the particular communication.

8. The method of claim 7, wherein monitoring the series of communications further comprises employing a transformer-based language model configured to automatically detect and translate communications that utilize novel or evolving AI agent languages.

9. The method of claim 7, wherein the at least one communication protocol filter comprises hybrid violation detection using both a rule-based filter encoded with a declarative policy language and a machine learning-based model trained to score violation risk.

10. The method of claim 7, wherein determining whether the particular communication of the series of communications violates the at least one domain-specific policy further comprises applying semantic analysis through natural language processing models for policy violation assessment.

11. The method of claim 7, wherein determining whether the particular communication of the series of communications violates the at least one domain-specific policy further comprises performing anomaly detection on message frequency, entropy, or known abuse patterns.

12. The method of claim 7, wherein performing the one or more modifications to the particular communication further comprises blocking or quarantining the particular communication.

13. The method of claim 7, wherein monitoring the series of communications further comprises intercepting and recording the series of communications.

14. A system comprising:
a storage device; and
one or more processors communicatively coupled to the storage device storing instructions thereon, that cause the one or more processors to:
monitor, in real time, a series of communications between a plurality of autonomous AI agents operating within an operational computing environment, wherein the plurality of autonomous AI agents are organized into a plurality of agent meshes based on functional domains of the plurality of autonomous agents;

implement, for the series of communications, at least one communication protocol filter, wherein the at least one communication protocol filter is configured to evaluate the series of communications based on predefined operational policies, and wherein the predefined operational policies comprise domain-specific policies associated with respective agent meshes of the plurality of agent meshes;

determine, using the at least one communication protocol filter, whether a particular communication of the series of communications violates at least one domain-specific policy of the domain-specific policies;

based on determining that the particular communication violates the at least one domain-specific policy, perform one or more modifications to the particular communication to render the particular communication compliant with the at least one domain-specific policy; and record, via a distributed ledger, the particular communication and the one or more modifications to the particular communication.

15. The system of claim 14, wherein the instructions for monitoring the series of communications further cause the one or more processors to employ a transformer-based language model configured to automatically detect and translate communications that utilize novel or evolving AI agent languages.

16. The system of claim 14, wherein the at least one communication protocol filter comprises hybrid violation detection using both a rule-based filter encoded with a declarative policy language and a machine learning-based model trained to score violation risk.

17. The system of claim 14, wherein the instructions for determining whether the particular communication of the series of communications violates the at least one domain-specific policy further cause the one or more processors to apply semantic analysis through natural language processing models for policy violation assessment.

18. The system of claim 14, wherein the instructions for determining whether the particular communication of the series of communications violates the at least one domain-specific policy further cause the one or more processors to perform anomaly detection on message frequency, entropy, or known abuse patterns.

19. The system of claim 14, wherein the instructions for performing the one or more modifications to the particular communication further cause the one or more processors to block or quarantine the particular communication.

20. The system of claim 14, wherein the instructions for monitoring the series of communications further cause the one or more processors to intercept and record the series of communications.

\* \* \* \* \*